(12) United States Patent
Yu et al.

(10) Patent No.: US 11,906,698 B2
(45) Date of Patent: Feb. 20, 2024

(54) BROADBAND ACHROMATIC FLAT OPTICAL COMPONENTS BY DISPERSION-ENGINEERED DIELECTRIC METASURFACES

(71) Applicant: THE TRUSTEES OF COLUMBIA UNIVERSITY IN THE CITY OF NEW YORK, New York, NY (US)

(72) Inventors: Nanfang Yu, Fort Lee, NJ (US); Adam Overvig, Bronx, NY (US); Sajan Shrestha, New York, NY (US)

(73) Assignee: THE TRUSTEES OF COLUMBIA UNIVERSITY IN THE CITY OF NEW YORK, New York, NY (US)

(*) Notice: Subject to any disclaimer, the term of this patent is extended or adjusted under 35 U.S.C. 154(b) by 301 days.

(21) Appl. No.: 16/692,551

(22) Filed: Nov. 22, 2019

(65) Prior Publication Data

US 2020/0096672 A1 Mar. 26, 2020

Related U.S. Application Data

(63) Continuation of application No. PCT/US2018/034460, filed on May 24, 2018.
(Continued)

(51) Int. Cl.
*G02B 1/00* (2006.01)
*G02B 27/00* (2006.01)
(Continued)

(52) U.S. Cl.
CPC ............. *G02B 1/002* (2013.01); *G02B 1/02* (2013.01); *G02B 5/1842* (2013.01); *G02B 5/1857* (2013.01); *G02B 27/0037* (2013.01)

(58) Field of Classification Search
CPC . G02B 1/00; G02B 1/02; G02B 1/002; G02B 5/18; G02B 5/1842; G02B 5/1857;
(Continued)

(56) References Cited

U.S. PATENT DOCUMENTS 3,877,034 A 4/1975 Nelson
4,856,899 A 8/1989 Iwaoka et al.
(Continued)

FOREIGN PATENT DOCUMENTS

CA 3 006 173 A1 6/2017
CA 3 020 261 A1 10/2017
(Continued)

OTHER PUBLICATIONS

Genevet et al. "Recent advances in planar optics: from plasmonic to dielectric metasurfaces"; Optica, vol. 4, No. 1, Jan. 2017. (Year: 2017).*
(Continued)

*Primary Examiner* — Jie Lei
(74) *Attorney, Agent, or Firm* — Baker Botts L.L.P.

(57) ABSTRACT

Techniques for creating a replacement for optical elements with diffractive planar components based on metasurfaces are provided. In one example, a substantially flat optical component for lensing incoming electromagnetic radiation having at least one wavelength and a first phase into outgoing electromagnetic radiation having a second phase is provided.

16 Claims, 35 Drawing Sheets

Related U.S. Application Data

(60) Provisional application No. 62/510,670, filed on May 24, 2017.

(51) Int. Cl.
  *G02B 1/02* (2006.01)
  *G02B 5/18* (2006.01)

(58) Field of Classification Search
  CPC .. G02B 5/1828; G02B 5/1819; G02B 5/1847; G02B 5/00; G02B 5/008; G02B 27/00; G02B 27/0037; G02B 27/42; G02B 27/4211; G02B 3/0087; G02F 1/00; G02F 1/01; G02F 1/0018; G02F 1/0054; G02F 1/0009; G02F 1/0063; B82Y 10/00; B82Y 20/00; B82Y 30/00
  USPC ....... 359/565, 573, 566, 576, 315, 244, 238, 359/276, 275, 278–280; 977/773, 774, 977/712, 721, 723
  See application file for complete search history.

(56) References Cited

U.S. PATENT DOCUMENTS

| | | |
|---|---|---|
| 5,452,126 A | 9/1995 | Johnson |
| 6,097,856 A | 8/2000 | Hammond, Jr. |
| 6,731,839 B2 | 5/2004 | Bhagavatula et al. |
| 6,825,986 B2 | 11/2004 | Ashkinazy et al. |
| 6,924,457 B2 | 8/2005 | Koyama et al. |
| 6,927,922 B2 | 8/2005 | George et al. |
| 7,061,693 B2 | 6/2006 | Zalevsky |
| 7,171,078 B2 | 1/2007 | Sasaki et al. |
| 7,171,084 B2 | 1/2007 | Izumi et al. |
| 7,186,969 B2 | 3/2007 | Altendorf et al. |
| 7,241,988 B2 | 7/2007 | Gruber et al. |
| 7,324,210 B2 | 1/2008 | De Groot et al. |
| 7,327,468 B2 | 2/2008 | Maznev et al. |
| 7,402,131 B2 | 7/2008 | Mueth et al. |
| 7,450,618 B2 | 11/2008 | Dantus et al. |
| 7,547,874 B2 | 6/2009 | Liang |
| 7,561,264 B2 | 7/2009 | Treado et al. |
| 7,576,899 B2 | 8/2009 | Kanesaka et al. |
| 7,679,830 B2 | 3/2010 | Dowski, Jr. |
| 7,684,097 B2 | 3/2010 | Fukumoto et al. |
| 7,773,307 B2 | 8/2010 | Shih |
| 7,800,683 B2 | 9/2010 | Zalevsky et al. |
| 7,812,295 B2 | 10/2010 | Zalevsky et al. |
| 7,929,220 B2 | 4/2011 | Sayag |
| 7,965,607 B2 | 6/2011 | Fukumoto et al. |
| 8,009,358 B2 | 8/2011 | Zalevsky et al. |
| 8,040,604 B2 | 10/2011 | Zalevsky et al. |
| 8,107,705 B2 | 1/2012 | Dowski, Jr. et al. |
| 8,152,307 B2 | 4/2012 | Duelli et al. |
| 8,169,703 B1 | 5/2012 | Mossberg et al. |
| 8,192,022 B2 | 6/2012 | Zalevsky |
| 8,212,866 B2 | 7/2012 | Lemmer et al. |
| 8,318,386 B2 | 11/2012 | Kobrin |
| 8,351,048 B2 | 1/2013 | Millerd |
| 8,351,120 B2 | 1/2013 | Deng et al. |
| 8,390,932 B2 | 3/2013 | Jia et al. |
| 8,430,513 B2 | 4/2013 | Chang et al. |
| 8,451,368 B2 | 5/2013 | Sung et al. |
| 8,472,797 B2 | 6/2013 | Ok et al. |
| 8,558,873 B2 | 10/2013 | Mceldowney |
| 8,649,631 B2 | 2/2014 | Islam et al. |
| 8,681,428 B1 | 3/2014 | Brown |
| 8,687,040 B2 | 4/2014 | Silveira |
| 8,734,033 B2 | 5/2014 | Walters et al. |
| 8,816,460 B2 | 8/2014 | Kalevo et al. |
| 8,848,273 B2 | 9/2014 | Yu et al. |
| 8,876,289 B2 | 11/2014 | Dorronsoro Diaz et al. |
| 8,908,149 B2 | 12/2014 | Freimann |
| 8,912,973 B2 | 12/2014 | Werner et al. |
| 8,981,337 B1 | 3/2015 | Burckel et al. |
| 9,007,451 B2 | 4/2015 | Rogers et al. |
| 9,151,891 B2 | 10/2015 | Ma et al. |
| 9,212,899 B2 | 12/2015 | Johnson et al. |
| 9,298,060 B2 | 3/2016 | Shen et al. |
| 9,309,274 B2 | 4/2016 | Van Der Boom et al. |
| 9,310,535 B1 | 4/2016 | Greiner et al. |
| 9,329,484 B1 | 5/2016 | Markle et al. |
| 9,330,704 B2 | 5/2016 | Nishimura et al. |
| 9,367,036 B2 | 6/2016 | Pyun et al. |
| 9,369,621 B2 | 6/2016 | Malone et al. |
| 9,391,700 B1 | 7/2016 | Bruce et al. |
| 9,392,153 B2 | 7/2016 | Myhre et al. |
| 9,482,796 B2 | 11/2016 | Arbabi et al. |
| 9,500,771 B2 | 11/2016 | Putnam et al. |
| 9,606,415 B2 | 3/2017 | Zheludev et al. |
| 9,609,190 B2 | 3/2017 | Lee et al. |
| 9,766,463 B2 | 9/2017 | Border et al. |
| 9,778,404 B2 | 10/2017 | Divliansky et al. |
| 9,825,074 B2 | 11/2017 | Tian et al. |
| 9,829,700 B2 | 11/2017 | Parent et al. |
| 9,835,870 B2 | 12/2017 | Astratov et al. |
| 9,836,122 B2 | 12/2017 | Border |
| 9,869,580 B2 | 1/2018 | Grossinger et al. |
| 9,880,377 B1 | 1/2018 | Safrani et al. |
| 9,885,859 B2 | 2/2018 | Harris |
| 9,891,393 B2 | 2/2018 | Reece |
| 9,939,129 B2 | 4/2018 | Byrnes et al. |
| 9,947,118 B2 | 4/2018 | Khare et al. |
| 9,958,251 B1 | 5/2018 | Brock et al. |
| 9,967,541 B2 | 5/2018 | Piestun |
| 9,978,801 B2 | 5/2018 | Park et al. |
| 9,989,680 B2 | 6/2018 | Arbabi et al. |
| 9,995,859 B2 | 6/2018 | Kamali et al. |
| 9,995,930 B2 | 6/2018 | Arbabi et al. |
| 10,007,118 B2 | 6/2018 | Border |
| 10,054,859 B2 | 8/2018 | Ye et al. |
| 10,108,085 B2 | 10/2018 | Peters et al. |
| 10,126,466 B2 | 11/2018 | Lin et al. |
| 10,132,465 B2 | 11/2018 | Byrnes et al. |
| 10,149,612 B2 | 12/2018 | Muyo et al. |
| 10,254,454 B2 | 4/2019 | Klug et al. |
| 10,267,957 B2 | 4/2019 | Kamali et al. |
| 10,310,148 B2 | 6/2019 | Stewart et al. |
| 10,310,387 B2 | 6/2019 | Palmer et al. |
| 10,317,667 B2 | 6/2019 | Waller et al. |
| 10,324,314 B2 | 6/2019 | Czaplewski et al. |
| 10,338,275 B1 | 7/2019 | Acosta et al. |
| 10,341,640 B2 | 7/2019 | Shechtman et al. |
| 10,345,246 B2 | 7/2019 | Tian et al. |
| 10,345,519 B1 | 7/2019 | Miller et al. |
| 10,365,416 B2 | 7/2019 | Zhan et al. |
| 10,386,620 B2 | 8/2019 | Astratov et al. |
| 10,402,993 B2 | 9/2019 | Han et al. |
| 10,408,416 B2 | 9/2019 | Khorasaninejad et al. |
| 10,408,419 B2 | 9/2019 | Aieta et al. |
| 10,416,565 B2 | 9/2019 | Ahmed et al. |
| 10,440,244 B2 | 10/2019 | Rosenblatt et al. |
| 10,440,300 B2 | 10/2019 | Rephaeli et al. |
| 10,466,394 B2 | 11/2019 | Lin et al. |
| 10,468,447 B2 | 11/2019 | Akselrod et al. |
| 10,514,296 B2 | 12/2019 | Han et al. |
| 10,527,832 B2 | 1/2020 | Schwab et al. |
| 10,527,851 B2 | 1/2020 | Lin et al. |
| 10,536,688 B2 | 1/2020 | Haas et al. |
| 10,539,723 B2 | 1/2020 | Iazikov et al. |
| 10,545,323 B2 | 1/2020 | Schwab et al. |
| 10,816,815 B2 | 10/2020 | Aieta et al. |
| 11,092,717 B2 | 8/2021 | Capasso et al. |
| 2002/0048727 A1 | 4/2002 | Zhou et al. |
| 2002/0118903 A1 | 8/2002 | Cottrell et al. |
| 2003/0107787 A1 | 6/2003 | Bablumyan |
| 2005/0151698 A1 | 7/2005 | Mohamadi |
| 2005/0211665 A1 | 9/2005 | Gao et al. |
| 2005/0220162 A1 | 10/2005 | Nakamura |
| 2005/0239003 A1 | 10/2005 | Chiodini et al. |
| 2006/0042322 A1 | 3/2006 | Mendoza et al. |
| 2007/0026585 A1 | 2/2007 | Wong et al. |
| 2009/0230333 A1 | 9/2009 | Eleftheriades |
| 2009/0296223 A1 | 12/2009 | Werner et al. |

(56) References Cited

U.S. PATENT DOCUMENTS

| | | |
|---|---|---|
| 2010/0033701 A1 | 2/2010 | Lee et al. |
| 2010/0134869 A1 | 6/2010 | Bernet et al. |
| 2010/0187658 A1 | 7/2010 | Wei |
| 2010/0255428 A1 | 10/2010 | Chen et al. |
| 2011/0012807 A1 | 1/2011 | Sorvala |
| 2011/0019180 A1 | 1/2011 | Kruglick |
| 2012/0140235 A1 | 6/2012 | Lee et al. |
| 2012/0258407 A1 | 10/2012 | Sirat |
| 2012/0327666 A1 | 12/2012 | Liu et al. |
| 2012/0328240 A1 | 12/2012 | Ma et al. |
| 2013/0016030 A1 | 1/2013 | Liu et al. |
| 2013/0037873 A1 | 2/2013 | Suzuki et al. |
| 2013/0058071 A1 | 3/2013 | Ben Moshe |
| 2013/0208332 A1 | 8/2013 | Yu et al. |
| 2014/0085693 A1* | 3/2014 | Mosallaei ............ G02B 1/002 359/107 |
| 2015/0017466 A1 | 1/2015 | Ayon et al. |
| 2015/0055745 A1 | 2/2015 | Holzner et al. |
| 2015/0090862 A1 | 4/2015 | Matsui et al. |
| 2015/0092139 A1 | 4/2015 | Eguchi |
| 2015/0098002 A1 | 4/2015 | Wang |
| 2015/0116721 A1 | 4/2015 | Kats et al. |
| 2015/0219806 A1 | 8/2015 | Arbabi et al. |
| 2015/0241608 A1 | 8/2015 | Shian et al. |
| 2016/0025914 A1 | 1/2016 | Brongersma et al. |
| 2016/0077261 A1 | 3/2016 | Arbabi et al. |
| 2016/0161826 A1 | 6/2016 | Shen et al. |
| 2016/0195705 A1 | 7/2016 | Betzig et al. |
| 2016/0306079 A1 | 10/2016 | Arbabi et al. |
| 2016/0306157 A1 | 10/2016 | Rho et al. |
| 2016/0318067 A1 | 11/2016 | Banerjee et al. |
| 2016/0331457 A1 | 11/2016 | Varghese et al. |
| 2016/0341859 A1 | 11/2016 | Shvets et al. |
| 2016/0361002 A1 | 12/2016 | Palikaras et al. |
| 2016/0370568 A1 | 12/2016 | Toussaint et al. |
| 2017/0030773 A1 | 2/2017 | Han et al. |
| 2017/0038574 A1 | 2/2017 | Zhuang et al. |
| 2017/0082263 A1 | 3/2017 | Byrnes et al. |
| 2017/0090221 A1 | 3/2017 | Atwater |
| 2017/0125911 A1 | 5/2017 | Alu et al. |
| 2017/0131460 A1 | 5/2017 | Lin et al. |
| 2017/0146806 A1 | 5/2017 | Lin et al. |
| 2017/0250577 A1 | 8/2017 | Ho et al. |
| 2017/0299784 A1 | 10/2017 | Mikkelsen et al. |
| 2017/0329201 A1 | 11/2017 | Arnold |
| 2017/0374352 A1 | 12/2017 | Horesh |
| 2018/0035101 A1 | 2/2018 | Osterhout |
| 2018/0044234 A1 | 2/2018 | Hokansson et al. |
| 2018/0052276 A1 | 2/2018 | Klienman et al. |
| 2018/0107015 A1 | 4/2018 | Dümpelmann et al. |
| 2018/0129866 A1 | 5/2018 | Hicks et al. |
| 2018/0216797 A1 | 8/2018 | Khorasaninejad et al. |
| 2018/0217395 A1 | 8/2018 | Lin et al. |
| 2018/0231700 A1 | 8/2018 | Ahmed et al. |
| 2018/0236596 A1 | 8/2018 | Ihlemann et al. |
| 2018/0246262 A1 | 8/2018 | Zhan et al. |
| 2018/0248268 A1 | 8/2018 | Shvets et al. |
| 2018/0252857 A1 | 9/2018 | Glik et al. |
| 2018/0259700 A1 | 9/2018 | Khorasaninejad et al. |
| 2018/0259757 A1 | 9/2018 | Urzhumov |
| 2018/0267605 A1 | 9/2018 | Border |
| 2018/0274750 A1 | 9/2018 | Byrnes et al. |
| 2018/0314130 A1 | 11/2018 | Joo et al. |
| 2018/0341090 A1 | 11/2018 | Devlin et al. |
| 2019/0003892 A1 | 1/2019 | Aieta et al. |
| 2019/0025463 A1 | 1/2019 | She et al. |
| 2019/0025477 A1 | 1/2019 | She et al. |
| 2019/0041642 A1 | 2/2019 | Haddick et al. |
| 2019/0044003 A1 | 2/2019 | Heck et al. |
| 2019/0049632 A1 | 2/2019 | Shin et al. |
| 2019/0049732 A1 | 2/2019 | Lee et al. |
| 2019/0057512 A1 | 2/2019 | Han et al. |
| 2019/0064532 A1 | 2/2019 | Riley, Jr. et al. |
| 2019/0086579 A1 | 3/2019 | Kim et al. |
| 2019/0086683 A1 | 3/2019 | Aieta et al. |
| 2019/0101448 A1 | 4/2019 | Lee et al. |
| 2019/0113775 A1 | 4/2019 | Jang et al. |
| 2019/0120817 A1 | 4/2019 | Anderson |
| 2019/0121004 A1 | 4/2019 | Ahmed et al. |
| 2019/0137075 A1 | 5/2019 | Aieta et al. |
| 2019/0137793 A1 | 5/2019 | Luo et al. |
| 2019/0154877 A1 | 5/2019 | Capasso et al. |
| 2019/0170655 A1 | 6/2019 | Smith |
| 2019/0206136 A1 | 7/2019 | West et al. |
| 2019/0219835 A1 | 7/2019 | Skinner et al. |
| 2019/0235139 A1 | 8/2019 | Chen et al. |
| 2019/0250107 A1 | 8/2019 | Sreenivasan et al. |
| 2019/0369401 A1 | 12/2019 | Rolland et al. |
| 2019/0377084 A1 | 12/2019 | Sleasman et al. |
| 2019/0391378 A1 | 12/2019 | Eichelkraut et al. |
| 2020/0025888 A1 | 1/2020 | Jang et al. |
| 2020/0096672 A1 | 3/2020 | Yu et al. |
| 2021/0109364 A1 | 4/2021 | Aieta et al. |

FOREIGN PATENT DOCUMENTS

| | | |
|---|---|---|
| CN | 101158727 A | 4/2008 |
| CN | 100476504 C | 4/2009 |
| CN | 101510013 B | 6/2010 |
| CN | 101510012 B | 8/2010 |
| CN | 101510011 B | 9/2010 |
| CN | 202854395 U | 4/2013 |
| CN | 103092049 A | 5/2013 |
| CN | 203799117 U | 8/2014 |
| CN | 204422813 U | 6/2015 |
| CN | 104932043 A | 9/2015 |
| CN | 204719330 U | 10/2015 |
| CN | 105068396 A | 11/2015 |
| CN | 103869484 B | 1/2016 |
| CN | 105223689 A | 1/2016 |
| CN | 105278026 A | 1/2016 |
| CN | 105278309 A | 1/2016 |
| CN | 105676314 A | 6/2016 |
| CN | 103257441 B | 10/2016 |
| CN | 205620619 U | 10/2016 |
| CN | 104834079 B | 4/2017 |
| CN | 104834089 B | 6/2017 |
| CN | 106200276 B | 10/2017 |
| CN | 104834088 B | 12/2017 |
| CN | 105676314 B | 1/2018 |
| CN | 107561857 A | 1/2018 |
| CN | 108089325 A | 5/2018 |
| CN | 108291983 A | 7/2018 |
| CN | 207623619 U | 7/2018 |
| CN | 106199997 B | 8/2018 |
| CN | 108474869 A | 8/2018 |
| CN | 108507542 A | 9/2018 |
| CN | 207923075 U | 9/2018 |
| CN | 108680544 A | 10/2018 |
| CN | 108761779 A | 11/2018 |
| CN | 109000692 A | 12/2018 |
| CN | 208270846 U | 12/2018 |
| CN | 109196387 A | 1/2019 |
| CN | 106199956 B | 2/2019 |
| CN | 109360139 A | 2/2019 |
| CN | 106950195 B | 5/2019 |
| CN | 106324832 B | 7/2019 |
| CN | 106526730 B | 7/2019 |
| CN | 106485761 B | 8/2019 |
| CN | 110160685 A | 8/2019 |
| CN | 110678773 A | 1/2020 |
| CN | 111316138 A | 6/2020 |
| DE | 102007058558 A1 | 6/2009 |
| DE | 102009037629 A1 | 2/2011 |
| DE | 102012212753 A1 | 1/2014 |
| DE | 102015221985 A1 | 5/2017 |
| DE | 102016218996 A1 | 9/2017 |
| DE | 112018002811 T5 | 2/2020 |
| DE | 112018002670 T5 | 3/2020 |
| EP | 1 251 397 A2 | 10/2002 |
| EP | 1 252 623 B1 | 10/2004 |
| EP | 2 338 114 B1 | 3/2017 |
| EP | 3 226 042 A1 | 10/2017 |
| EP | 3 353 578 A1 | 8/2018 |

(56) References Cited

FOREIGN PATENT DOCUMENTS

| | | |
|---|---|---|
| EP | 3 380 876 A1 | 10/2018 |
| EP | 3 385 770 A1 | 10/2018 |
| EP | 3440484 A1 | 2/2019 |
| EP | 3 504 566 A2 | 7/2019 |
| EP | 3631533 A1 | 4/2020 |
| GB | 2499869 B | 3/2018 |
| GB | 2578049 A | 4/2020 |
| GB | 2578233 A | 4/2020 |
| GB | 2578236 A | 4/2020 |
| JP | 2005-274847 A | 10/2005 |
| JP | 2015-092234 A | 5/2015 |
| JP | 2017-062373 A | 3/2017 |
| JP | 2018-536204 A | 12/2018 |
| JP | 2018-537804 A | 12/2018 |
| JP | 2019-516128 A | 6/2019 |
| KR | 10-2007-0045004 A | 5/2007 |
| KR | 20080099452 A | 11/2008 |
| KR | 20080103149 A | 11/2008 |
| KR | 20090002583 A | 1/2009 |
| KR | 101493928 B1 | 3/2015 |
| KR | 20170015109 A | 2/2017 |
| KR | 20180083885 A | 7/2018 |
| KR | 20180121309 A | 11/2018 |
| KR | 20180124106 A | 11/2018 |
| KR | 101905444 B1 | 12/2018 |
| KR | 102036640 B1 | 10/2019 |
| KR | 10-20200008630 A | 1/2020 |
| SG | 11201804346P A | 6/2018 |
| SG | 11201808772W A | 11/2018 |
| TW | 201908232 A | 3/2019 |
| WO | WO 2007/141788 A2 | 12/2007 |
| WO | WO 2009/124181 A2 | 10/2009 |
| WO | WO 2011/106553 A2 | 9/2011 |
| WO | WO 2011/106553 A3 | 9/2011 |
| WO | WO 2012/144997 A1 | 10/2012 |
| WO | WO 2012/172366 A1 | 12/2012 |
| WO | WO 2013/033591 A1 | 3/2013 |
| WO | WO 2015/077926 A1 | 6/2015 |
| WO | WO 2015/112939 A1 | 7/2015 |
| WO | WO 2016/051325 A1 | 4/2016 |
| WO | WO 2016/086204 A1 | 6/2016 |
| WO | WO 2016/140720 A2 | 9/2016 |
| WO | WO 2016/140720 A3 | 9/2016 |
| WO | WO 2016/168173 A1 | 10/2016 |
| WO | WO 2016/191142 A2 | 12/2016 |
| WO | WO 2017/005709 A1 | 1/2017 |
| WO | WO 2017/034995 A1 | 3/2017 |
| WO | WO 2017/040854 A1 | 3/2017 |
| WO | WO 2017/053309 A1 | 3/2017 |
| WO | WO 2017/091738 A1 | 6/2017 |
| WO | WO 2017/176921 A1 | 10/2017 |
| WO | WO 2018/063455 A1 | 4/2018 |
| WO | WO 2018/063455 A9 | 4/2018 |
| WO | WO 2018/067246 A2 | 4/2018 |
| WO | WO 2018/067246 A3 | 4/2018 |
| WO | WO 2018/118984 A1 | 6/2018 |
| WO | WO 2018/134215 A1 | 7/2018 |
| WO | WO 2018/142339 A1 | 8/2018 |
| WO | WO 2018/204856 A1 | 11/2018 |
| WO | WO 2018/218063 A1 | 11/2018 |
| WO | WO 2018/219710 A1 | 12/2018 |
| WO | WO 2018/222944 A1 | 12/2018 |
| WO | WO 2019/015735 A1 | 1/2019 |
| WO | WO 2019/039241 A1 | 2/2019 |
| WO | WO 2019/043016 A1 | 3/2019 |
| WO | WO 2019/046827 A1 | 3/2019 |
| WO | WO 2019/057907 A1 | 3/2019 |
| WO | WO2019/075335 A1 | 4/2019 |
| WO | WO 2019/101750 A2 | 5/2019 |
| WO | WO 2019/103762 A2 | 5/2019 |
| WO | WO 2019/103762 A3 | 5/2019 |
| WO | WO 2019/103762 A9 | 5/2019 |
| WO | WO 2019/108290 A1 | 6/2019 |
| WO | WO 2019/116364 A1 | 6/2019 |
| WO | WO 2019/118646 A1 | 6/2019 |
| WO | WO 2019/119025 A1 | 6/2019 |
| WO | WO 2019/136166 A1 | 7/2019 |
| WO | WO 2019/148200 A1 | 8/2019 |
| WO | WO 2019/164542 A1 | 8/2019 |
| WO | WO 2019/164849 A1 | 8/2019 |
| WO | WO 2019/173357 A1 | 9/2019 |
| WO | WO 2019/198568 A1 | 10/2019 |
| WO | WO 2019/203876 A2 | 10/2019 |
| WO | WO 2019/204667 A1 | 10/2019 |
| WO | WO 2019/206430 A1 | 10/2019 |
| WO | WO 2020/001938 A1 | 1/2020 |
| WO | WO 2020/214617 A1 | 10/2020 |

OTHER PUBLICATIONS

Aieta et al., "Aberration-Free Ultra-thin Flat Lenses and AXicons at Telecom Wavelengths Based on Plasmonic Metasurfaces," Nano Lett., Web publication date Aug. 2012, 12(9):4932-4936.

Aieta et al., "Aberrations of flat lenses and aplanatic metasurfaces," Optics Express 21(25):31530-31539 (2013).

Aieta et al., "Multiwavelength Achromatic Metasurfaces by Dispersive Phase Compensation," Science Express Reports, Feb. 19, 2015, 15 pgs.

Aieta et al., "Out-of-Plane Reflection and Refraction of Light by Anisotropic Optical Antenna Metasurfaces with Phase Discontinuities," Nano Letters 12: 1702-1706 (2012).

Arbabi et al., "Dielectric Metasurfaces for Complete Control of Phase and Polarization with Subwavelength Spatial Resolution and High Transmission," Nature Nanotechnology, Aug. 31, 2015, 27 pgs.

Arbabi et al., "Miniature optical planar camera based on a wide-angle metasurface doublet corrected for monochromatic aberrations," Nature Communications, 7:13682 (2016).

Arbabi et al., "Subwavelength-thick lenses with high numerical apertures and large efficiency based on high-contrast transmit arrays," Nature Communications 6:7069 (2015) 6 pages.

Blanchard et al., "Modeling nanoscale V-shaped antennas for the design of optical phased arrays," Phys. Rev. B 85:155457 (2012).

Born et al., Principles of Optics, 7th ed. (Cambridge University, 1999).

Buralli et al., "Optical Performance of Holographic Kinoforms," Applied Optics 28(5):976-983 (1989).

Byrnes et al., "Designing large, high-efficiency, high-numerical-aperture, transmissive meta-lenses for visible light," Optics Express, 24(5):5110-5124 (2016).

Campione et al., "Tailoring dielectric resonator geometries for directional scattering and Huygens' metasurfaces," Optics Express 23(3):2293-2307 (2014).

Chen et al., "A broadband achromatic metalens for focusing and imaging in the visible," Nature Nanotechnology 13(3):220-226 (2018).

Chen et al., "A review of metasurfaces: physics and applications," Reports on Progress in Physics 79:076401 (2016).

Chen et al., "High-Efficiency Broadband Meta-Hologram with Polarization-Controlled Dual Images," Nano Letters 14:225 (2014) 6 pages.

Chen et al., "Immersion Meta-Lenses at Visible Wavelengths for Nanoscale Imaging," Nano Letters 17(5):3188-3194 (2017).

Chinese Patent Application No. 201680077924.9, Office Action dated Aug. 30, 2019, 7 pgs.

Chinese Patent Application No. 201680077924.9, Search Report dated Aug. 30, 2019, 1 Page.

Chinese Patent Application No. 201780031669.9, Office Action dated Mar. 4, 2020, 36 pgs.

Chinese Patent Application No. 201780031669.9, Search Report dated Feb. 25, 2020, 4 pgs.

Decker et al., "High-efficiency light-wave control with all-dielectric optical Huygens' metasurfaces," arXiv:1405.5038, 2014, 17 pages.

Devlin et al., "Arbitrary spin-to-orbital angular momentum conversion of light," Science 358:896-901 (2017).

Devlin et al., "Broadband high-efficiency dielectric metasurfaces for the visible spectrum," Proceedings of the National Academy of Sciences of USA 113(38):10473-10478 (2016).

(56) References Cited

OTHER PUBLICATIONS

Devlin et al., "High efficiency dielectric metasurfaces at visible wavelengths," http://arxiv.org/ftp/arxiv/papers/1603/1603.02735.pdf, 2016, pp. 1-18.
Ding et al., "Gradient metasurfaces: fundamentals and applications," Arxiv.Org, Cornell University Library, Apr. 10, 2017, 83 Pgs.
Dong et al., "Zero-index photonic crystal as low-aberration optical lens (Conference Presentation)," Proc. SPIE 9918, Metamaterials, Metadevices, and Metasystems, 991822 (2016).
Evlyukhin et al., "Optical response features of Si-nanoparticle arrays," Phys. Rev. B 82:045404 (2010).
Extended European Search Report dated Feb. 18, 2021 in Application No. EP 18805669.
Extended European Search Report for European Application 17858861.2, Report Completed Mar. 13, 2020, dated Mar. 23, 2020, 9 Pgs.
Extended European Search Report for European Application No. 17779772.7, Search completed Oct. 15, 2019, dated Oct. 25, 2019, 10 Pgs.
Extended European Search Report for European Application no. 16869282.0, Search completed Nov. 8, 2019, dated Nov. 20, 2019, 15 Pgs.
Fattal et al., "Flat Dielectric Grating Reflectors with High Focusing Power," Nature Photonics, 4:7 8 pages (2010).
Genevet et al., "Breakthroughs in Photonics 2013: Flat Optics: Wavefronts Control with Huygens' Interfaces," IEEE Photonics Journal, 6(2):1-4 (2014).
Genevet et al., "Recent advances in planar optics: from plasmonic to dielectric metasurfaces," Optica 4(1):14 pgs. (2017).
Groever et al., "Meta-Lens Doublet in the Visible Region," Nano Letters 17:4902-4907 (2017).
Hartwig et al., "Challenges for Reducing the Size of Laser Activated Remote Phosphor Light Engines for DLP Projection," Proceedings of SPIE, International Optical Design Conference, Dec. 17, 2014, vol. 9293, pp. 929313-1 to 929313-6.
International Preliminary Report on Patentability for International Application No. PCT/US2012/053434, Report dated Mar. 4, 2014, dated Mar. 13, 2014, 6 Pgs.
International Preliminary Report on Patentability for International Application No. PCT/US2018/035502, Report dated Dec. 3, 2019, dated Dec. 12, 2019, 7 Pgs.
International Preliminary Report on Patentability for International Application No. PCT/US2018/038357, Report dated Dec. 24, 2019, dated Jan. 2, 2020, 6 Pgs.
International Preliminary Report on Patentability for International Application No. PCT/US2018/031204, Report dated Nov. 5, 2019, dated Nov. 14, 2019, 8 Pgs.
International Preliminary Report on Patentability for International Application No. PCT/US2016/063617, Report dated May 29, 2018, dated Jun. 7, 2018, 6 Pgs.
International Preliminary Report on Patentability for International Application No. PCT/US2015/064930, Report dated Jun. 13, 2017, dated Jun. 22, 2017, 8 Pgs.
International Preliminary Report on Patentability for International Application PCT/US2017/048469, Report dated Feb. 26, 2019, dated Mar. 7, 2019, 5 Pgs.
International Preliminary Report on Patentability for International Application PCT/US2017/036897, Report dated Dec. 11, 2018, dated Dec. 20, 2018, 8 Pgs.
International Preliminary Report on Patentability for International Application No. PCT/US2017/026206, Report dated Oct. 9, 2018, dated Oct. 18, 2018, 8 Pgs.
International Preliminary Report on Patentability for International Application PCT/US2016/052685, Report dated Mar. 27, 2018, dated Apr. 5, 2018, 8 Pgs.
International Preliminary Report on Patentability for International Application PCT/US2018/034460, Report dated Nov. 26, 2019, dated Dec. 5, 2019, 06 Pgs.
International Preliminary Report on Patentability for International Application PCT/US2018/049276, Report dated Mar. 3, 2020, dated Mar. 12, 2020, 8 Pgs.
International Preliminary Report on Patentability for International Application No. PCT/US2018/046947, dated Feb. 18, 2020, dated Feb. 27, 2020, 6 Pgs.
International Search Report and Written Opinion for International Application No. PCT/US2012/053434, Search completed Oct. 17, 2012, dated Dec. 17, 2012, 7 Pgs.
International Search Report and Written Opinion for International Application No. PCT/US2015/064930, Search completed Sep. 9, 2016, dated Sep. 20, 2016, 11 Pgs.
International Search Report and Written Opinion for International Application No. PCT/US2016/052685, Search completed Nov. 30, 2016, dated Dec. 9, 2016, 12 Pgs.
International Search Report and Written Opinion for International Application No. PCT/US2016/063617, Search completed Jan. 19, 2017, dated Mar. 31, 2017, 9 Pgs.
International Search Report and Written Opinion for International Application No. PCT/US2017/036897, Search completed Jan. 31, 2018, dated Feb. 21, 2018, 9 Pgs.
International Search Report and Written Opinion for International Application No. PCT/US2017/026206, Search completed Jun. 10, 2017, dated Jun. 28, 2017, 11 Pgs.
International Search Report and Written Opinion for International Application No. PCT/US2017/048469, Search completed Apr. 20, 2018, dated May 4, 2018, 9 Pgs.
International Search Report and Written Opinion for International Application No. PCT/US2018/031204, Search completed Jun. 29, 2018, dated Jul. 23, 2018, 14 Pgs.
International Search Report and Written Opinion for International Application No. PCT/US2018/034460, Search completed Jul. 29, 2018, dated Aug. 24, 2018, 10 Pgs.
International Search Report and Written Opinion for International Application No. PCT/US2018/046947, Search completed Oct. 14, 2019, dated Oct. 25, 2019, 10 Pgs.
International Search Report and Written Opinion for International Application No. PCT/US2018/035502, Search completed Jul. 31, 2018, dated Aug. 24, 2018, 13 Pgs.
International Search Report and Written Opinion for International Application No. PCT/US2018/049276, Search completed Oct. 26, 2018, dated Jan. 15, 2019, 12 Pgs.
International Search Report and Written Opinion for International Application No. PCT/US2018/038357, Search completed Apr. 9, 2019, dated May 13, 2019, 12 Pgs.
Jackson, Classical Electrodynamics, $3^{rd}$ Edition, Wiley, New York, 1999 (8 pages).
Jin et al., "Advances in Particle Swarm Optimization for Antenna Designs: Real-Number, Binary, Single-Objective and Multiobjective Implementations," IEEE Trans. Antenn. Propag, 55(3):556-567 (2007).
Jin et al., "Waveforms for Optimal Sub-keV High-Order Harmonics with Synthesized Two- or Three-Colour Laser Fields," Nature Communications 5:4003 (2014) 6 pages.
Kats et al., "Giant birefringence in optical antenna arrays with widely tailorable optical anisotropy," Proc. Natl. Acad. Science 109(31):12364-12368 (2012).
Khorasaninejad et al., "Achromatic Metalens over 60 nm Bandwidth in the Visible and Metalens with Reverse Chromatic Dispersion," Nano Letters, Jan. 26, 2017, vol. 17, No. 3, pp. 1819-1824.
Khorasaninejad et al., "Achromatic Metasurface Lens at Telecommunication Wavelengths," Nano Letters, Jul. 13, 2015, 15(8):5358-5362.
Khorasaninejad et al., "Broadband and chiral binary dielectric meta-holograms," Science Advances, 2(5):6 pages (2016).
Khorasaninejad et al., "Broadband Multifunctional Efficient Meta-Gratings Based on Dielectric Waveguide Phase Shifters," Nano Letters, 15(10):6709-6715 (2015).
Khorasaninejad et al., "Metalenses at visible wavelengths: Diffraction-limited focusing and subwavelength resolution imaging," Science 352(6290):1190-1194 (2016).
Khorasaninejad et al., "Multispectral Chiral Imaging with a Metalens," Nano Letters 16:4595-4600 (2016).
Khorasaninejad et al., "Planar Lenses at Visible Wavelengths," Arxiv, May 7, 2016, 17 pages.

(56) References Cited

OTHER PUBLICATIONS

Khorasaninejad et al., "Polarization-Insensitive Metalenses at Visible Wavelengths," Nano Letters, 16(11):7229-7234 (2016).
Khorasaninejad et al., "Super-Dispersive Off-Axis Meta-Lenses for Compact High Resolution Spectroscopy," Nano Letters, 16:3732-3737 (2016).
Khorasaninejad et al., "Visible Wavelength Planar Metalenses Based on Titanium Dioxide," IEEE Journal of Selected Topics in Quantum Electronics 23(3):43-58 (2017).
Kildishev et al., "Planar Photonics with Metasurfaces," Science 339:1232009-1-1232009-6 (2013).
Kominami et al., "Dipole and Slot Elements and Arrays on Semi-Infinite Substrates," IEEE Ant. Prop. Trans., 334(6):600-607 (1985).
Krasnok et al., "All-dielectric optical nanoantennas," Optics Express, 20(18):20599-20604 (2012).
Li et al., "Achromatic Flat Optical Components via Compensation between Structure and Material Dispersions," Sci. Rep., 6:19885 (2016) 7 pages.
Li et al., "Flat metasurfaces to focus electromagnetic waves in reflection geometry," Optics Letters, 37(23):4940-4942 (2012).
Lin et al., "Dielectric gradient metasurface optical elements," Science 345:298-302 (2014).
Liu et al., "Realization of polarization evolution on higher-order Poincare sphere with metasurface," Applied Physics Letters, (2014) 4 pages.
Lo et al., "New Architecture for Space Telescopes Uses Fresnel Lenses," SPIE Newsroom, Aug. 9, 2006.
Lu et al., "Planar high-numerical-aperture low-loss focusing reflectors and lenses using subwavelength high contrast gratings," Optics Express 18(12):12606-12614 (2010).
Luk et al., Dielectric Resonator Antennas (Research Studies Press LTD, Hertfordshire, 2003.
Mao et al., "Nanopatterning Using a Simple Bi-Layer Lift-Off Process for the Fabrication of a Photonic Crystal Nanostructure," Nanotechnology, 24(085302) 8 pgs. (2013).
Mao et al., "Surface Patterning of Nonscattering Phosphors for Light Extraction," Optics Letters, 38(15):2796-2799 (2013).
Materials for High and Low Refractive Index Coatings, Sigma—Aldrich tech. www.sigmaaldrich.com/materials-science/organic-electronics/ri-coatings.html (3 pages). [Accessed on May 11, 2021].
Mercatili, "Dielectric Rectangular Waveguide and Directional Coupler for Integrated Optics," Bell Syst. Tech. J. pp. 2071-2102 (1969).
Miyazaki et al, "Ultraviolet-nanoimprinted packaged metasurface thermal emitters for infrared $CO_2$ sensing," Science and Technology of Advanced Materials 16:035005 (2015) 6 pgs.
Mongia, "Theoretical and experimental resonant frequencies of rectangular dielectric resonators," IEEE Proc.-H, 139(1):98-104 (1992).
Monticone et al., "Full Control of Nanoscale Optical Transmission with a Composite Metascreen," Phys. Rev. Lett, 110:203903 (2013) 5 pgs.
Mueller et al., "Geosynthetics in geoenvironmental engineering," Science and Technology of Advanced Materials 16(3):034605 (2015).
Ni et al., "Broadband Light Bending with Plasmonic Nanoantennas," Science, 335(6067):427 (2012).
Ni et al., "Ultra-thin, planar, Babinet-inverted plasmonic metalenses," Light: Science & Appl. 2:e72 (2013).
Okaya et al., "The Dielectric Microwave Resonator," Proc. IRE, 50:2081-2092 (1962).
Pacheco-Peña et al., "Epsilon-near-zero metalenses operating in the visible," Optics & Laser Technology 80:162-168 (2016).
Peinado et al., "Optimization and performance criteria of a Stokes polarimeter based on two variable retarders," Optics Express, 18(10):9815-9830 (2010).
Petosa et al., "Dielectric Resonator Antennas: A Historical Review and the Current State of the Art," IEEE Ant and Prop. Mag., 52(5):91-116 (2010).

Pfeiffer et al., "Metamaterial Huygens' Surfaces: Tailoring Wave Fronts with Reflectionless Sheets," Phys. Rev. Lett, 110:197401 (2013) 5 pgs.
Pors et al., "Broadband Focusing Flat Mirrors Based on Plasmonic Gradient Metasurfaces," Nano Letters 13(2):829-834 (2013).
Reichelt et al., "Capabilities of diffractive optical elements for real-time holographic displays," Proc of SPIE, 6912:69120P (2008) 12 pgs.
Saeidi et al., "Wideband plasmonic focusing metasurfaces," Applied Physics Letters, 105:053107 (2014) 5 pgs.
Sales et al., "Diffractive-Refractive Behavior of Kinoform Lenses," Applied Optics, 36:253-257 (1997).
Sancho-Parramon et al., "Optical characterization of $HfO_2$ by spectroscopic ellipsometry: Dispersion models and direct data inversion," Proc. of the EMRS 516:7990-7995 (2008).
She et al., "Large area metalenses: design, characterization, and mass manufacturing," Optics Express 26(2):1573-1585 (2018).
Sun et al., "High-Efficiency Broadband Anomalous Reflection by Gradient Meta-Surfaces," Nano Letters, 12:6223-6229 (2012).
Supplementary Partial European Search Report for European Application No. 16869282.0, Search completed Jun. 19, 2019, dated Jul. 2, 2019, 12 Pgs.
These Tiny, Incredible 'Metalenses' are the Next Giant Leap in Optics, PetaPixel, Jun. 3, 2016. pp. 1-5.
Vo et al., "Sub-Wavelength Grating Lenses with a Twist," IEEE Phot. Tech. Lett., 26(13):1375-1378 (2014).
Walther et al., "Spatial and Spectral Light Shaping with Metamaterials," Advanced Mat. 24:6300-6304 (2012).
Wang et al., "Generation of steep phase anisotropy with zero-backscattering by arrays of coupled dielectric nano-resonators," Appl. Phys. Lett., 105:121112 (2014) 6 pages.
Wu et al., "Spectrally selective chiral silicon metasurfaces based on infrared Fano resonances," Nature Communications, 5:3892, 9 pgs. (2014).
Xianzhong et al., "Dual-polarity plasmonic metalens for visible light," Nature Communications, 3:1198 (2012) 6 pgs.
Yang et al., "Design of ultrathin plasmonic quarter-wave plate based on period coupling," Optics Letters 38(5):679-681 (2013).
Yao et al., "Wide Wavelength Tuning of Optical Antennas on Graphene with Nanosecond Response Time," Nano Letters, 14:214-219 (2014).
Yu et al., "A Broadband, Background-Free Quarter-Wave Plate Based on Plasmonic Metasurfaces," Nano Letters, 12:6328-6333 (2012).
Yu et al., "Flat optics with designer metasurfaces," Nature Materials, 13:139-150 (2014).
Yu et al., "Flat optics: Controlling Wavefronts with Optical Antenna Metasurfaces," IEEE Journal of Selected Topics, 19(3):4700423, 23 pgs. (2013).
Yu et al., "Light Propagation with Phase Discontinuities: Generalized Laws of Reflection and Refraction," Science 334:333-337 (2011).
Zhao et al., "Mie resonance-based dielectric metamaterials," Materials Today, 12(12):60-69 (2009).
Zhao et al., "Recent advances on optical metasurfaces," Journal of Optics 16:123001 (2014) 14 pgs.
Zhao et al., "Twisted optical metamaterials for planarized ultrathin broadband circular polarizers," Nature Communications 3:870 (2012) 7 pages.
Zhou et al., "Plasmonic holographic imaging with V-shaped nanoantenna array," Optics Express 21(4):4348-4354 (2013).
Zhu et al., "Ultra-compact visible chiral spectrometer with metalenses," APL Photonics 2(3):036103, 13 pgs. (2017).
Zou et al., "Dielectric resonator nanoantennas at visible frequencies," Optics Express, 21(1):1344-1352 (2013).
Khorasaninej ad et al., "Silicon Nanofin Grating as a Miniature Chirality-Distinguishing Beam-Splitter," Nature Communications, 5:5386, 6 pages (2014).
Voelz, Computational Fourier Optics: A MATLAB® Tutorial, (SPIE Press, 2011). 252 pages.
Aieta et al., "Multiwavelength Achromatic Metasurfaces by Dispersive Phase Compensation," Science, 347(6228): 15 pages (2015).

(56) References Cited

OTHER PUBLICATIONS

Arbabi et al., "Controlling the sign of chromatic dispersion in diffractive optics with dielectric metasurfaces,"Optica 4(6):46 pages (2017).
Arbabi et al., "Multiwavelength metasurfaces through spatial multiplexing." Scientific Reports 6:32803 (2016) 8 pages.
Arbabi et al., "Multiwavelenth polarization-insensitive lenses based on dielectric metasurfaces with meta-molecules," Optica 3(6):628-633 (2016).
International Search Report dated Aug. 24, 2018 in International Application No. PCT/US18/34460.
Khorasaninej ad et al., "Achromatic Metalens over 60nm Bandwidth in the Visible and Metalens with Reverse Chromatic Dispersion." Nano Letters, 17(3): 19 pages (2017).
Yuan et al., "Design of mechanically robust metasurface lenses for RGB colors." ArXiV, (2017).
Shim et al., "Hard-tip, soft-spring lithography," Nature 469:516 (2011) 6 pgs.
Zhao et al., "Tailoring the dispersion of plasmonic nanorods to realize broadband optical meta-waveplates," Nano Lett. 13:1086-1091 (2013).

\* cited by examiner

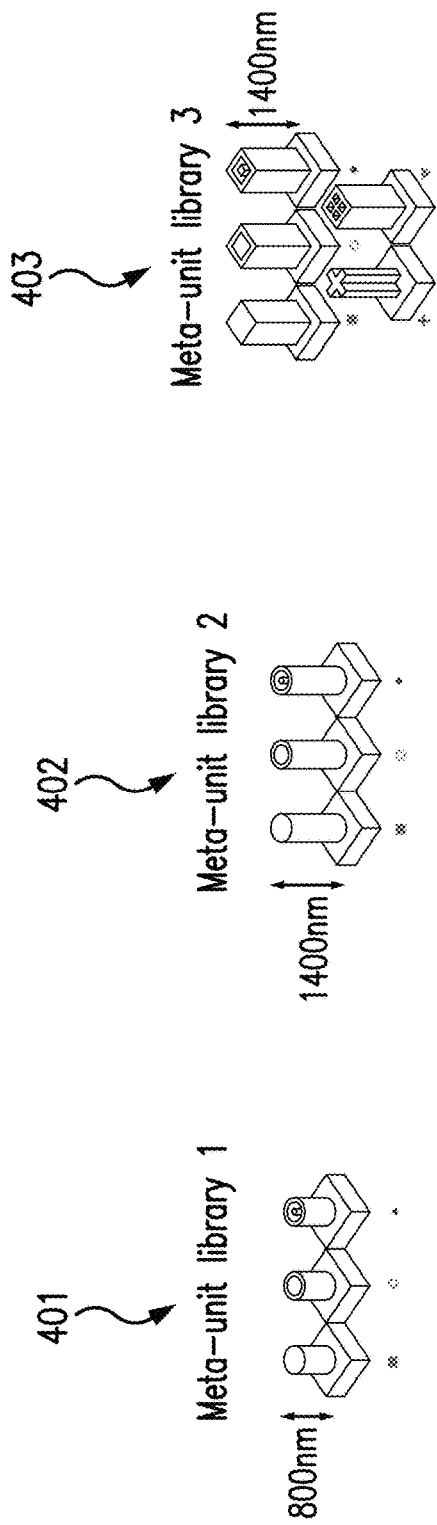
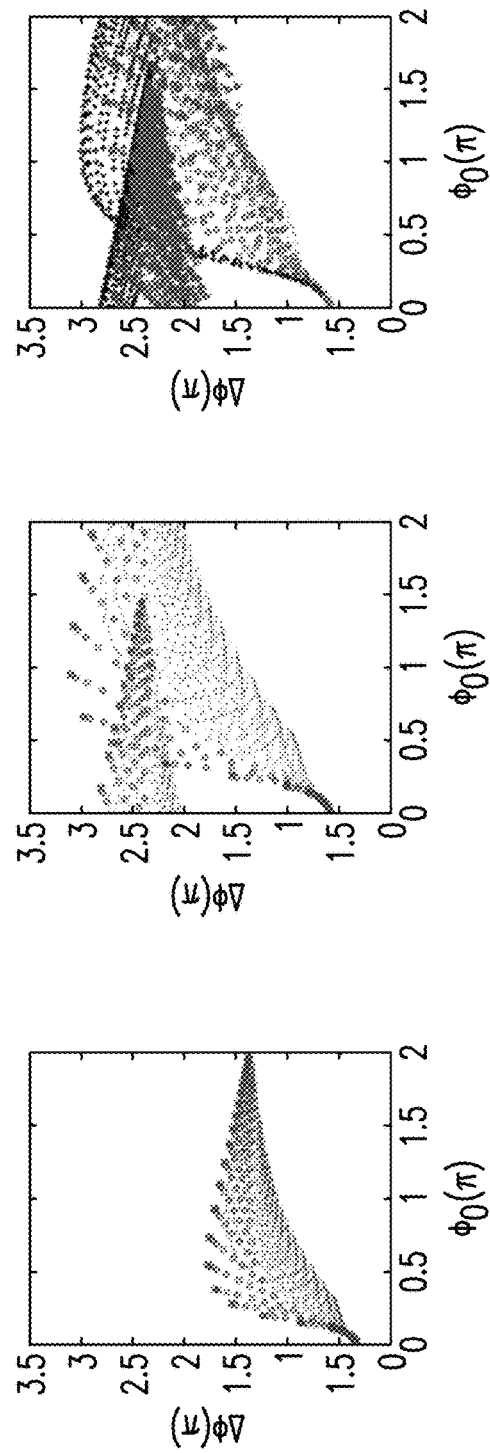
FIG. 4A
FIG. 4B

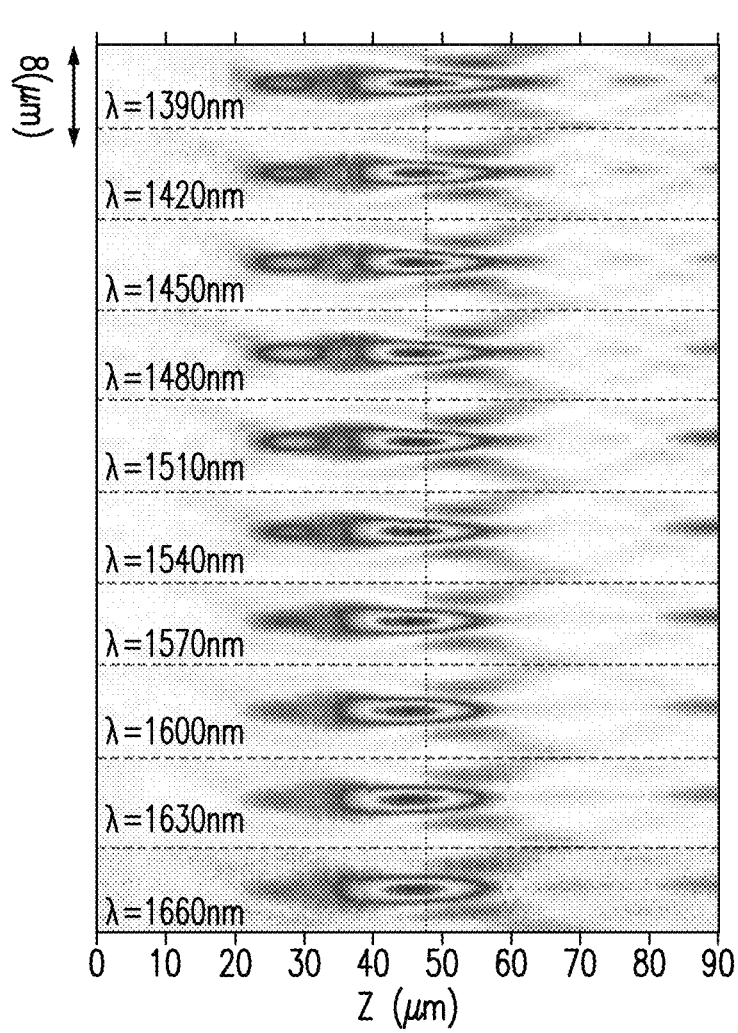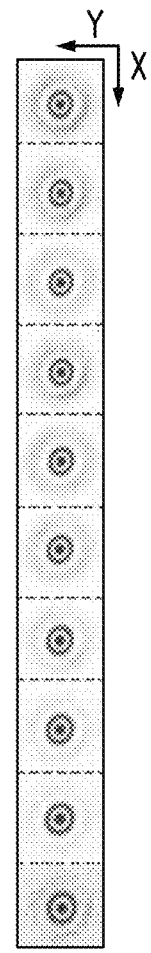
FIG. 11A
FIG. 11B

5 μm

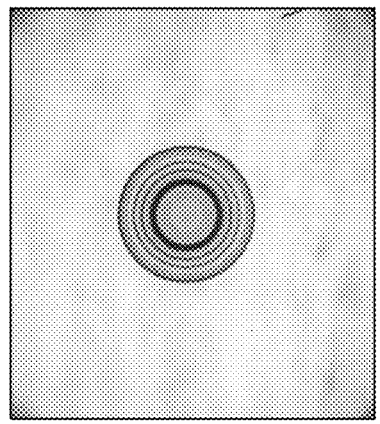 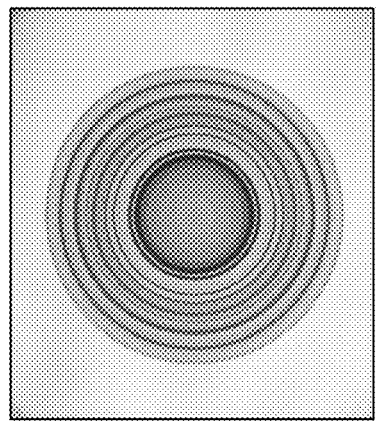 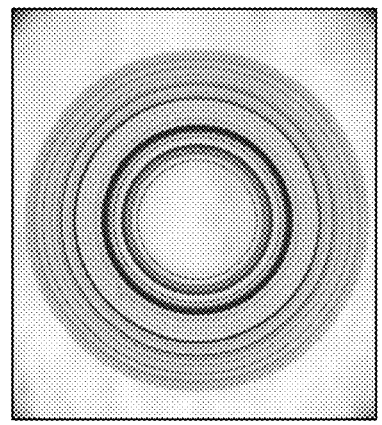
Diameter 0.8 mm  Diameter 1.6 mm  Diameter 2 mm
FIG. 31A  FIG. 31B  FIG. 31C
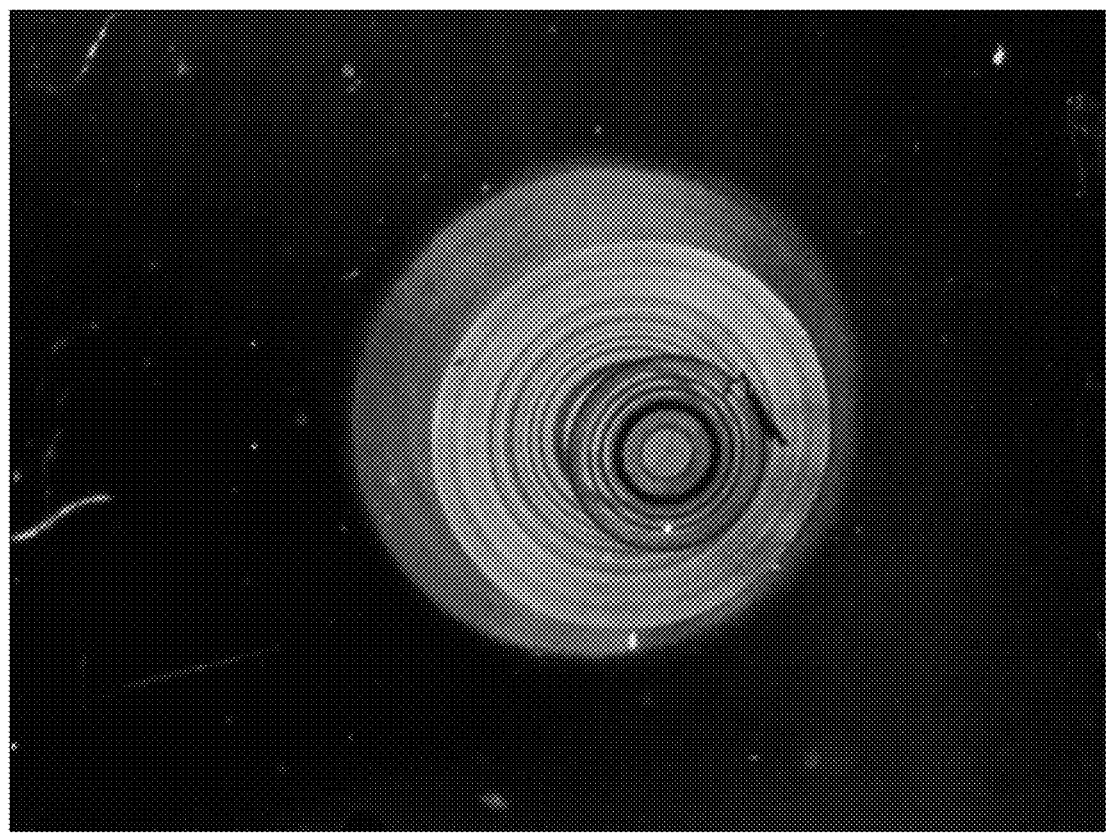
FIG. 32

Telecom diode laser (λ = 1550 nm)

Halogen lamp (entire near-IR spectrum)

Telecom diode laser ($\lambda = 1550$ nm)

Halogen lamp (entire near-IR spectrum)

BROADBAND ACHROMATIC FLAT OPTICAL COMPONENTS BY DISPERSION-ENGINEERED DIELECTRIC METASURFACES

CROSS-REFERENCE TO RELATED APPLICATIONS

This application is a continuation of PCT/US2018/034460, filed on May 24, 2018, which claims priority to U.S. Provisional Application Ser. No. 62/510,670 filed on May 24, 2017, the contents of which are incorporated by reference herein and from which priority is claimed.

NOTICE OF GOVERNMENT SUPPORT

This invention was made with government support under Contract Number HR0011-17-2-0017 awarded by the Defense Advanced Research Projects Agency and under Contract Number FA9550-14-1-0389 awarded by the Air Force Office of Scientific Research Multidisciplinary University Research Institute. The government has certain rights in the invention.

BACKGROUND

The replacement of bulk optical elements with diffractive planar components can solve certain weight and size constraints of optical devices. Certain optic devices suffer from large chromatic aberrations caused by lens dispersion. Metasurfaces can control optical wavefronts, and thus be used to realize flat metasurface lenses. Such lenses can reduce the size and complexity of certain imaging systems and realize new imaging modalities. Despite advances in metasurface fabrication techniques, certain optical devices made with metasurface lenses operate only at multiple or select wavelengths.

One challenge can be forming achromatic metalenses that produce the same focal length over a broad wavelength range. A second challenge can be forming broadband achromatic metalenses that work in the transmission mode for incident light waves with any arbitrary polarization state. Another challenge can be forming metalenses that can correct monochromatic aberrations, which cause degradation to imaging quality. There remains a need for improved techniques and systems for the metasurface lenses, which can correct both chromatic and monochromatic aberrations across a broad wavelength range, can control light with an arbitrary polarization state, and can work at either reflection or transmission mode.

SUMMARY

The disclosed subject matter provides techniques for creating a replacement for bulk optical elements with planar components based on metasurfaces.

In certain embodiments, a substantially flat optical component for lensing incoming electromagnetic radiation having at least one wavelength and a first phase profile into outgoing electromagnetic radiation having a second phase profile is provided. In certain examples, the optical components are made from a substrate and at least one metasurface. In certain examples, the optical components are made from several substrates and several metasurfaces. The metasurface can be made of a plurality of meta-units. Each meta-unit can be positioned at a distance that is less than the wavelength from at least a different optical meta-unit.

In accordance with some embodiments of the disclosed subject matter, each of the plurality of meta-units can have a certain shape to diffractively scatter the electromagnetic radiation. The plurality of meta-units can be configured to provide a range of optical phase and phase dispersion for a broadband achromatic metasurface lens.

In certain embodiments, the plurality of meta-units can be made of a dielectric material. This dielectric material can be, for example, silicon, silicon nitride, gallium nitride, or titanium dioxide. In certain embodiments, the plurality of meta-units can be made of a metallic material. This metallic material can be, for example, aluminum, copper, silver, or gold.

In accordance with another embodiment of the disclosed subject matter, the metasurface is made of a patterned film layer. The film layer can be between 100 and 10,000 nm in thickness. The metasurface can be manufactured with machinery and techniques compatible with complementary metal oxide semiconductor (CMOS) fabrication facilities.

In accordance with embodiments of the disclosed subject matter, the meta-units can be partially or fully embedded in the substrate. The meta-units can vary in height. The meta-units can change shape along the height direction (for example, mushroom shaped).

The disclosed subject matter also provides fabrication methods for implementing the techniques described above. An example method of making a substantially flat optical component for lensing incoming electromagnetic radiation having at least one wavelength and a first phase profile into outgoing electromagnetic radiation having a second phase profile includes positioning a substrate and forming at least one metasurface on the substrate. Another example method of making a substantially flat optical component includes patterning several metasurfaces on several substrates and assembling them into a stack.

In some embodiments, the fabrication methods can include forming a substrate layer and a patterned film layer thereon having a thickness between 100 and 10,000 nm. The patterning can use electron-beam lithography, photolithography, deep ultra-violet lithography, or imprint lithography. The fabrication methods can also include partially or fully embedding the meta-units in the substrate.

BRIEF DESCRIPTION OF THE DRAWINGS

Further features and advantages of the present disclosure will become apparent from the following detailed description taken in conjunction with the accompanying figures showing illustrative embodiments of the present disclosure, in which:

FIGS. 4A and 4B illustrate three example meta-unit libraries and the respective phase offset-dispersion space they can cover.

FIG. 6A is a plot of light intensity distributions on the longitudinal plane vs wavelength, and. FIG. 6B is a plot of light intensity distributions on the focal plane vs wavelength.

FIG. 7A is a plot of light intensity distributions on the longitudinal plane vs wavelength, and FIG. 7B is a plot of light intensity distributions on the focal plane vs wavelength.

FIG. 8A is a plot of light intensity distributions on the longitudinal plane vs wavelength, and FIG. 8B is a plot of light intensity distributions on the focal plane vs wavelength.

FIG. 9A is a plot of light intensity distributions on the focal plane vs wavelength in the top panel, and a plot of light intensity distributions on the longitudinal plane vs wavelength in the bottom panel, and FIG. 9B shows s line scans of light intensity along the axis of the metasurface lens vs wavelength.

FIG. 10A is a plot of light intensity distributions on the focal plane vs wavelength in the top panel and a plot of light intensity distributions on the longitudinal plane vs wavelength in the bottom panel, and FIG. 10B shows line scans of light intensity along the axis of the metasurface lens vs wavelength.

FIGS. 11A and 11B show measured far-field intensity distributions of a diverging metasurface lens with a diameter of 100 μm, focal distance of 50 μm, and numerical aperture (NA) of 0.7, where FIG. 11A is a plot of light intensity distributions on the longitudinal plane vs wavelength, and FIG. 11B is a plot of light intensity distributions on the focal plane vs wavelength.

FIGS. 31A-31C are optical images of the elements of an example metalens triplet.

FIG. 32 is an example assembled metalens triplet used for imaging.

It is to be understood that both the foregoing general description and the following detailed description are exemplary and are intended to provide further explanation of the disclosed subject matter.

DETAILED DESCRIPTION

The systems and methods described herein provide for flat optical components to perform the function of a lens without chromatic aberration over a continuous and broad wavelength range and without monochromatic aberration over a certain range of incident angle of light. The disclosed subject matter can include a metasurface device. In some embodiments, the disclosed subject matter can have a thin, i.e., having a thickness near or smaller than the operating wavelengths, surface composed of optical nano-scatterers ("meta-units") spaced at subwavelength distances. In certain embodiment, shapes and placement of the disclosed subject matter can be designed to diffractively scatter incoming light into a desired output.

The disclosed subject matter can alter phase of the outgoing light waves. For example, a spatial profile of phase can be designed to perform a specific function, and the metasurfaces can be engineered to provide the phase required for that function. The meta-units can be made of dielectric materials, such as Silicon and Titanium Dioxide, which can have large refractive index but zero or low optical losses.

Figure 1A:
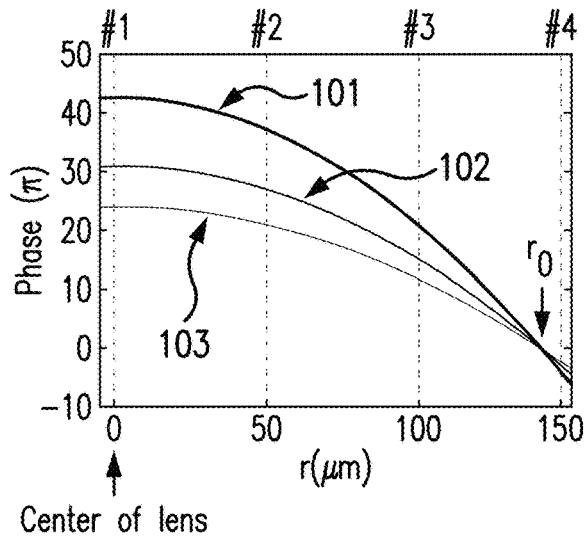
FIG. 1A shows plots of the phase required for a converging lens.
Figure 1B:
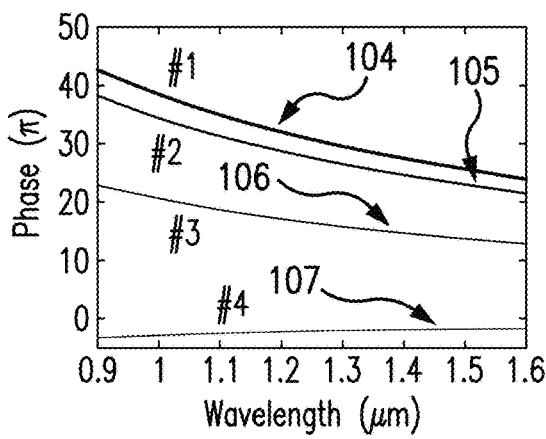
FIG. 1B shows plots of the phase required vs. wavelength at four locations labelled in (a)
Figure 1C:
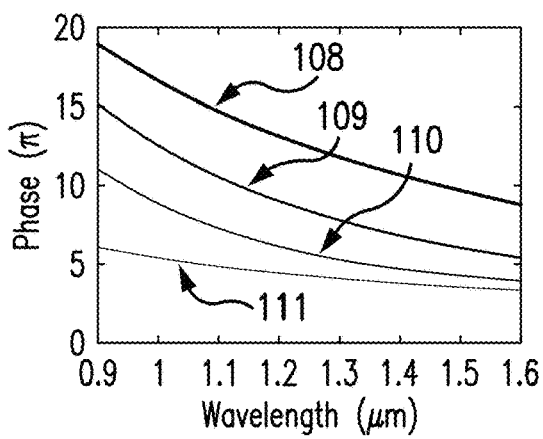
FIG. 1C shows plots of typical phase vs. wavelength response of four dielectric meta-units.

FIG. 1A provides plots of the phase required for a converging lens as a function of radial distance away from the center of the lens. Three wavelengths, shortest 101 (on top), intermediate 102 (in the middle), and longest 103 (on the bottom) are plotted for the free parameter $C(\lambda)$ given by the provided equations. The phase required at $r_0$ can be zero for all wavelengths. FIG. 1B provides plots of the phase required vs wavelength at four locations (shown in FIG. 1A) along the radius of the lens. The highest curve 104 has the greatest phase dispersion, the second highest curve 105 has the second highest phase dispersion, the third highest curve 106 has the third highest phase dispersion, and the lowest curve 107 has the lowest phase dispersion. The dispersion profile for the positions #1-3 with this choice of free parameter $C(\lambda)$ can decrease as a function of increasing wavelength, which can match with the phase profiles provided by the meta-units (shown in FIG. 1C). The highest curve 108 has the greatest phase dispersion, the second highest curve 109 has the second highest phase dispersion, the third highest curve 110 has the third highest phase dispersion, and the lowest curve 111 has the lowest phase dispersion. The phase profile required for broadband metasurface lenses is given by the equation $$\phi(r, \lambda) = -\frac{2\pi}{\lambda}\sqrt{f^2 + r^2} + C(\lambda) \tag{3}$$

$$\text{where } C(\lambda) = \frac{2\pi}{\lambda}\sqrt{f^2 + (r0)^2} \tag{4}$$

In some embodiments, a degree of freedom $C(\lambda)$ within the governing equation for a metasurface lens (its optical phase profile) can be modified so the required phase dispersion according to the governing equation can match with the phase dispersion naturally achievable by the meta-units. In some embodiments, an error minimization including both choice of meta-units and choice of governing equation can be carried out to reduce both amplitude and phase mismatch between the ideal and the achievable metasurface lenses. For example, the error between the meta-units achievable and the metasurface lens governing equation chosen can be reduced or minimized by allowing variable choice between both meta-units and governing equation.

Figure 2:
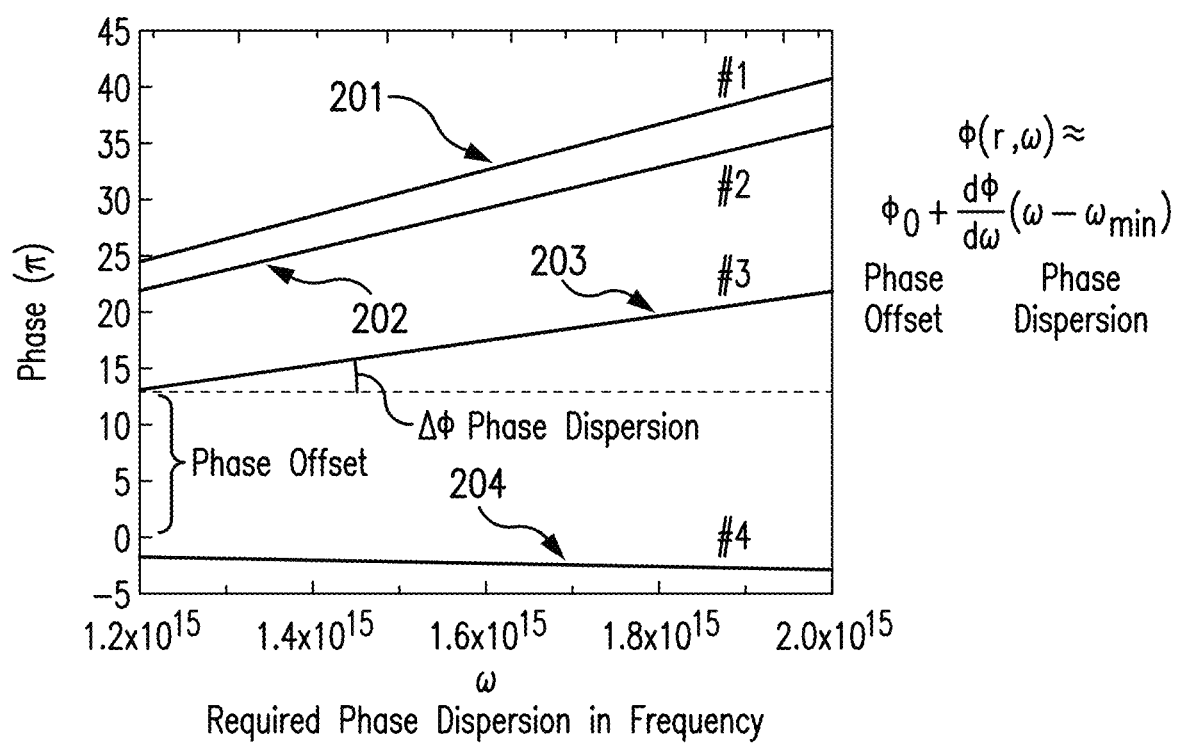
FIG. 2 is a plot of phase dispersion profiles required for building achromatic metasurface lenses.

FIG. 2 illustrates a plot of phase dispersion profiles 200 at four locations along the radius of an exemplary achromatic metasurface lens. The highest curve 201 has the greatest phase dispersion, the second highest curve 202 has the second highest phase dispersion, the third highest curve 203 has the third highest phase dispersion, and the lowest curve 204 has the lowest phase dispersion. The linear profiles can be parametrized by a Phase Offset term ($\Phi_0$) and the slope $$\left(\frac{d\phi}{d\omega}\right),$$

which represents the Phase Dispersion term.

Figure 3:
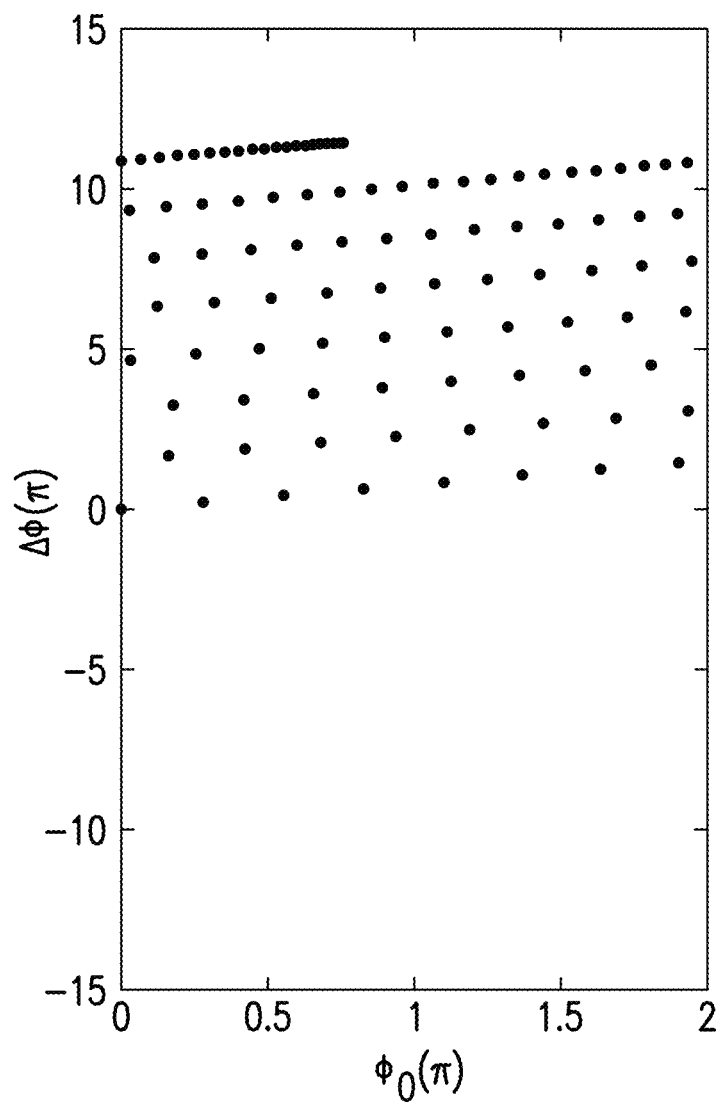
FIG. 3 is a plot showing Phase Offset and Phase Dispersion for creating a chromatic metasurface with focal length of 100 μm, radius of 50 μm, and operating wavelength range of 0.9-1.6 μm.
Figure 5A:
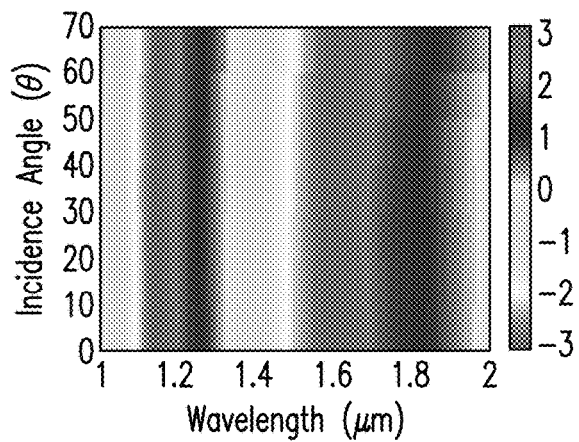
FIG. 5A is a diagram of a full-wave simulation showing the angular phase response of a sample meta-unit vs. wavelength.
Figure 5B:
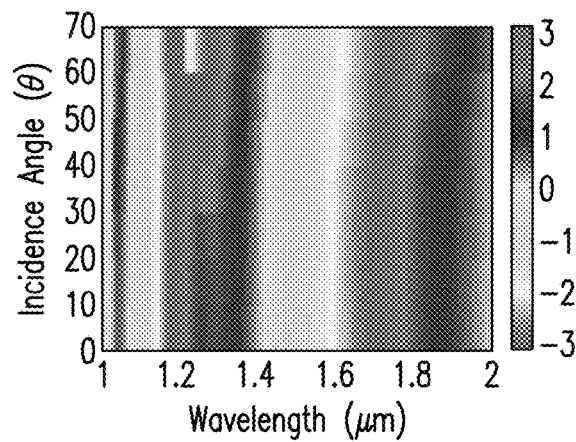
FIG. 5B is a diagram of a full-wave simulation showing the angular phase response of a sample meta-unit vs. wavelength.
Figure 5C:
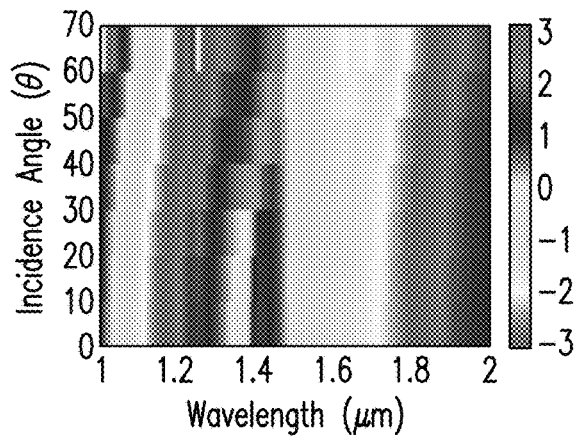
FIG. 5C is a diagram of a full-wave simulation showing the angular phase response of a sample meta-unit vs. wavelength.
Figure 5D:
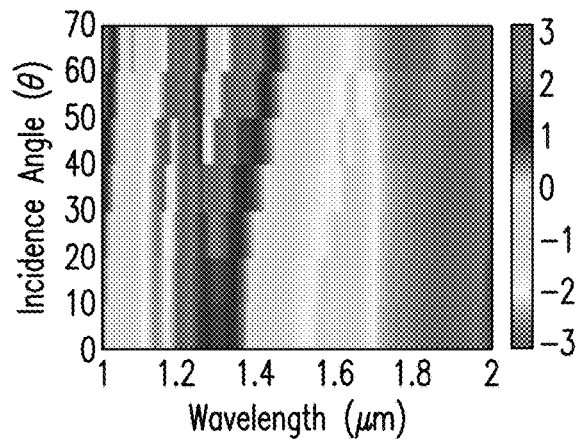
FIG. 5D is a diagram of a full-wave simulation showing the angular phase response of a sample meta-unit vs. wavelength.

FIG. 3, for the purpose of illustration and not limitation, provides a plot of phase offset-dispersion requirement space (represented by the area covered by dots) for a metasurface lens with focal length of 100 µm and radius of 50 µm with numerical aperture (NA) 0.44. The phase-offset can be wrapped over 0-2π interval. The free parameter $C(\omega)$ is given by the given equation with $r_0$=50 µm.

$$\phi(r, \lambda) = -\frac{2\pi}{\lambda}\sqrt{f^2 + r^2} + C(\lambda) \tag{5}$$

$$\text{where } C(\lambda) = \frac{2\pi}{\lambda}\sqrt{f^2 + (r0)^2} \tag{6}$$

$$\text{where } r0 = 50 \text{ µm} \tag{7}$$

FIG. 4A shows three meta-unit libraries and the phase offset-dispersion space they can cover. Each library contains a few meta-unit archetypes, each representing a sub-class of meta-units composed of the archetype's basic shape but with varying in-plane geometrical parameters. The meta-units are assumed to be made of amorphous silicon and patterned on a quartz substrate. In the phase offset-dispersion space, x-axis is phase of the lowest frequency (or largest wavelength, $\lambda$=1.6 µm), and y-axis is phase dispersion, $\Delta\Phi=d\phi/d\omega\times\Delta\omega$, for the chosen bandwidth $\Delta\omega$ (i.e., $\lambda$=1.2-1.6 µm). Meta-unit library 1 contains singular pillars, annular pillars, and concentric rings. The meta-units' height is 800 nm. Note the great expanse of coverage of the phase-dispersion space compared to only employing the conventional choice of singular pillars. Meta-unit library 2 has the same three meta-unit archetypes as meta-unit library 1 but the height of the meta-units is increased to 1,400 nm. The range of dispersion achieved is nearly doubled. Meta-unit library 3 keeps the same height as Meta-unit library 2 but switches to archetypes with four-fold symmetry instead of rotational symmetry. This switch expands the number of archetypes to include crosses and inscribed crosses. The coverage of the phase phase-dispersion space is further improved. FIG. 4B shows five exemplary meta-units with very different optical phase dispersion. The meta-units are effectively truncated waveguides. The first meta-unit shown in the first row of FIG. 4B is the most dispersive type of meta-units: the shorted wavelength has very good overlap with the meta-unit, which is a rod with intermediate radius, whereas the longest wavelength does not have as good an overlap. This creates a very dispersive phase response. The last meta-unit shown in the fifth row of FIG. 4B is the least dispersion type of meta-units: all the wavelengths have similar modal overlap with the meta-unit cross-section, which is a small annular ring.

The disclosed subject matter can introduce a range of novel meta-unit structures and can utilize them to provide the phase dispersion required for broadband functionality. In some embodiments, the meta-units can be distal from the center of the metasurface lens and contribute to the focal spot at large angles.

FIGS. 5A-5D show angular phase response of a few exemplary meta-units. The meta-units can be excited by plane waves at a direction normal to the surface of the substrate. The phase of forward scattered light can be monitored at a half circle centered at the meta-unit, and the radius of the circle can be many times the wavelength (far-field regime). Different observation angles can be indicated by θ. Each angular response diagram shows that the wavefronts of light scattered by the meta-units are not spherical in shape: the phase response along the substrate normal direction (θ=0) can be different from the phase response along θ=45-degree direction. Meta-units could be chosen according to their locations on a metasurface lens and their angular phase response.

The disclosed subject matter can include a multi-angle metasurface. The multi-angle metasurface can have different metasurface responses for different angles of incident. In some embodiments, the disclosed subject matter can be utilized to remove focal plane aberrations, to concentrate solar rays to one spot or to capture all incident angles of a small footprint on-chip detector.

Figure 6A:
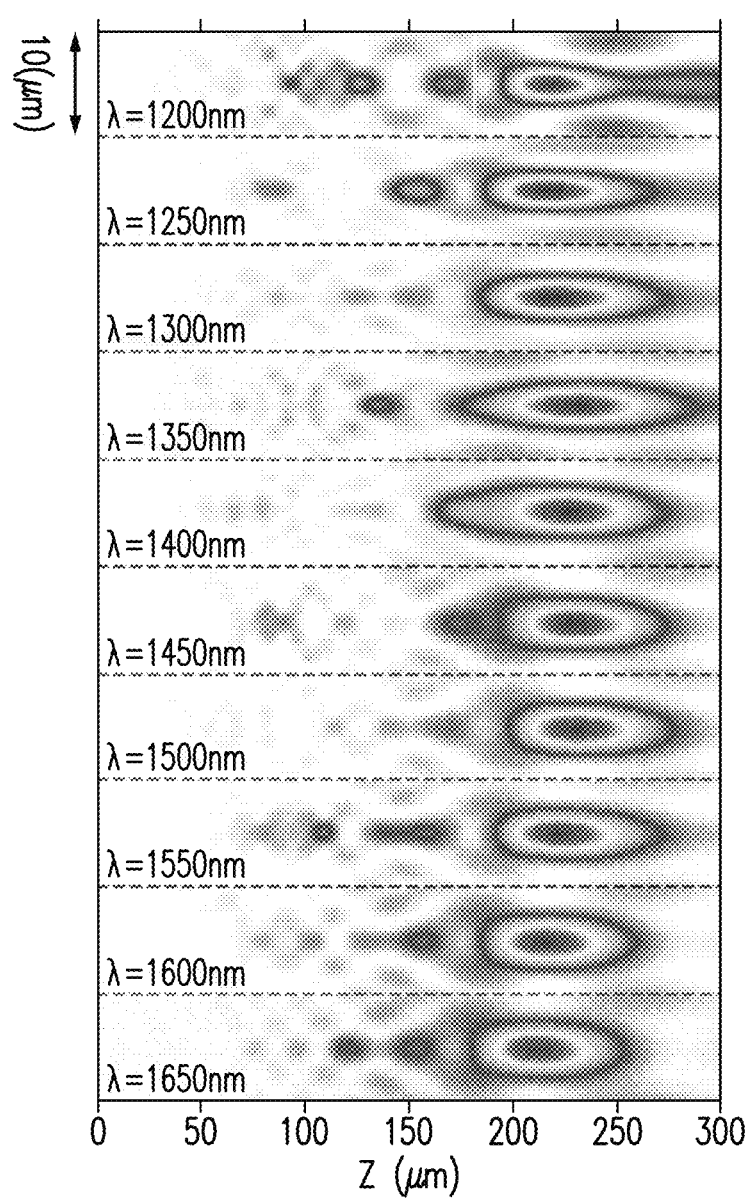
FIGS. 6A and 6B show measured far-field intensity distributions of a focusing metasurface lens with a diameter of 100 μm and numerical aperture (NA) of 0.24, where
Figure 6B:
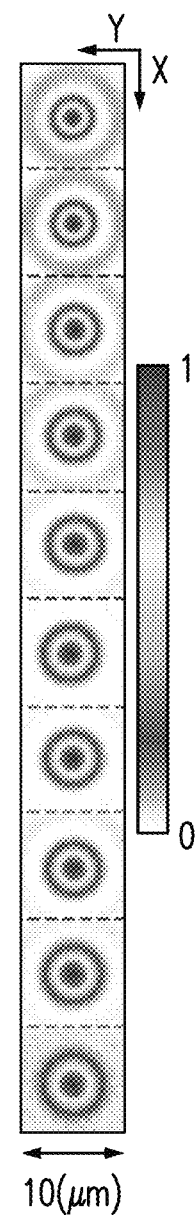

FIGS. 6A-6B, for the purpose of illustration and not limitation, show measured far-field intensity distributions of a focusing metasurface lens with a diameter of 100 μm and numerical aperture (NA) of 0.24. FIG. 6A shows measured light intensity distributions on the longitudinal plane, showing achromatic focusing over a wide range of wavelengths. FIG. 6B shows measured light intensity distributions on the focal plane, showing that diffraction limited focal spots are obtained over a wide range of wavelengths.

Figure 7A:
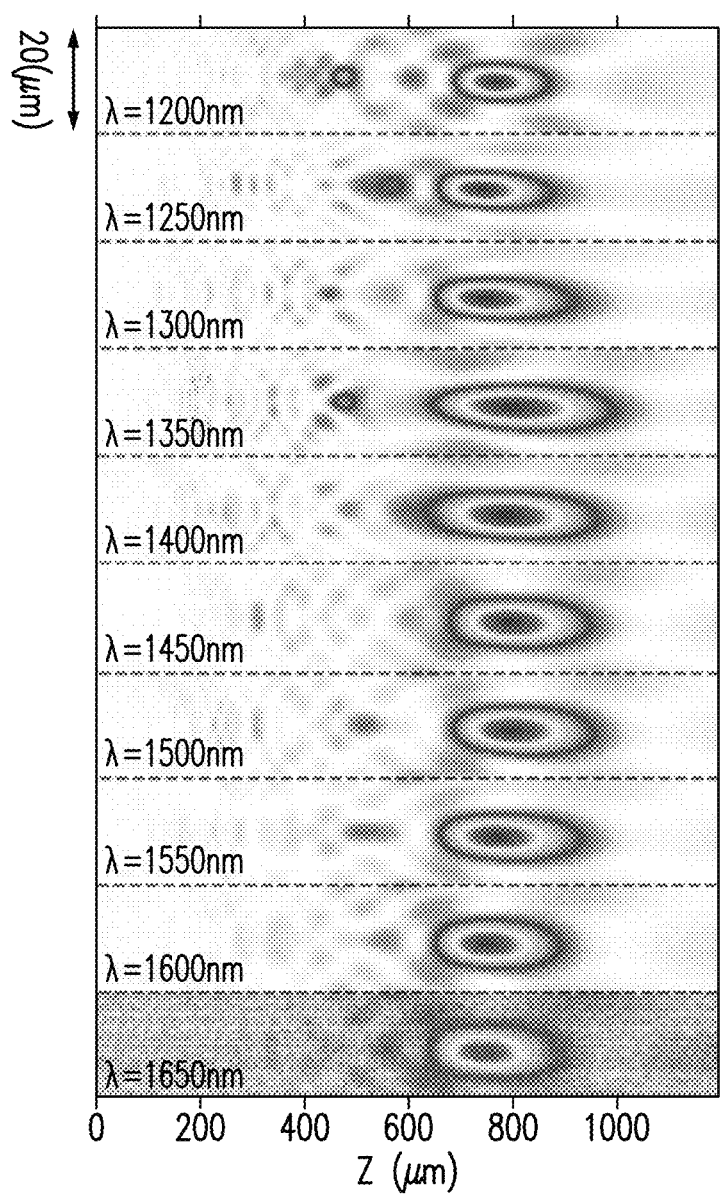
FIGS. 7A and 7B show measured far-field intensity distributions of a focusing metasurface lens with a diameter of 200 μm and numerical aperture (NA) of 0.12, where
Figure 7B:
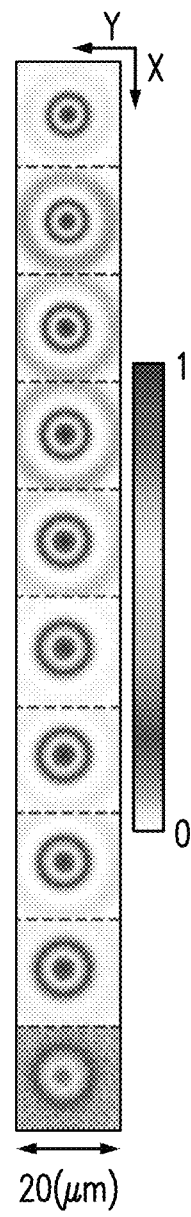

FIGS. 7A-7B show measured far-field intensity distributions of a focusing metasurface lens with a diameter of 200 μm and numerical aperture (NA) of 0.12. FIG. 7A shows measured light intensity distributions on the longitudinal plane, showing achromatic focusing over a wide range of wavelengths. FIG. 7B shows measured light intensity distributions on the focal plane, showing that diffraction limited focal spots are obtained over a wide range of wavelengths.

Figure 8A:
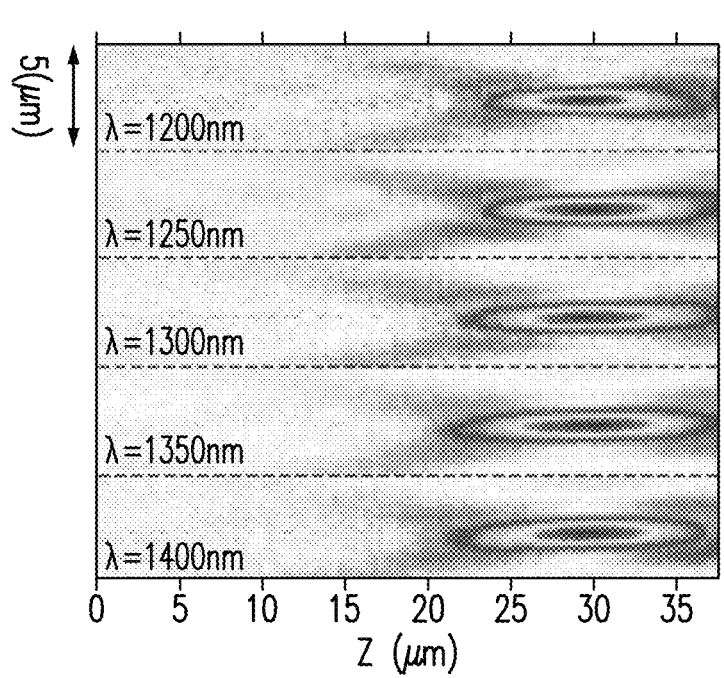
FIGS. 8A and 8B shows measured far-field intensity distributions of a focusing metasurface lens with a diameter of 100 μm and numerical aperture (NA) of 0.85, where
Figure 8B:
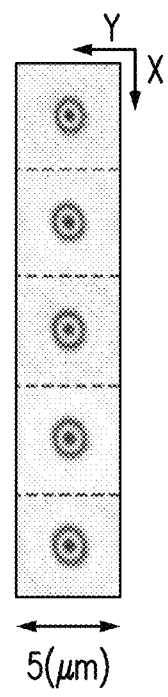

FIGS. 8A-8B show measured far-field intensity distributions of a focusing metasurface lens with a diameter of 100 μm and numerical aperture (NA) of 0.85. FIG. 8A shows measured light intensity distributions on the longitudinal plane, showing achromatic focusing over a wavelength range of $\lambda=1,200-1,400$ nm. FIG. 8B shows measured light intensity distributions on the focal plane, showing that diffraction limited focal spots are obtained over a wavelength range of $\lambda=1,200-1,400$ nm.

Figure 9A:
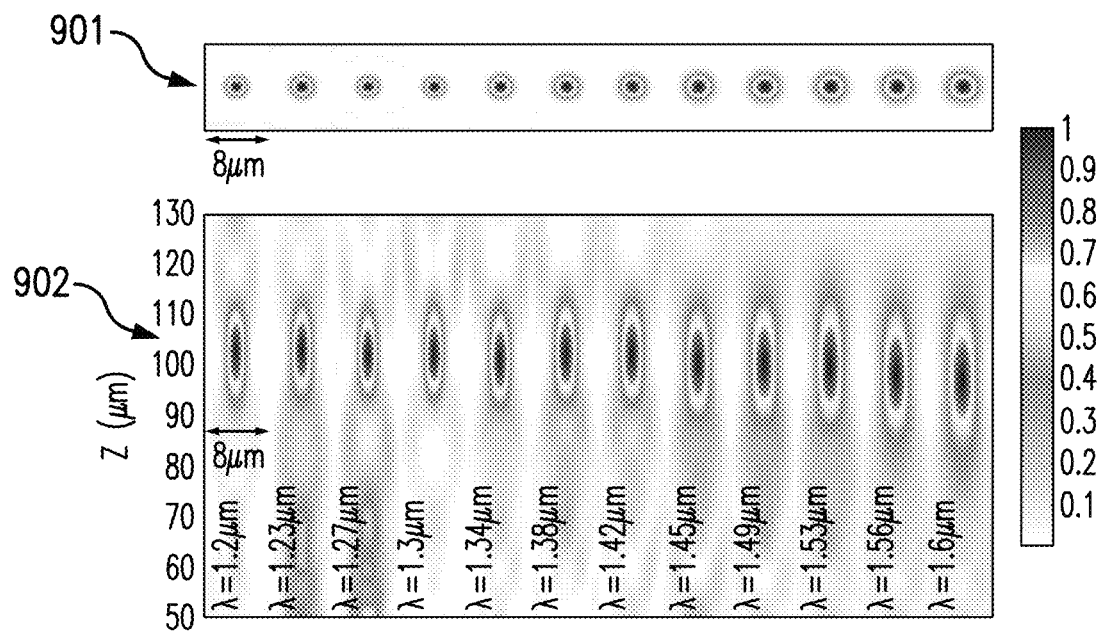
FIGS. 9A and 9B show simulated far-field intensity distribution of a focusing metasurface lens with a diameter of 100 μm, focal distance of 100 μm, and numerical aperture (NA) of 0.44 based on the 1400 nm tall meta-units, where
Figure 9B:
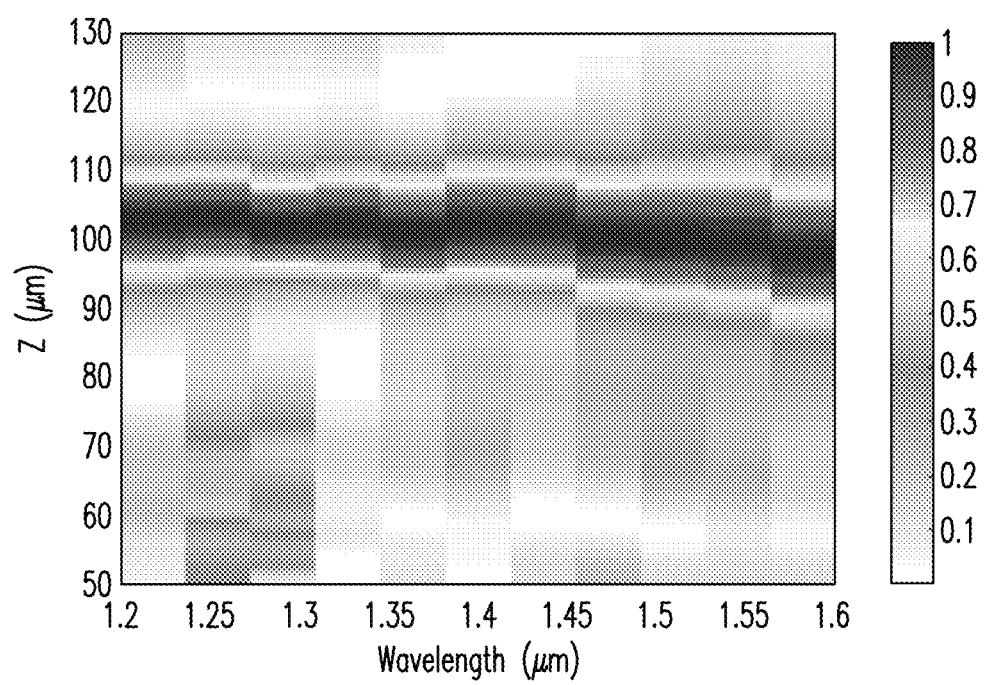

FIGS. 9A-9B show simulated far-field intensity distribution of a focusing metasurface lens with a diameter of 100 μm, focal distance of 100 μm, and numerical aperture (NA) of 0.44 based on the 1400 nm tall meta-units. The simulation is conducted with finite-difference time-domain techniques. Top panel of FIG. 9A shows simulated light intensity distributions on the focal plane, showing that diffraction limited focal spots are obtained over a wide range of wavelengths. Bottom panel of FIG. 9A shows simulated light intensity distributions on the longitudinal plane, showing achromatic focusing over a wide range of wavelengths. FIG. 9B shows line scans of light intensity along the axis of the metasurface lens, showing achromatic focusing over a wide range of wavelengths.

Figure 10A:
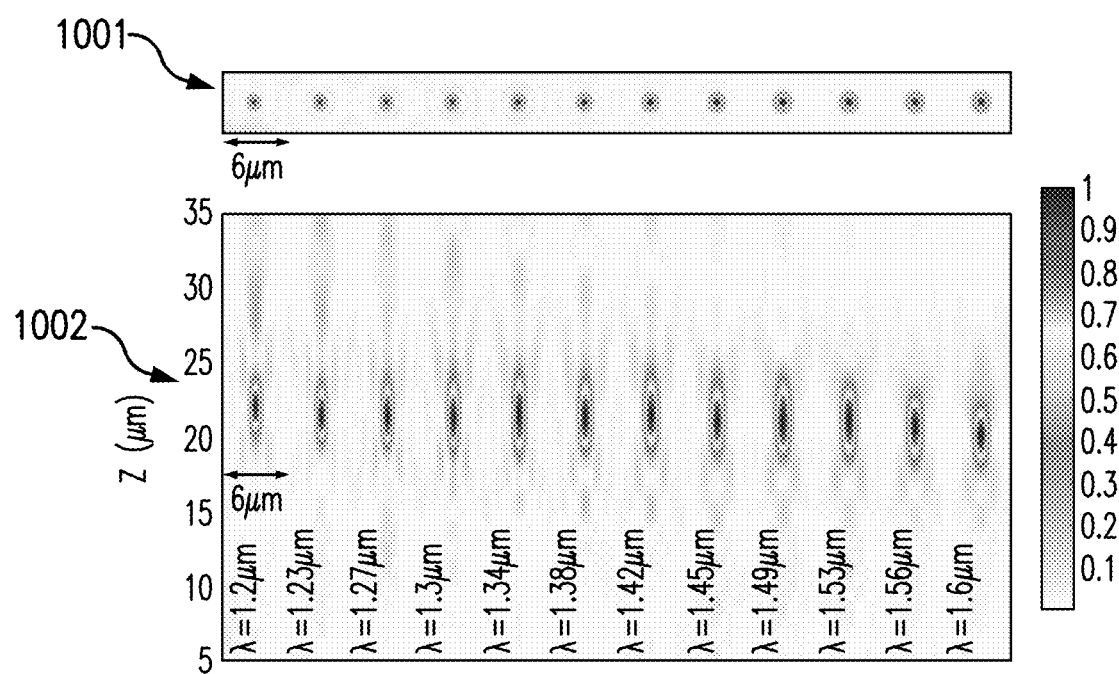
FIGS. 10A and 10B show simulated far-field intensity distribution of a focusing metasurface lens with a diameter of 100 μm, focal distance of 20 μm, and numerical aperture (NA) of 0.93 based on the 1400 nm tall meta-units, where
Figure 10B:
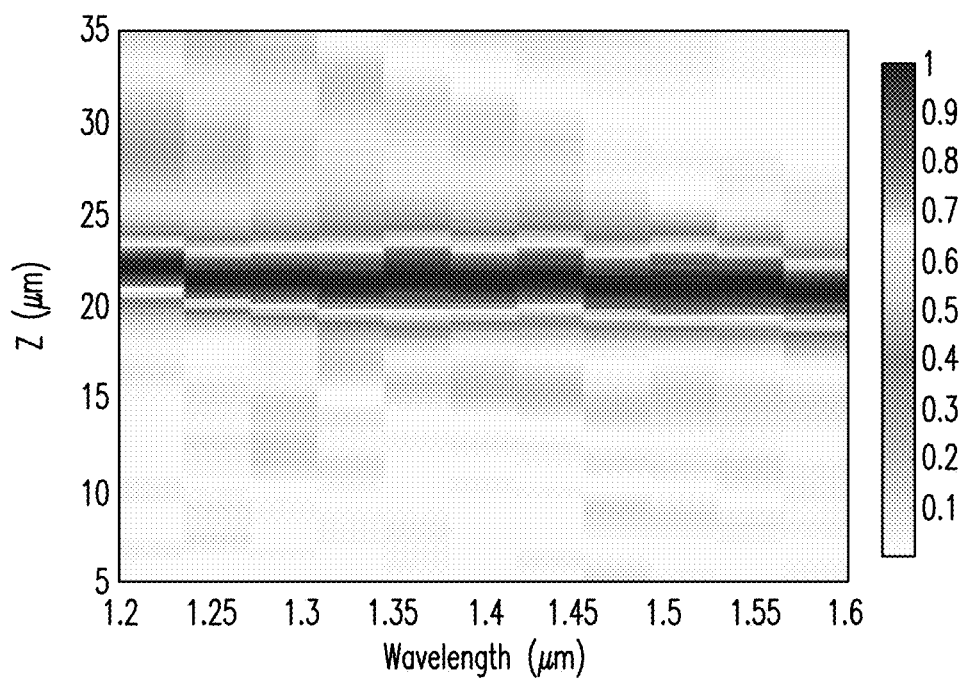

FIGS. 10A and 10B show simulated far-field intensity distribution of a focusing metasurface lens with a diameter of 100 μm, focal distance of 20 μm, and numerical aperture (NA) of 0.93 based on the 1400 nm tall meta-units. Top panel of FIG. 10A shows simulated light intensity distributions on the focal plane, showing that diffraction limited focal spots are obtained over a wide range of wavelengths. Bottom panel of FIG. 10A shows simulated light intensity distributions on the longitudinal plane, showing achromatic focusing over a wide range of wavelengths. FIG. 10B shows line scans of light intensity along the axis of the metasurface lens, showing achromatic focusing over a wide range of wavelengths.

FIGS. 11A and 11B show measured far-field intensity distributions of a diverging metasurface lens with a diameter of 100 μm, focal distance of 50 μm, and numerical aperture (NA) of 0.7. Measured focal spots are virtual spots behind the metasurface, where the wavefront originates. FIG. 11A shows measured light intensity distributions on the longitudinal plane, showing achromatic performance over a wide range of wavelengths. FIG. 11B shows measured light intensity distributions on the focal plane, showing that diffraction limited virtual focal spots are obtained over a wide range of wavelengths.

Figure 12A:
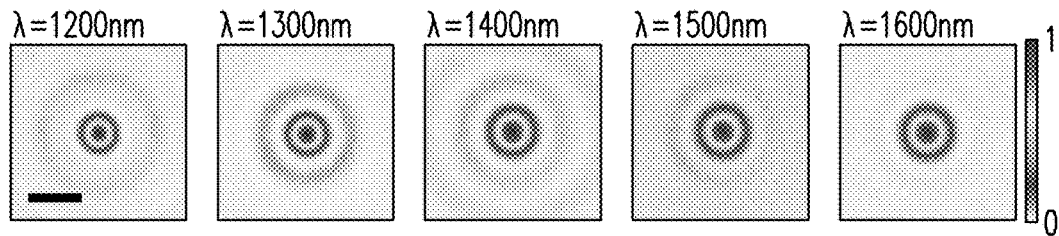
FIG. 12A shows focal plane intensity distributions of a metasurface lens with diameter of 100 μm and NA=0.24 at select wavelengths (Scale bar: 5 μm)
Figure 12B:
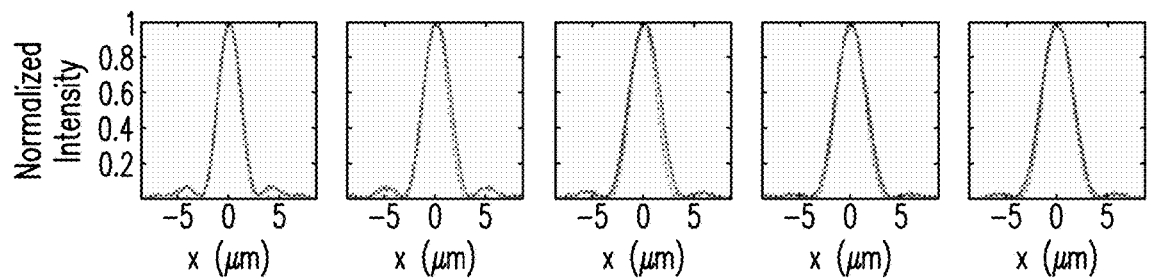
FIG. 12B shows horizontal and vertical cuts (solid curves) across the corresponding measured focal spots in (a) compared with an ideal Airy spot (dashed curves).

FIG. 12A shows measured focal plane intensity distributions of a metasurface lens with diameter of 100 μm and NA=0.24 at select wavelengths. FIG. 12B shows horizontal and vertical cuts across the measured focal spots in FIG. 12A compared with an ideal Airy spot, showing that the focal spots are diffraction limited.

Figure 13:
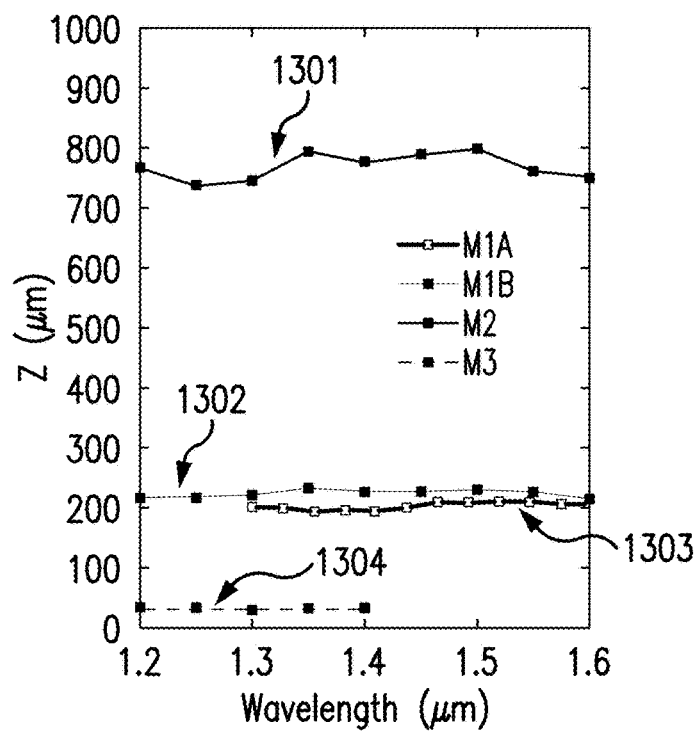
FIG. 13 illustrates focal lengths as a function of wavelength for four experimentally demonstrated metasurface lenses.

FIG. 13 shows measured focal distances as a function of wavelength for four experimentally demonstrated metasurface lenses, showing that the maximum shift from the mean focal length is limited to 2-5% for the entire design bandwidth and indicating that the metasurface lenses are able to correct chromatic aberration. The first plot 1301 has the greatest Z value, the second plot 1302 has the second greatest Z value, the third plot 1303 has the third greatest Z value, and the fourth plot 1304 has the lowest Z value.

Figure 14:
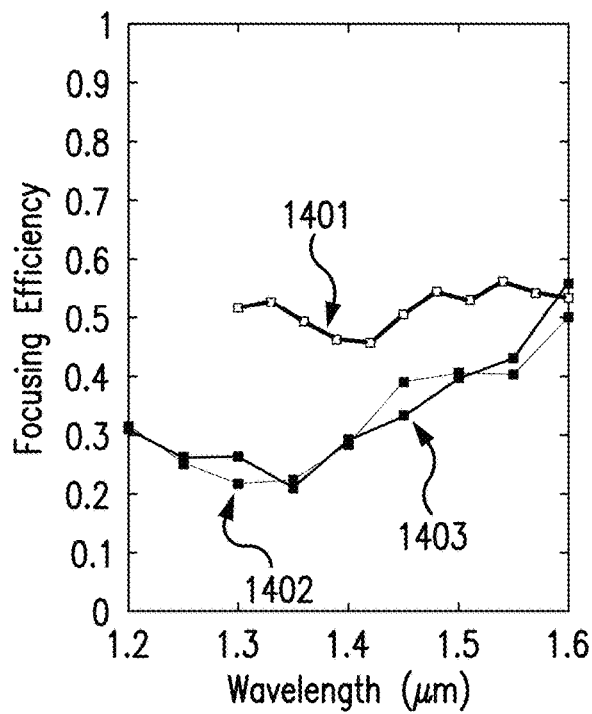
FIG. 14 shows measured focusing efficiencies of three experimentally demonstrated metalenses.

FIG. 14 shows measured focusing efficiencies of three experimentally demonstrated metalenses. The first plot 1401 has the greatest focusing efficiency, the second plot 1402 has the second greatest peak focusing efficiency, and the third plot 1403 has the lowest peak focusing efficiency. In some embodiments, transmission and focusing efficiencies can be quantified. The transmission efficiency of metasurface lenses can be defined as $$\text{Transmission} = \frac{\text{Power transmitted through the metasurface lens aperature}}{\text{Power incident onto the metasurface lens aperature}} \tag{8}$$

Thus, determining transmission efficiency involves measuring optical power transmitted through the area of a metasurface lens (i.e., quartz substrate covered by silicon metasurface structures) and optical power transmitted through just the quartz substrate of the same area as the metasurface lens.

In some embodiments, the focusing efficiency of metasurface lenses can be defined as:

$$\text{Focusing Efficiency} = \frac{\begin{array}{c}\text{Integrated power over an area with}\\\text{radius} \sim 3 \text{ FWHM of the focal spot}\end{array}}{\text{Power incident onto the metasurface lens aperature}} \tag{9}$$

Thus, determining focusing efficiency involves measuring optical power that is concentrated onto a circular aperture on the focal plane that has a diameter approximately three times the FWHM of the focal spot and optical power transmitted through the area of a metasurface lens.

Figure 15A:
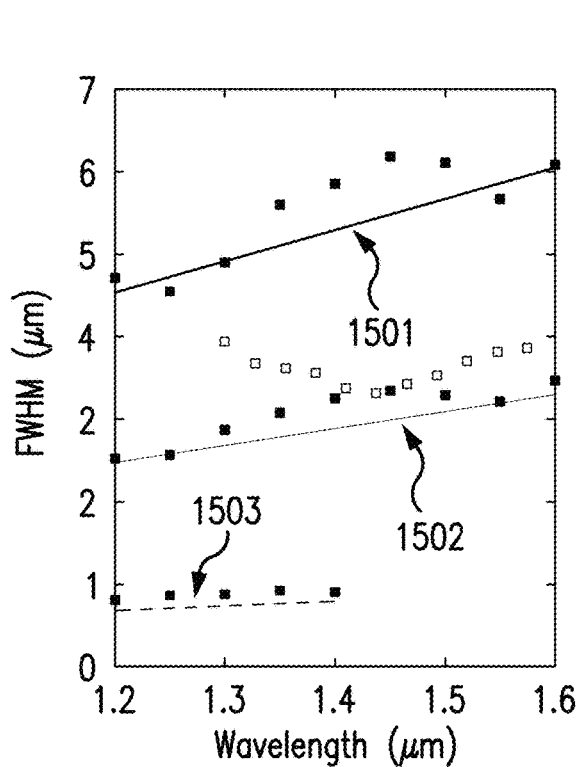
FIG. 15A shows extracted full-width at half-maximum (FWHM) of focal spots for four experimentally demonstrated metasurface lenses.
Figure 15B:
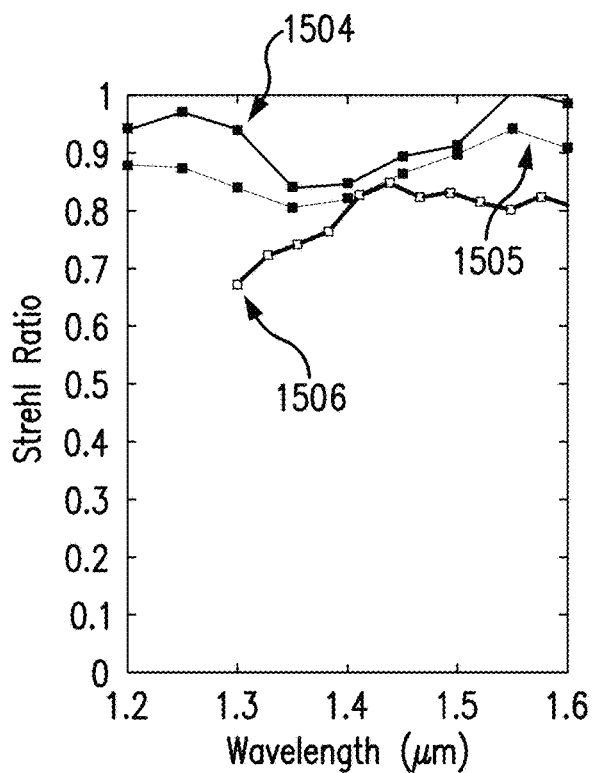
FIG. 15B shows calculated Strehl ratios for three experimentally demonstrated metasurface lenses.

FIG. 15A is extracted full-width at half-maximum (FWHM) of focal spots for four experimentally demonstrated metasurface lenses. Straight lines represent theoretical FWHM. FIG. 15A contains three plots. The first plot 1501 has the greatest FWHM value, the second plot 1502 has the second greatest FWHM value, and the third plot 1503 has the third greatest FWHM value. FIG. 15B contains three plots. The first plot 1504 has the greatest Strehl ratio, the second plot 1505 has the second greatest Strehl ratio, and the third plot 1506 has the third greatest Strehl ratio. FIG. 15B shows calculated Strehl ratios for three experimentally demonstrated metasurface lenses. The values are around or above 0.8 for all wavelengths, satisfying the condition for diffraction limited focal spots.

Figure 16A:
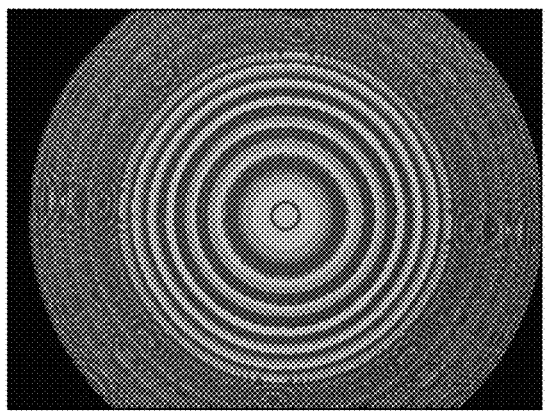
FIGS. 16A-16D show optical and SEM images of an example fabricated metasurface lens working in the near-IR.
Figure 16B:
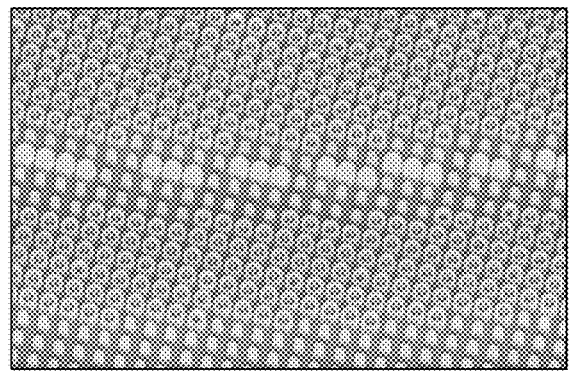
Figure 16C:
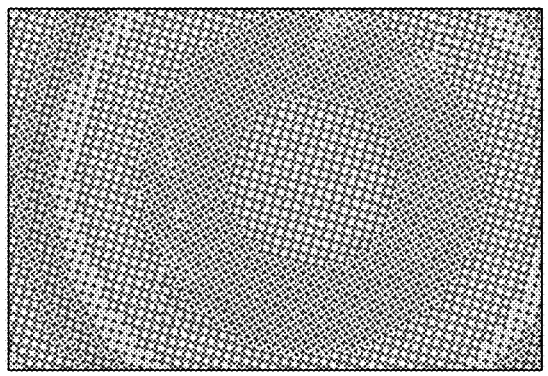
Figure 16D:
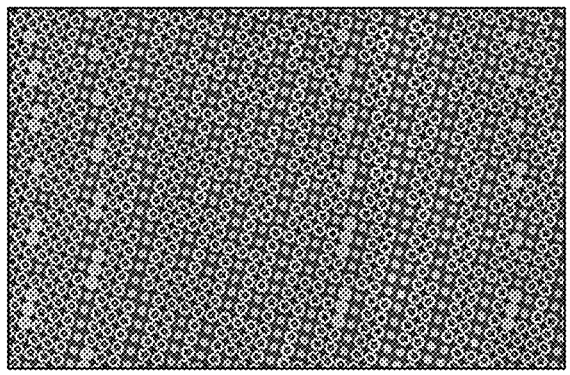
Figure 17:
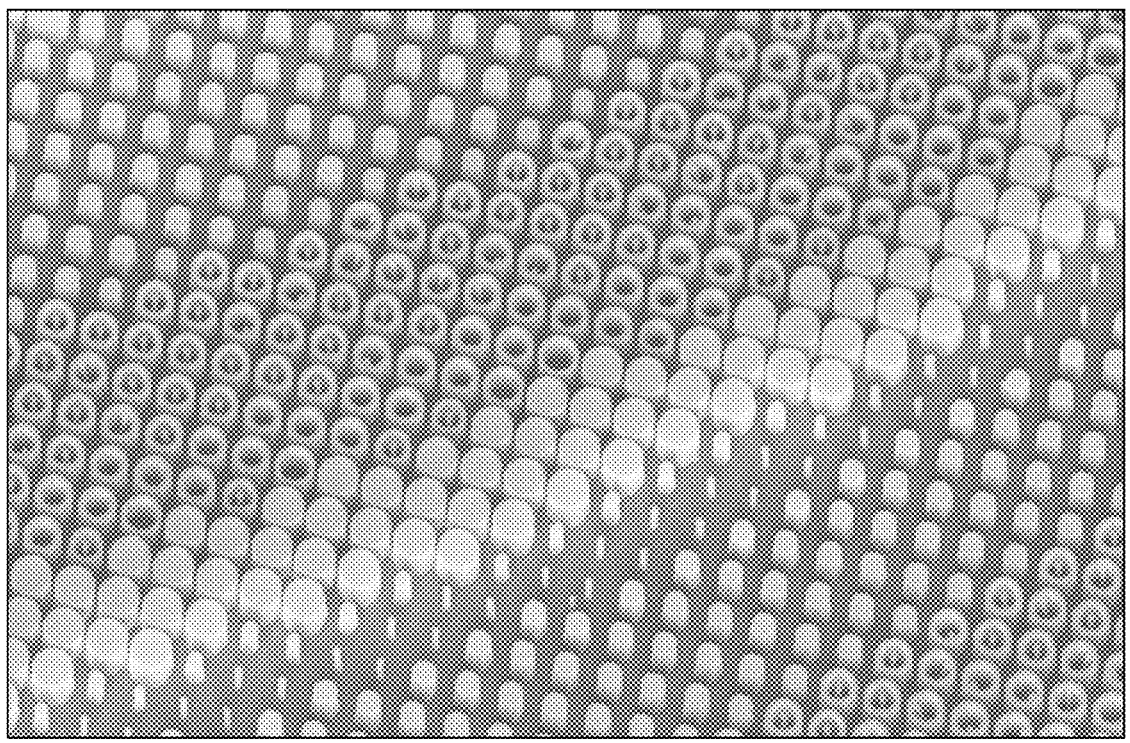
FIG. 17 is a SEM image of a small region of an example metasurface lens working in the near-IR.
Figure 18:
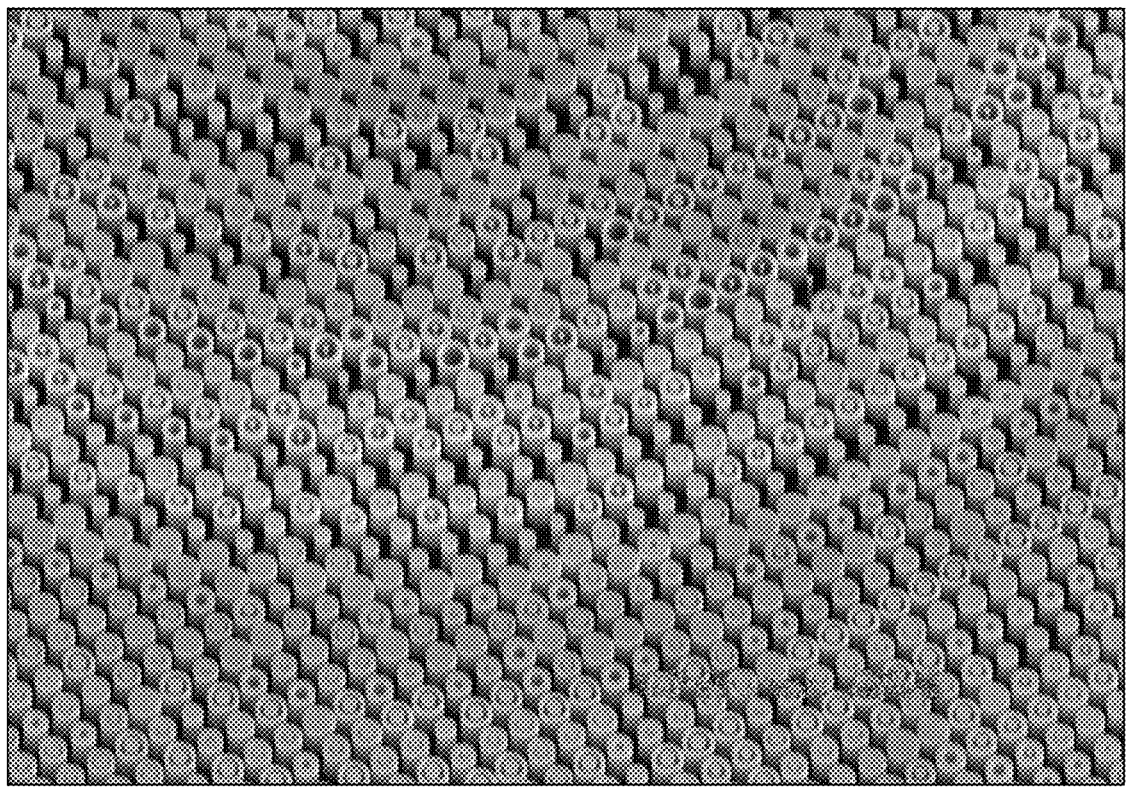
FIG. 18 is a SEM image of a small region of an example metasurface lens working in the near-IR.
Figure 19:
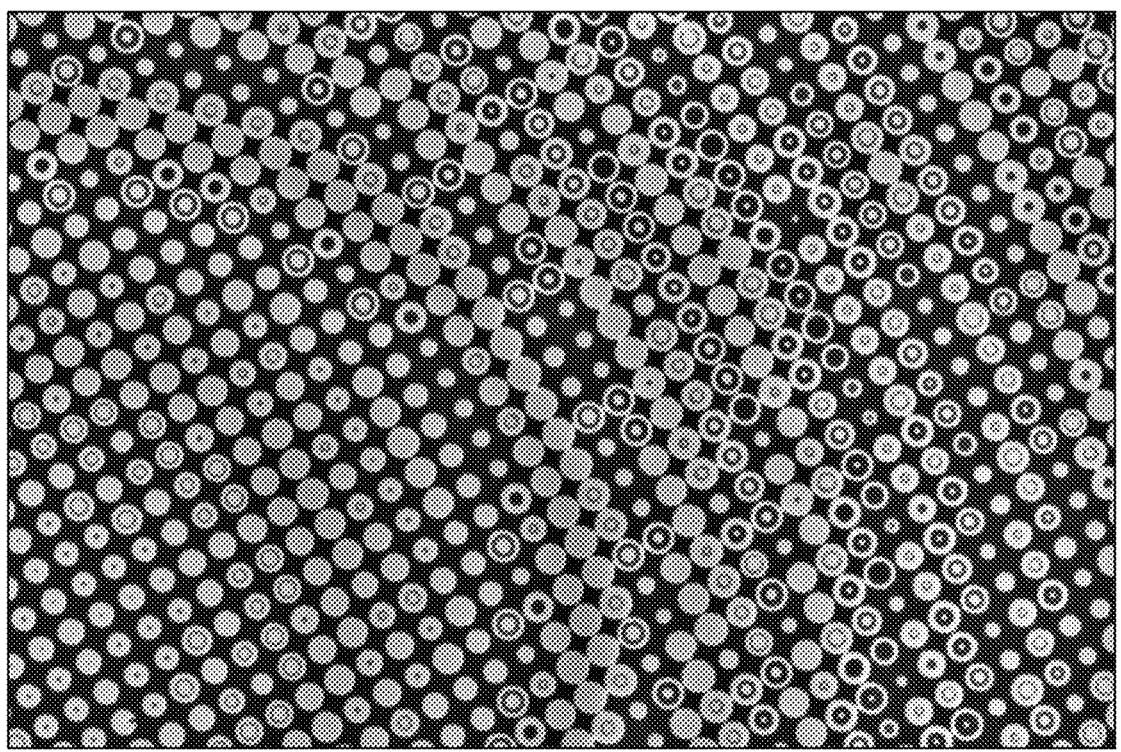
FIG. 19 is a SEM image of a small region of an example metasurface lens working in the near-IR.
Figure 20:
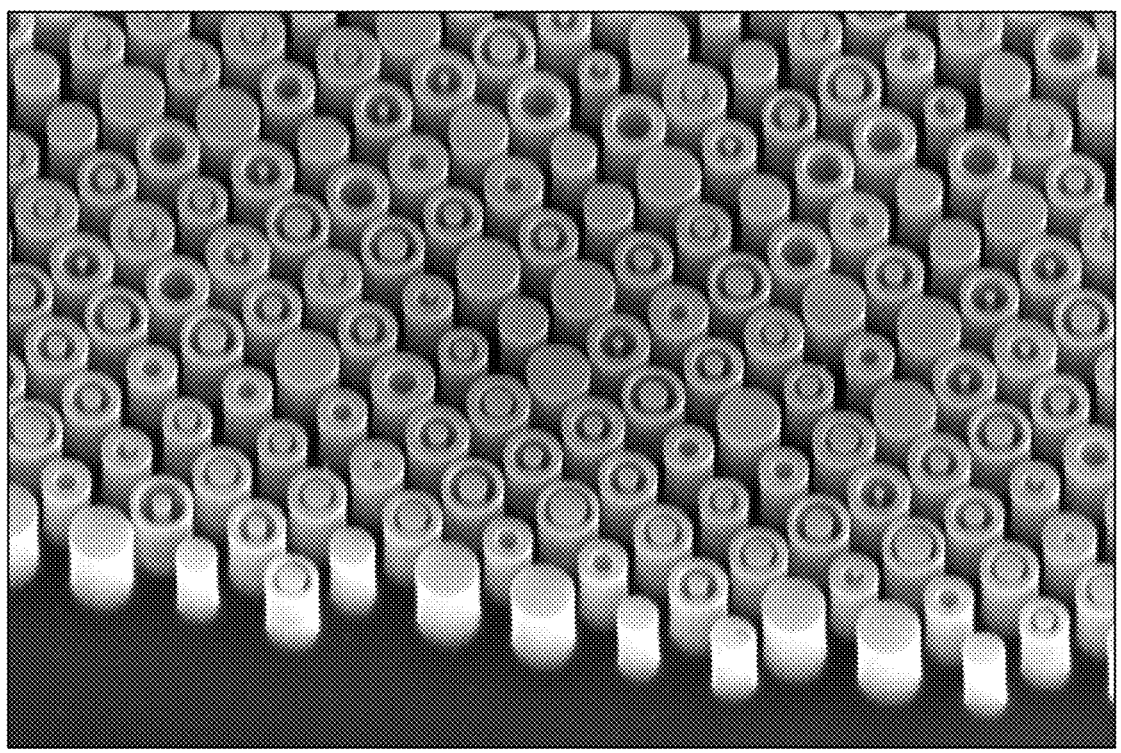
FIG. 20 is a SEM image of a small region of an example metasurface lens working in the near-IR.
Figure 21:
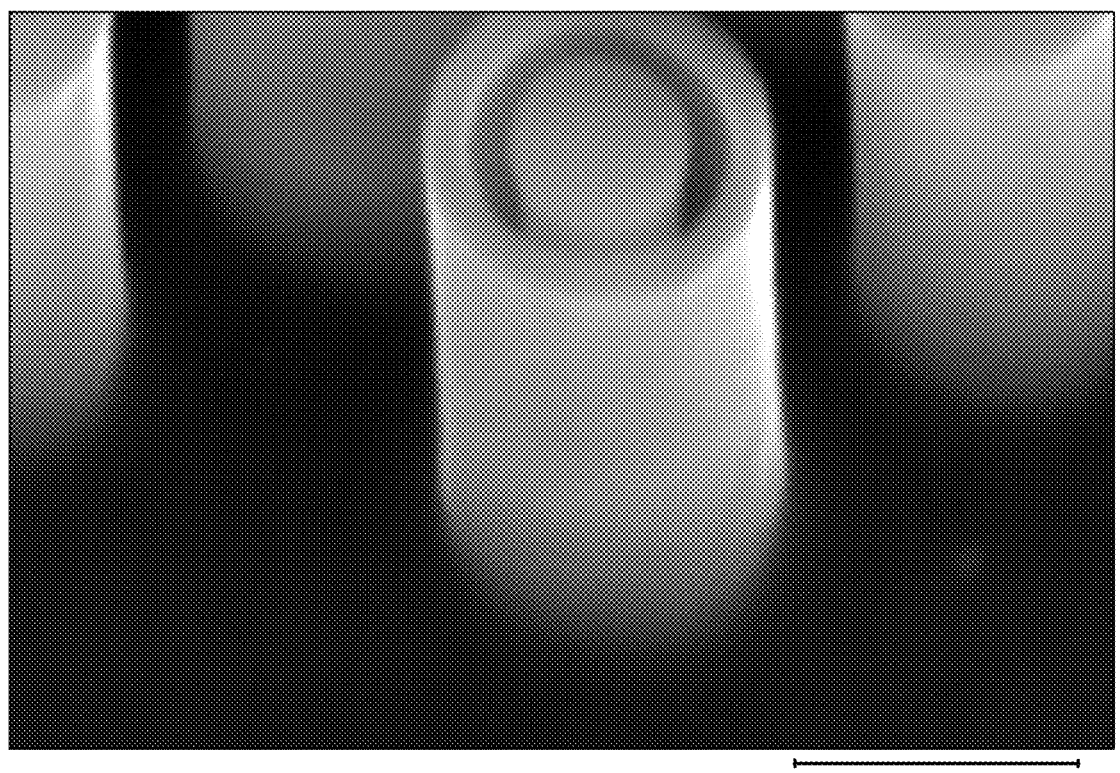
FIG. 21 is a SEM image of a small region of an example metasurface lens working in the near-IR.
Figure 22:
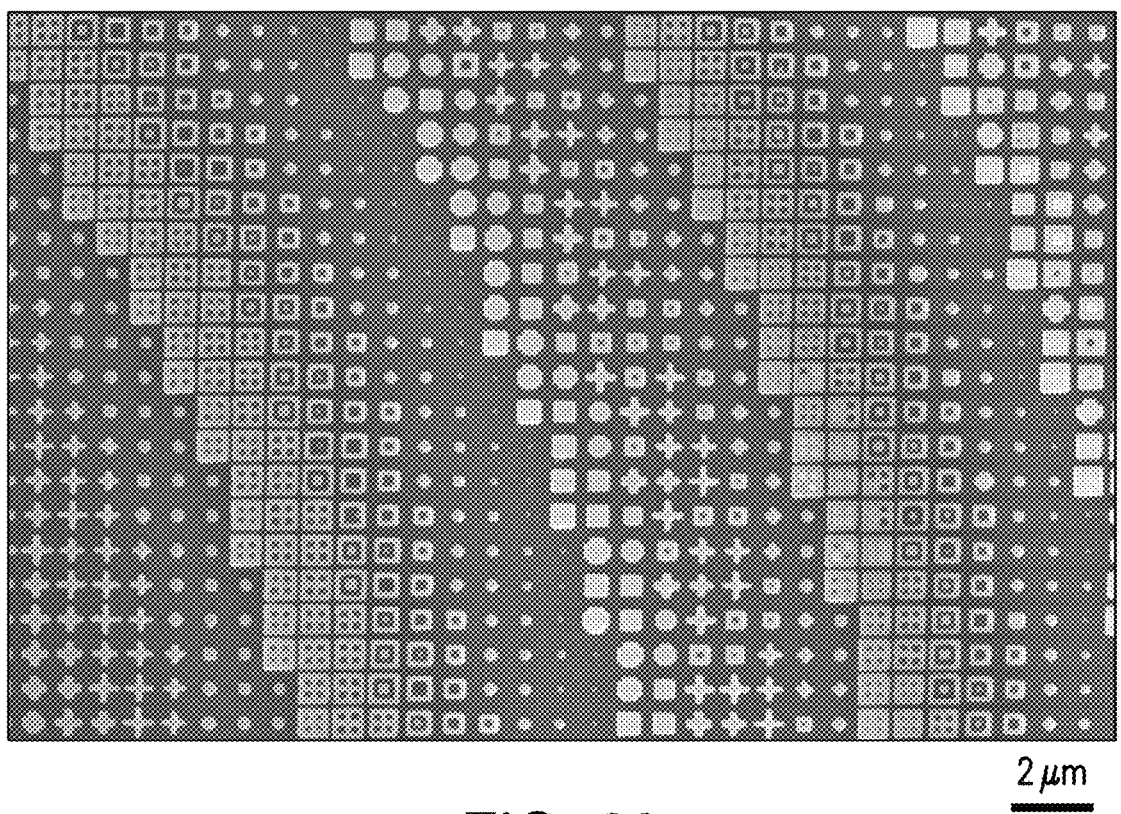
FIG. 22 is a SEM image of a small region of an example a metasurface lens working in the near-IR.
Figure 23:
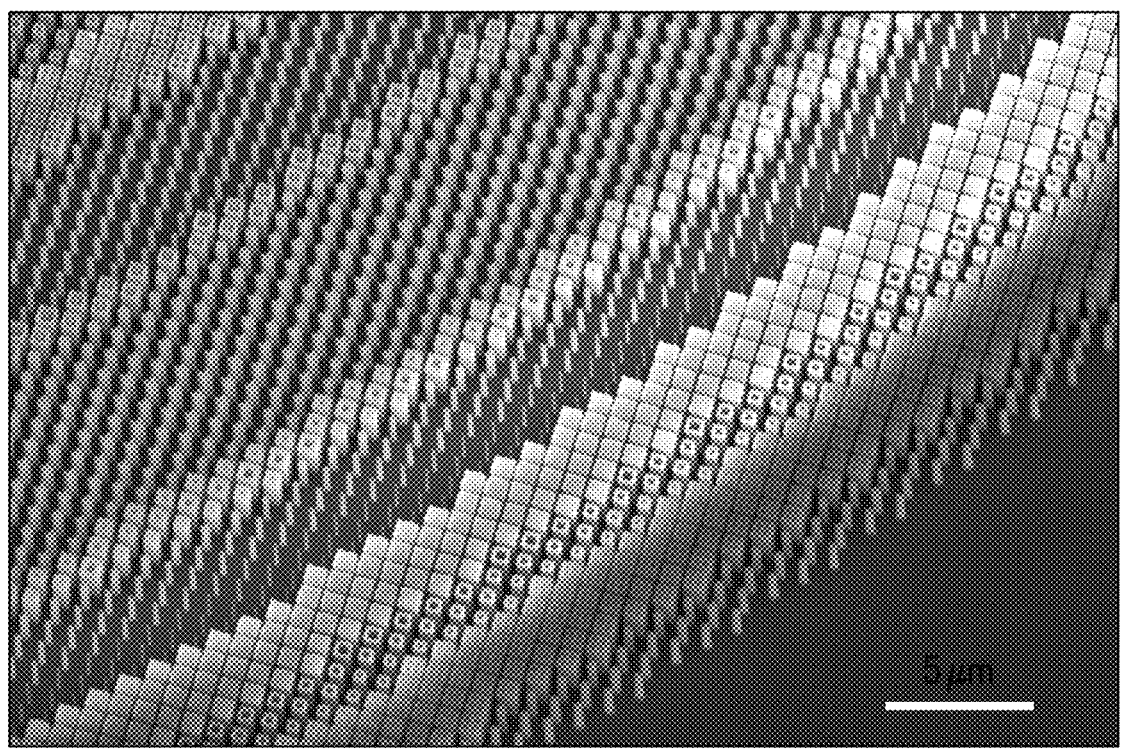
FIG. 23 is a SEM image of a small region of an example metasurface lens working in the near-IR.
Figure 24:
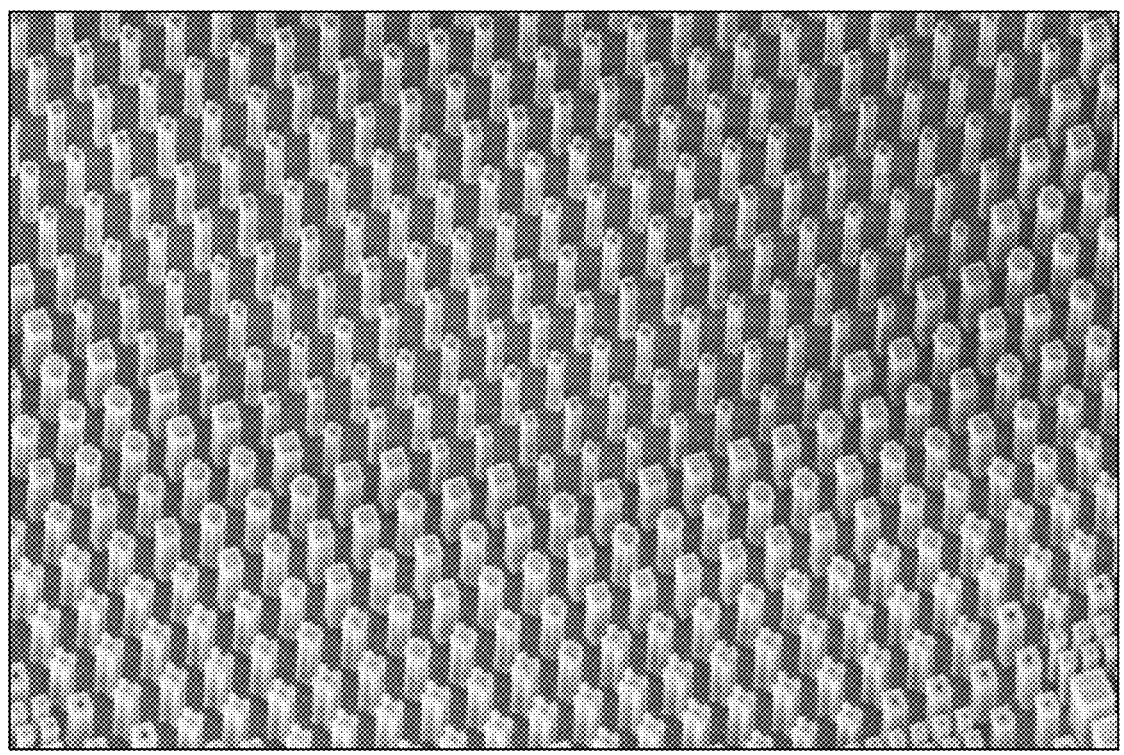
FIG. 24 is a SEM image of a small region of an example metasurface lens working in the near-IR.
Figure 25:
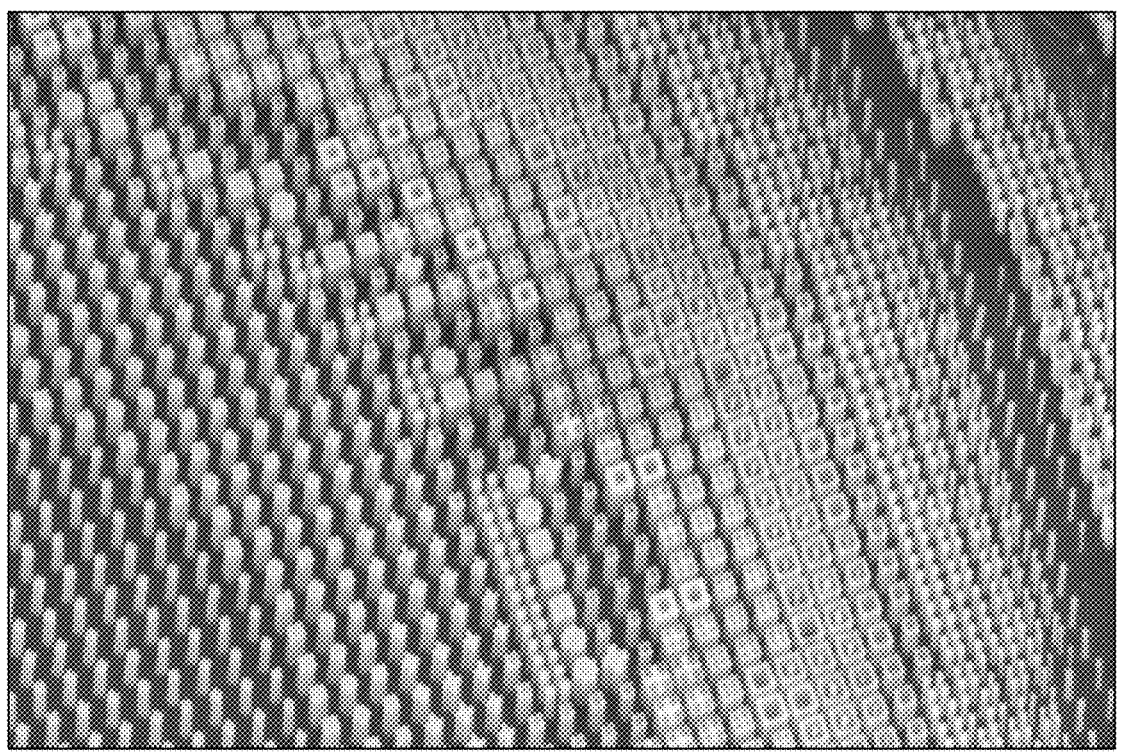
FIG. 25 is a SEM image of a small region of an example metasurface lens working in the near-IR.
Figure 26:
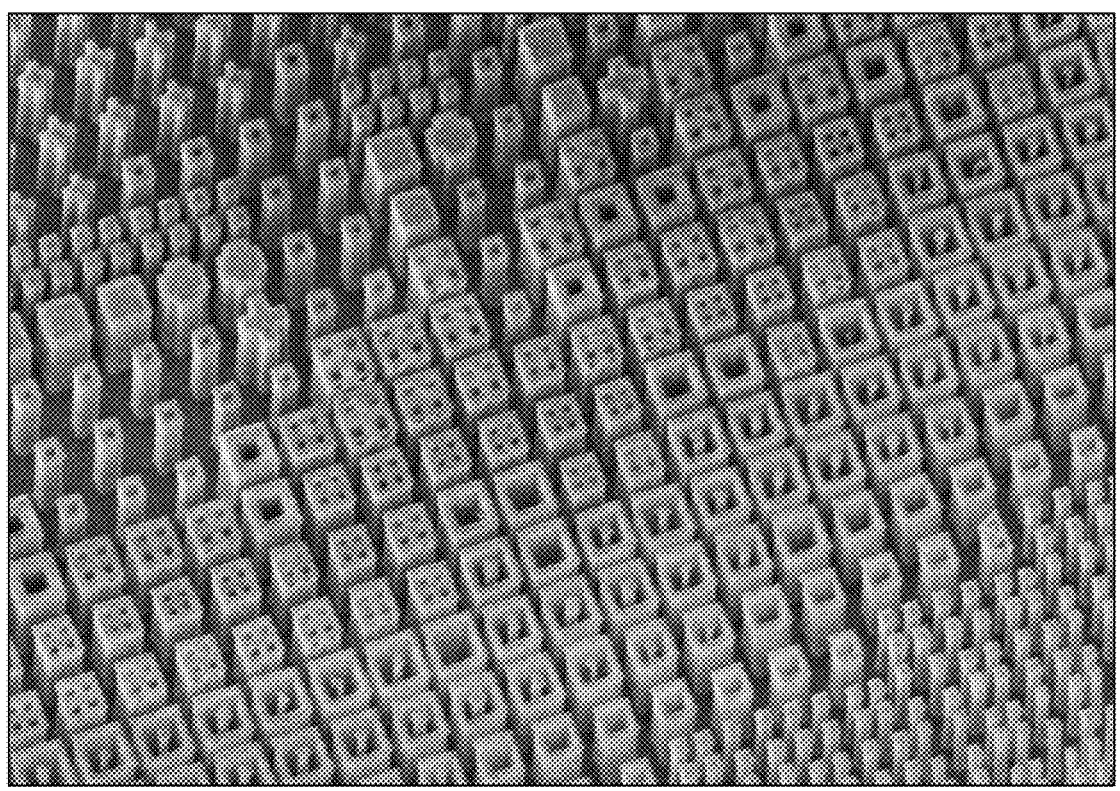
FIG. 26 is a SEM image of a small region of an example metasurface lens working in the near-IR.

FIG. 16A is an optical image of an example fabricated metasurface lens working in the near-IR. FIGS. 16B-16D are scanning electron microscope (SEM) images of regions of an example metasurface lens working in the near-IR. FIG. 17 is an SEM image of a region of an example metasurface lens working in the near-IR. FIGS. 18-21 are SEM images of regions of an example metasurface lens working in the near-IR. FIGS. 22 and 23 are SEM images of regions of an example metasurface lens working in the near-IR. FIGS. 24-26 are SEM images of regions of an example metasurface lens working in the near-IR. All these exemplary metasurface lenses are made of amorphous silicon patterned on quartz substrates.

Figure 27:
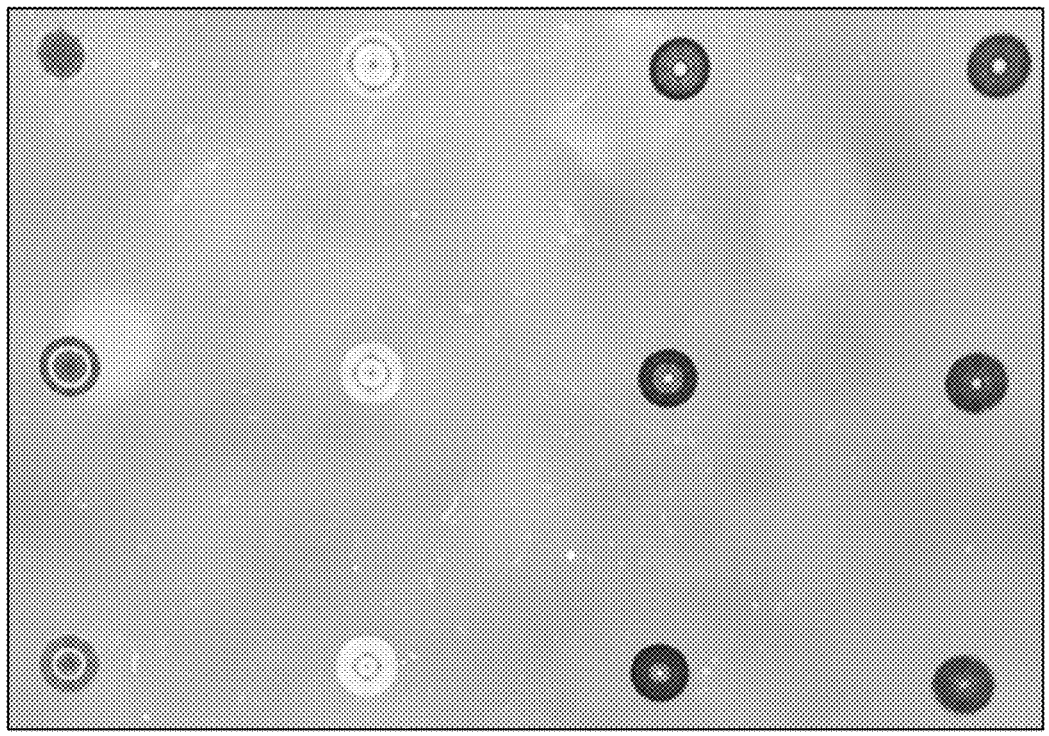
FIG. 27 is an optical microscope image of an example chip with a number of amorphous-silicon near-IR metasurface lenses patterned on a quartz substrate.
Figure 28:
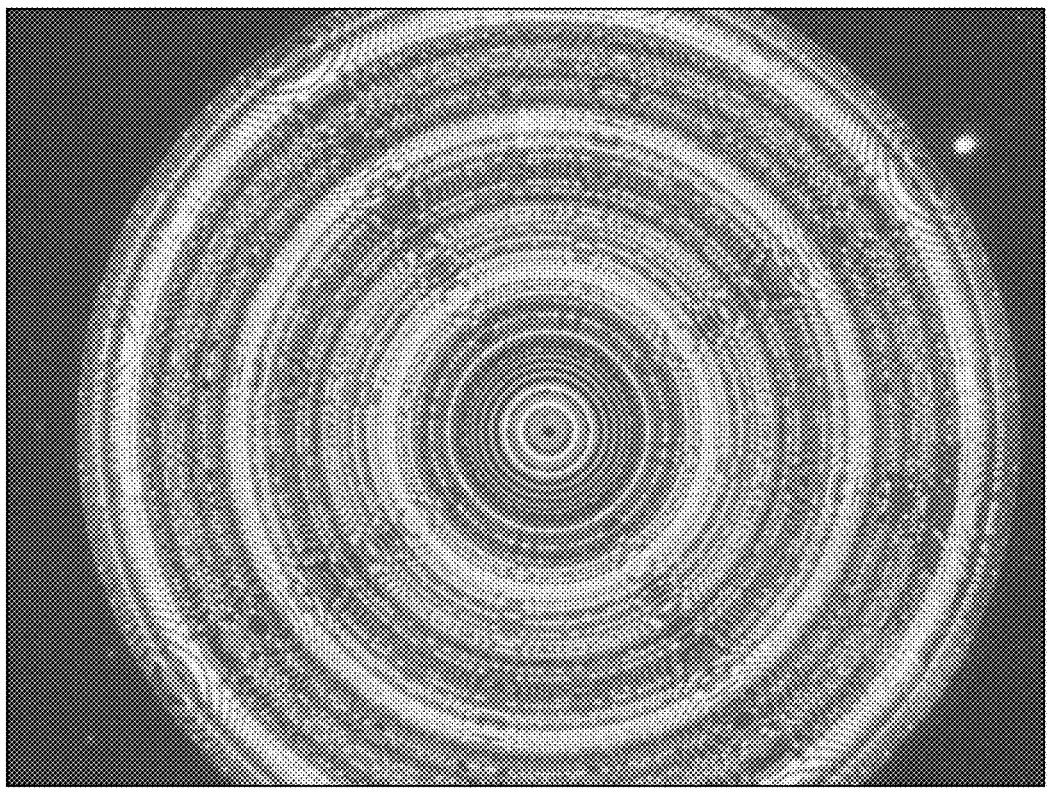
FIG. 28 is an optical microscope image of an example near-IR metasurface lens patterned on a quartz substrate.

FIG. 27 provides an optical microscope image of an example chip with a number of amorphous-silicon near-IR metasurface lenses patterned on a quartz substrate. The diameters of the lenses are all 300 μm. FIG. 28 provides an optical microscope image of an amorphous-silicon near-IR metasurface lenses patterned on a quartz substrate.

Figure 29A:
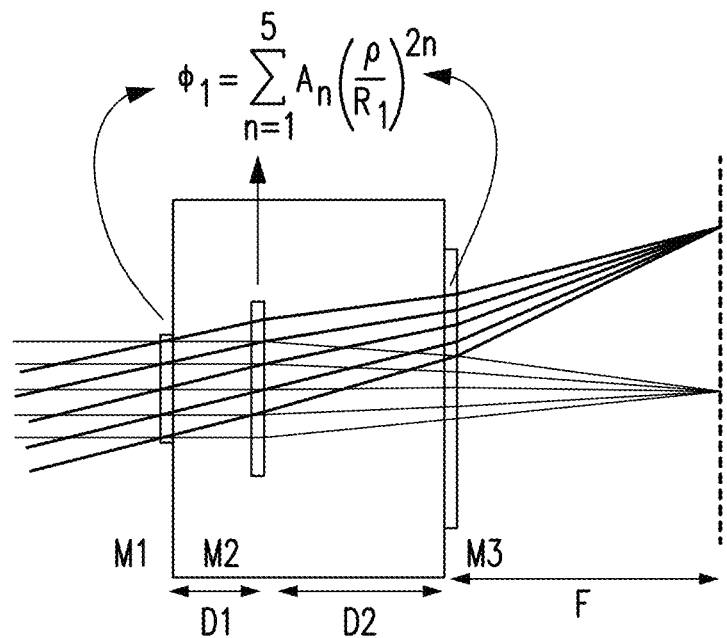
FIG. 29A illustrates an example technique for correcting chromatic and monochromatic aberrations in a metalens triplet consisting of three individual metalenses.

FIG. 29A shows optimization scheme for correcting both chromatic and monochromatic aberrations in a metalens triplet consisting of three individual metalenses. A ray-tracing method is used to optimize the metalens triplet. The goal of optimization is to minimize optical spot size at the focal plane at various incident angles and wavelengths. The phase profile of each metasurface is prescribed by an even order polynomial with 5 parameters, so in total 15 parameters are used for optimization. The following equation describes the phase profile:

$$\Phi 1 = \sum_{n=1}^{5} An\left(\frac{P}{R1}\right)^{2n} \tag{10}$$

Figure 29B:
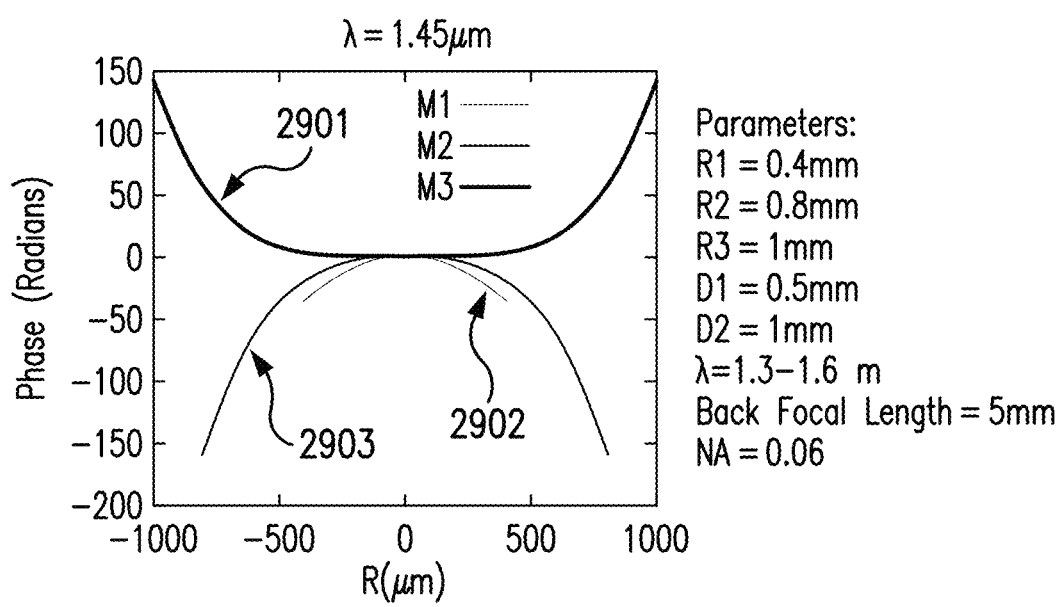
FIG. 29B shows an example metalens triplet.

FIG. 29B shows the phase profiles of the three metasurfaces for one particular realization of a metalens triplet. The first phase profile is given by the large U-shaped curve 2901, the second phase profile is given by the small upside down U shaped curve 2902, and the third phase profile is given by the large upside down U shaped curve 2903. Parameters for this particular realization are listed under the figure.

Figure 30A:
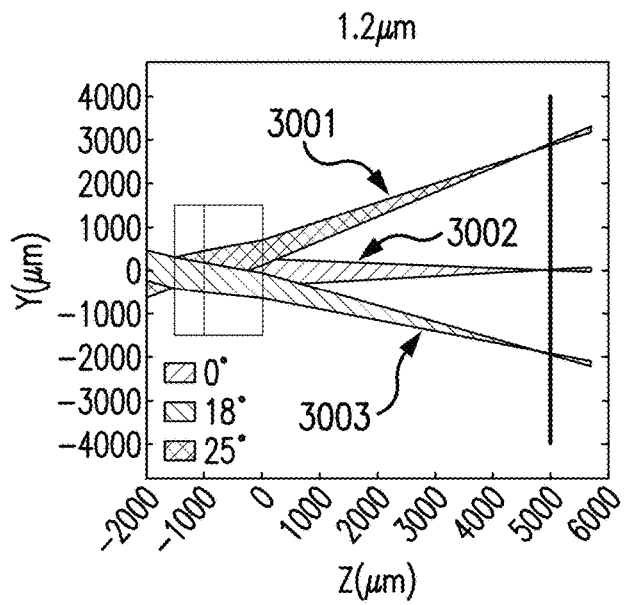
FIGS. 30A-30C show ray-tracing results showing that the metalens triplet in FIG. 29 can correct both chromatic and monochromatic aberrations.
Figure 30B:
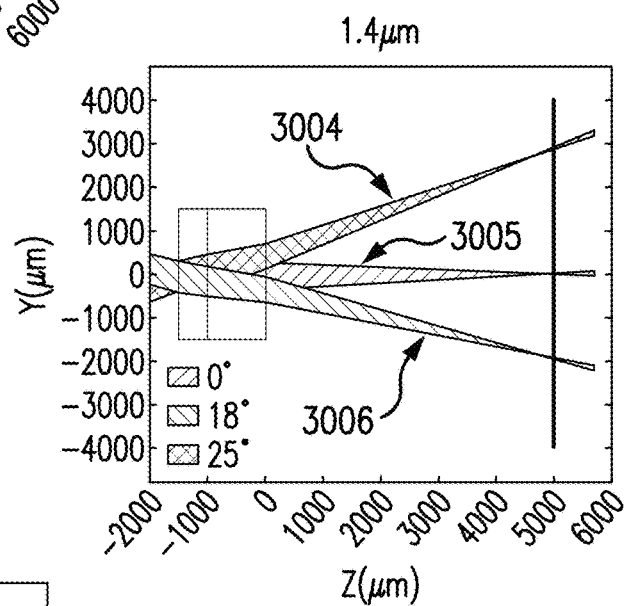
Figure 30C:
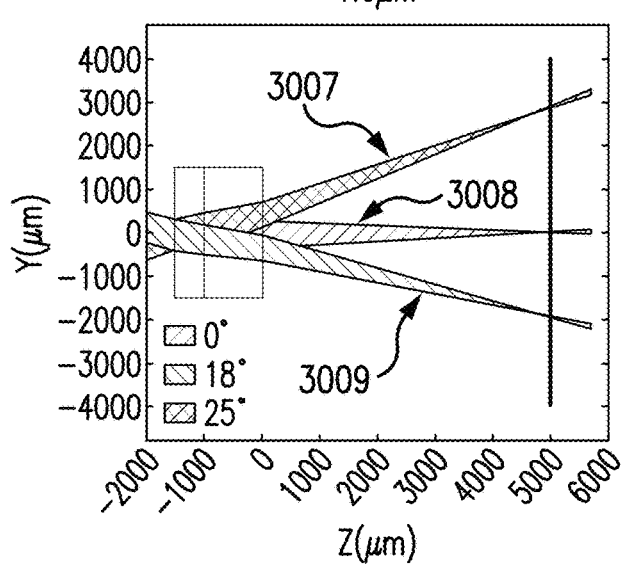

FIGS. 30A-30C are ray-tracing results showing good performance of a metalens triplet at three exemplary incident angles and three operation wavelengths. The left most graph with operation wavelength 1.2 μm 3000, contains tree exemplary incident angles. The highest 3001 is 25 degrees; the middle 3002, is 0 degrees; and the lowest 3003 is 18 degrees. The middle graph with operation wavelength 1.4 μm 3004, contains tree exemplary incident angles. The highest 3005 is 25 degrees; the middle 3006, is 0 degrees; and the lowest 3007 is 18 degrees. The left most graph with operation wavelength 1.6 μm 3008, contains tree exemplary incident angles. The highest 3009 is 25 degrees; the middle 3010, is 0 degrees; and the lowest 3011 is 18 degrees. FIGS. 31A-31C are optical images of three elements of a metasurface triplet fabricated using electron-beam lithography and FIG. 32 is an optical image of the assembled triplet.

Figure 33:
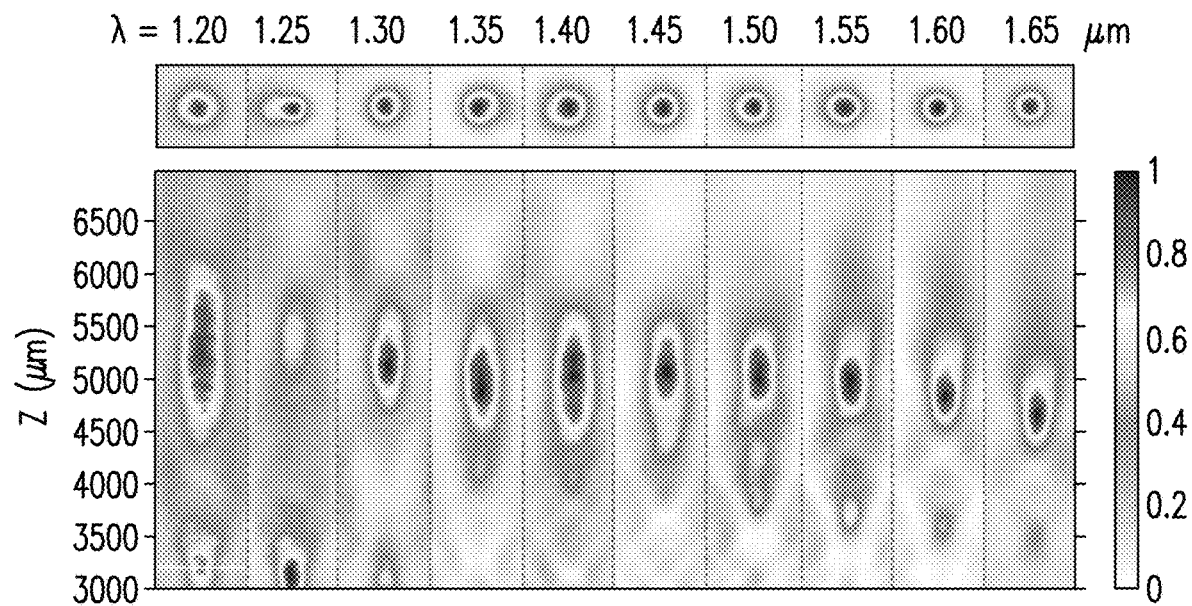
FIG. 33 shows measured far-field intensity distributions of the metalens triplet shown in FIG. 32, where (a) is a plot of light intensity distributions on the focal plane vs wavelength, and (b) is a plot of light intensity distributions on the longitudinal plane vs wavelength.
Figure 34:
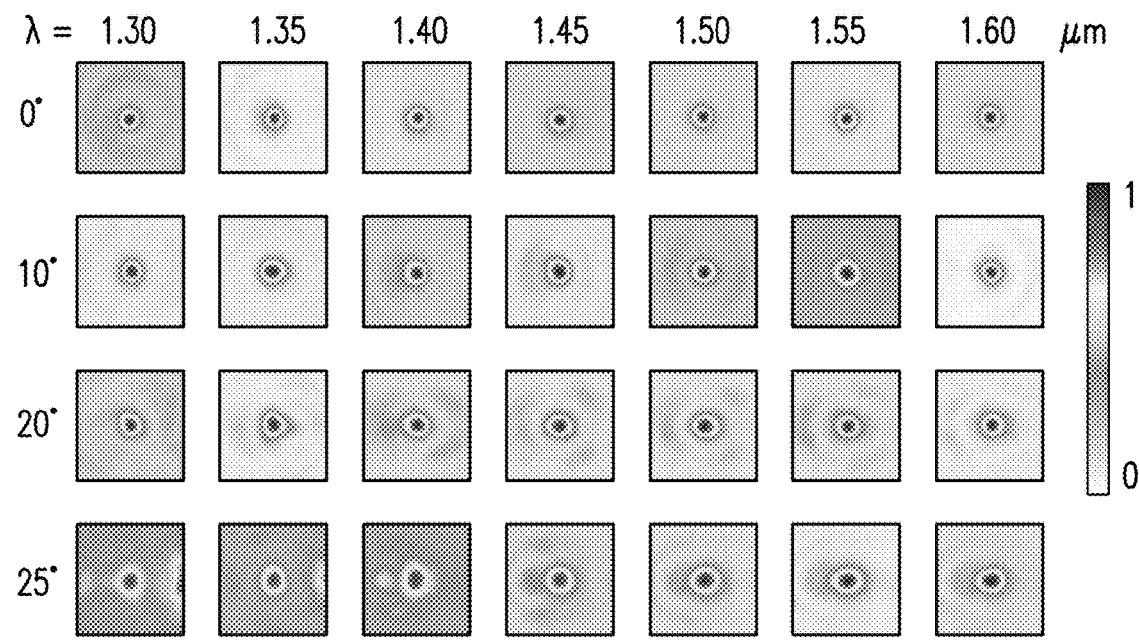
FIG. 34 shows measured intensity distributions on the focal plane at different wavelengths and a few incident angles for the metalens triplet shown in FIG. 32.
Figure 35:
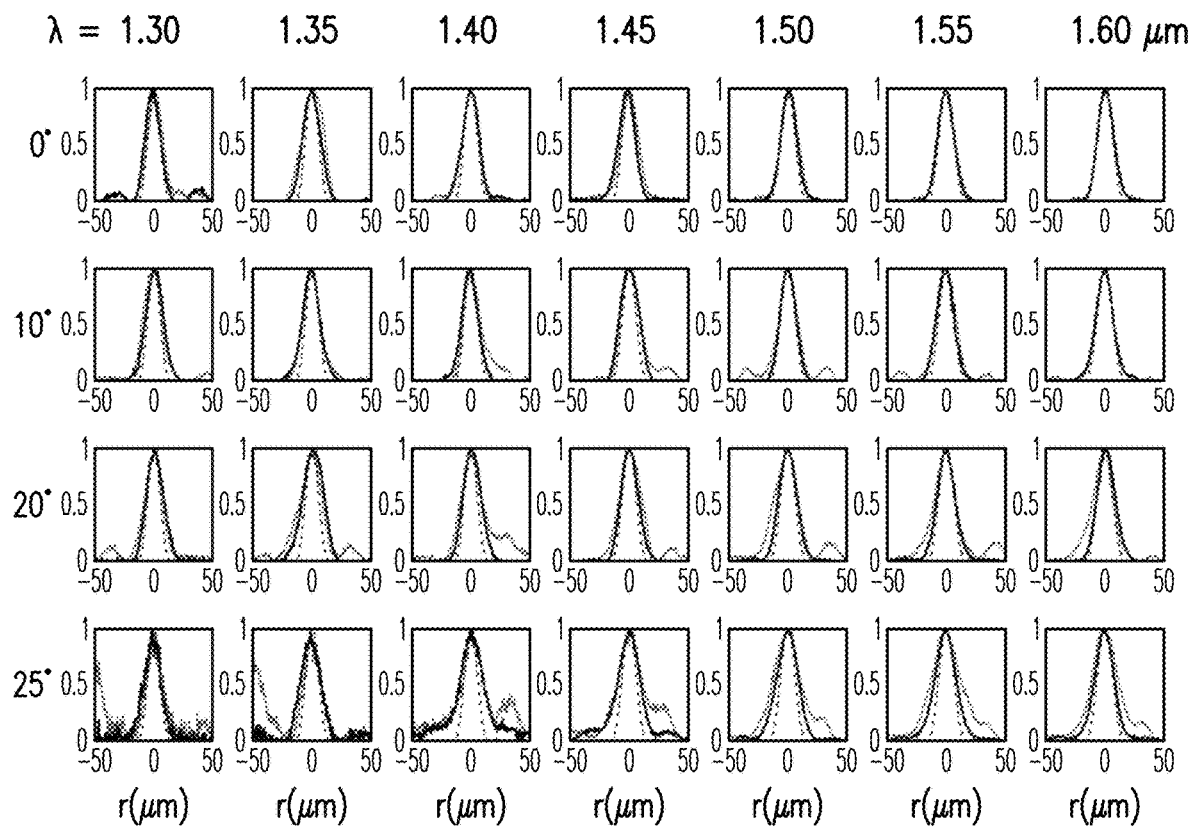
FIG. 35 shows line scans (solid curves) of measured intensity distributions shown in FIG. 34 compared with diffraction limited spots (dashed curves).
Figure 36A:
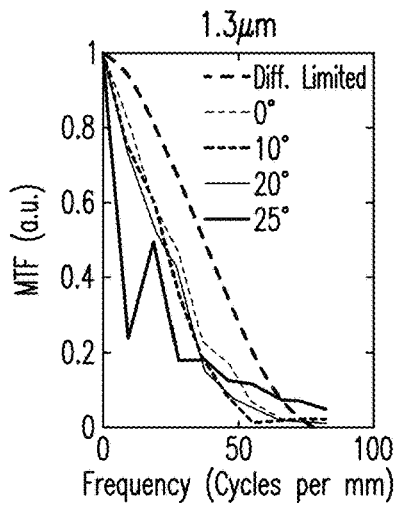
FIGS. 36A-36E show modulation transfer function (MTF) of an example metalens triplet.
Figure 36B:
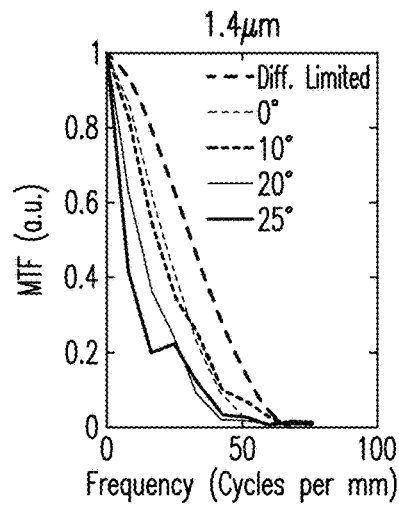
Figure 36C:
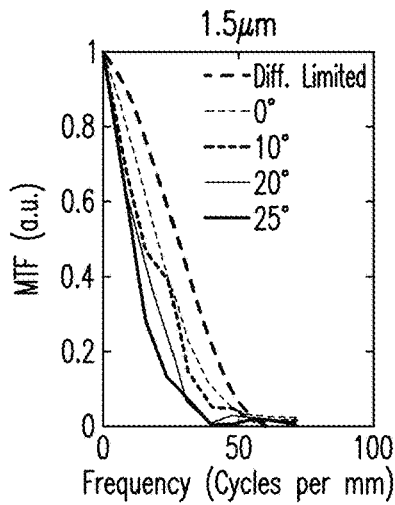
Figure 36D:
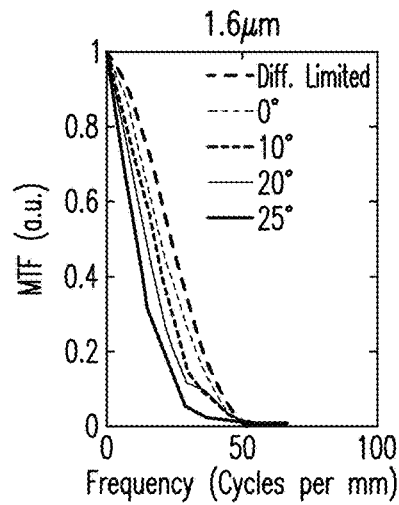
Figure 36E:
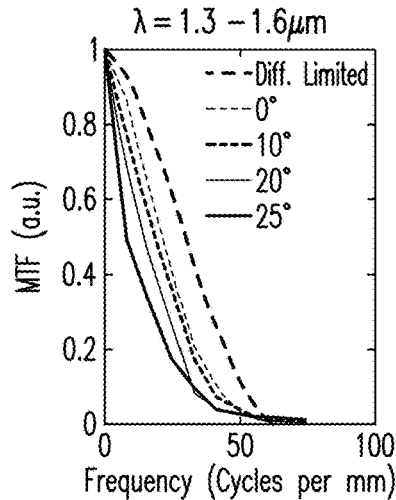

FIG. 33 shows measured far-field intensity distributions of the metalens triplet shown in FIG. 32. Measured light intensity distributions on the focal plane are shown in the top panel, showing that the focal spots are diffraction limited over a broad range of wavelengths. Measured light intensity distributions on the longitudinal plane are shown in the bottom panel, showing that the focal distances are about 5 mm over a wavelength of λ=1.3-1.6 μm. FIG. 34 shows measured intensity distributions on the focal plane at different wavelengths and a few incident angles for the metalens triplet shown in FIG. 32. The results show that up to 20 degrees of angle of incidence the focal spots have little distortion, which indicates good suppression of monochromatic aberrations. When incident angle increases to 25 degrees, the focal spots start to show distortion for the shortest wavelengths. The line scans of the focal spots illustrated in FIG. 35 shows the same story. Modulation transfer function (MTF) of the metalens triplet can be calculated by conducting Fourier transform of the measured focal spots, and the results are shown in FIGS. 36A-36E. FIGS. 36A-36D are MTFs calculated at four wavelengths. FIG. 36E shows MTFs integrated over the 1.3 to 1.6 μm wavelength range at several incident angles. The MTF curves do not decrease significantly compared to the MTF of the diffraction-limited case as incident angle increases, which indicates that monochromatic aberrations are suppressed.

Figure 37A:
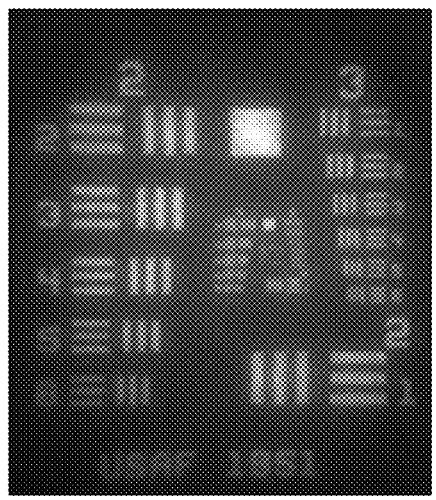
FIGS. 37A-37C illustrate imaging of a USAF resolution target using an example metalens triplet under illumination sources with different bandwidths.
Figure 37B:
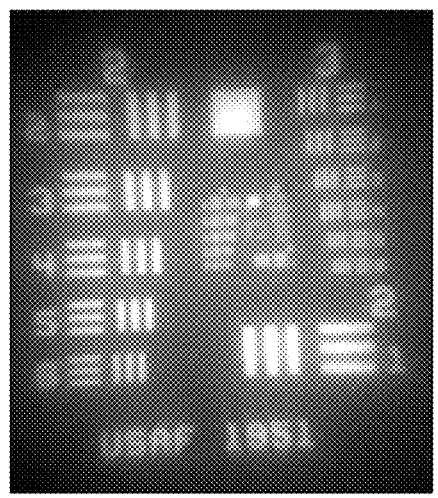
Figure 37C:
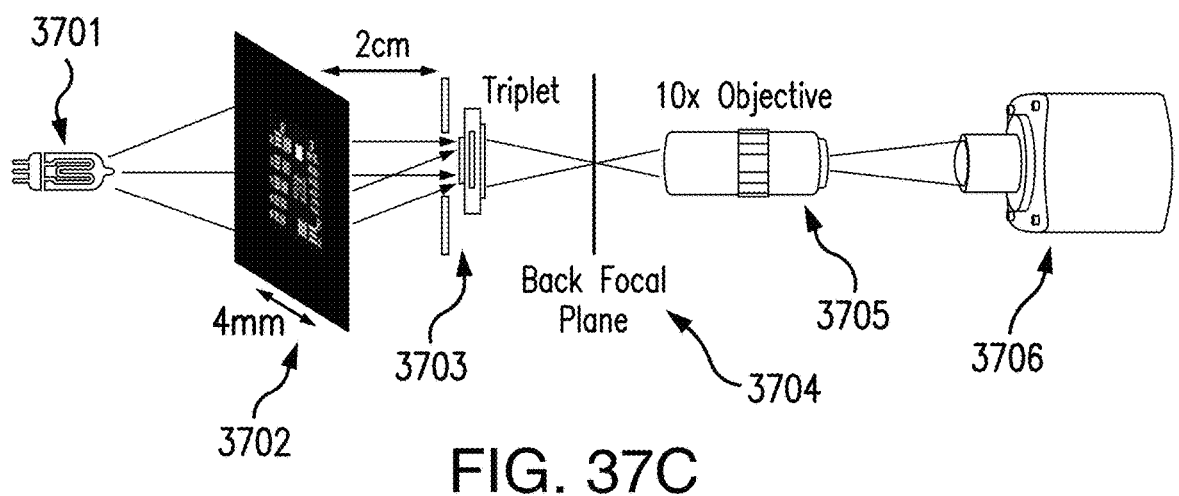

FIGS. 37A and 37B show results of imaging the USAF resolution target using the metalens triplet. FIG. 37A is an image taken with the target illuminated with a diode laser with very narrow linewidth around λ=1550 nm. FIG. 37B is an image taken with the target illuminated with a broadband halogen lamp emitting broadband near-infrared radiation from λ=700 nm to 1700 nm. Comparison of the two images shows that the image taken with the diode laser is sharper, but the degradation when the halogen lamp is used is not significant. This indicates that the metalens triplet can correct chromatic aberrations. FIG. 37C is a schematic of the experimental setup. The setup includes a fiber coupler 3701, a resulting image 3702, a triplet 3703, a back focal plane 3704, 10× Objective 3705, and a camera operating in the near-IR 3706.

Figure 38A:
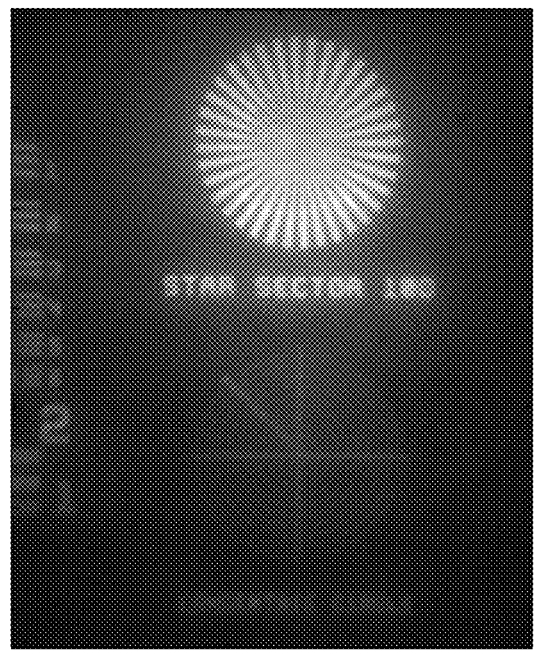
FIGS. 38A and 38B show imaging of the Siemens star and concentric ring with an example metalens triplet.
Figure 38B:
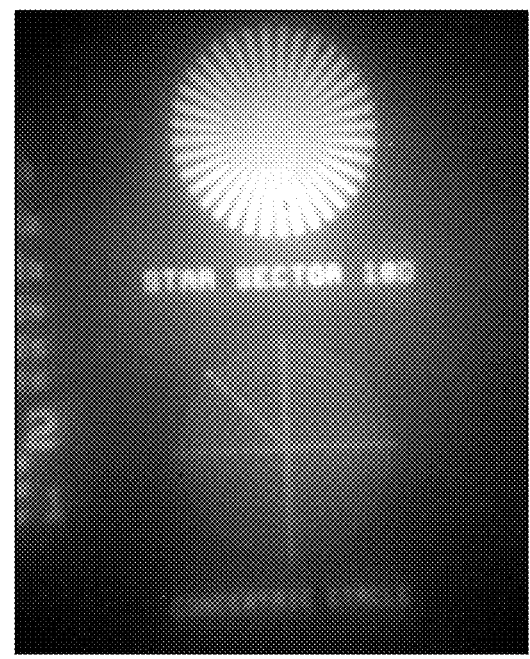
Figure 39A:
FIGS. 39A-39C show imaging reflection type objects illuminated with a broadband halogen lamp using an example metalens triplet.
Figure 39B:
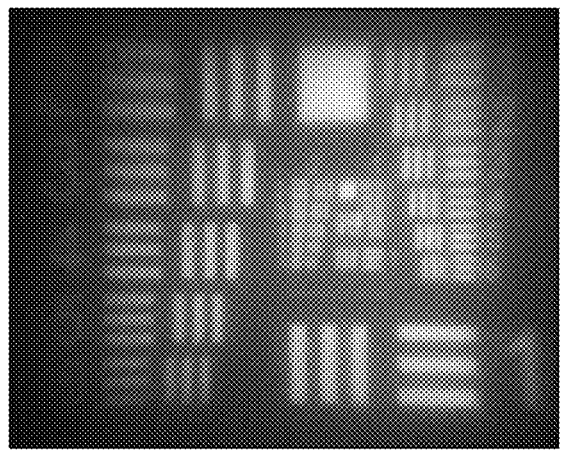
Figure 39C:
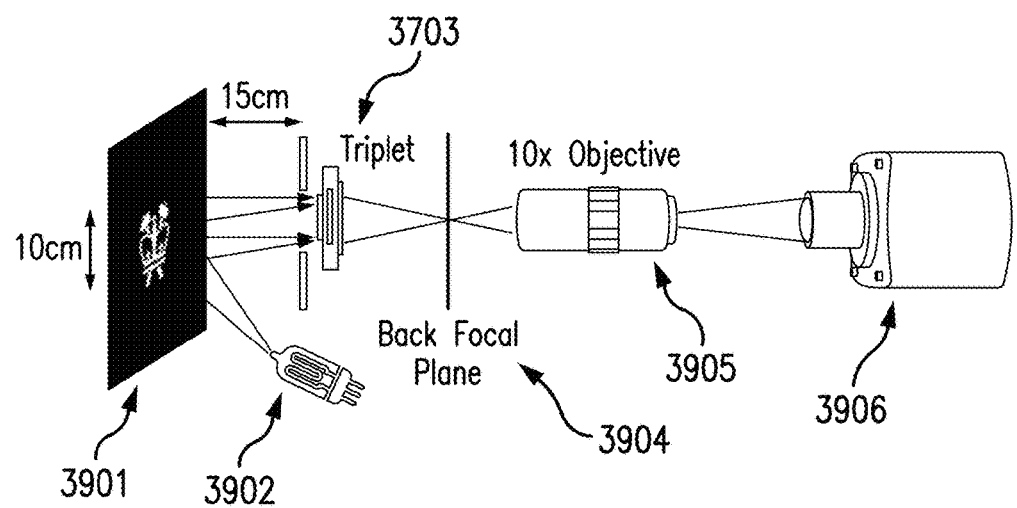

FIGS. 38A and 38B show results of imaging of the Siemens star and concentric ring using the metalens triplet. FIG. 38A is an image taken with the target illuminated with the diode laser emitting at λ=1550 nm. FIG. 38B is an image taken with the target illuminated with the broadband halogen lamp. The degradation of the image when the halogen lamp is used is not significant, indicating that the metalens triplet can correct chromatic aberrations. FIGS. 39A and 39B show results of imaging reflection type objects illuminated with the broadband halogen lamp using the metalens triplet. FIG. 39A is an image of Columbia Engineering logo printed on an A4 paper. The field of view is about ±15 degrees. FIG. 39B is an image of a USAF resolution target printed on an A4 paper. The field of view is also about ±15 degrees. The sharp features of the images indicate monochromatic aberrations have been suppressed. FIG. 39C is a schematic of the experimental setup. The setup includes a resulting image 3901, a fiber coupler 3902, a triplet 3903, a back focal plane 3904, 10× Objective 3905, and a camera operating in the near-IR 3906.

Figure 40:
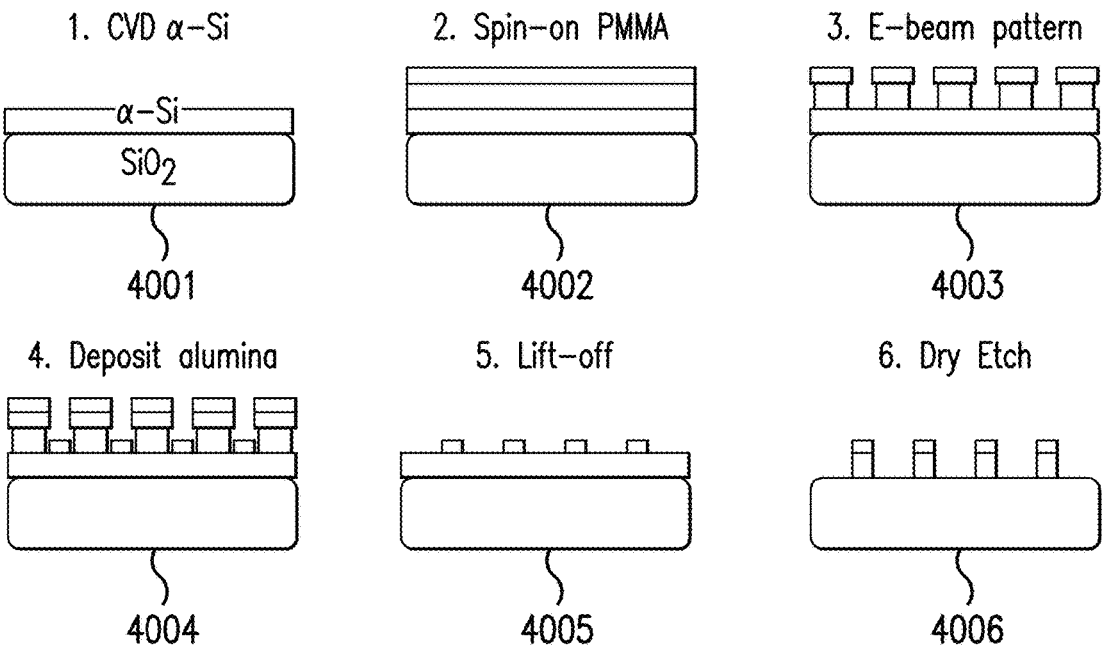
FIG. 40 shows an example fabrication flow of amorphous silicon (a-Si) metasurface lenses.

FIG. 40 illustrates an example fabrication flow for metasurface lenses 4000 based on amorphous silicon (a-Si) and operating in the near-infrared. Fabrication can be undertaken with processes compatible with complementary metal oxide semiconductor (CMOS) fabrication facilities. Materials used can include any CMOS compatible low-loss dielectric material operating within the bandwidth desired. This can make the choice of a-Si nanostructures resting on a silicon dioxide substrate. At 4001, the a-Si film can be grown atop the silicon dioxide substrate with chemical vapor deposition to heights of 100 to 10,000 nm. At 4002, electron-beam lithography (generalizable to optical lithography, deep UV lithography, or nanoimprint lithography) can be used to pattern the designed metasurface pattern into a resist layer (poly(methyl methacrylate), or PMMA) that can be deposited on top of the a-Si layer by a standard spin-deposition technique. At 4003, the patterns can be developed by submersion into a developing solution of Isopropyl alcohol and distilled water (3:1 to 6:4 ratio) at temperatures between 0 and 10 degrees Celsius, for a time between 1 and 3 minutes. At 4004, an etching mask material such as alumina or silica can be deposited by physical vapor deposition to a thickness of between 10 and 50 nm. At 4005, the pattern can be lifted off by dissolving the remaining resist layer in an organic solvent such as acetone or N-methyl-2-pyrrolidone at a temperature of between 25 and 90 degrees Celsius, for a time between 1 and 12 hours. At 4006, the material remaining atop the a-Si layer can be the etching mask determined by the electron-beam lithography. This pattern can be transferred into the a-Si layer by reactive ion etching, yielding the final device composed of silicon metasurfaces on silicon dioxide substrate after an optional process to remove the etching mask layer by a wet chemical process.

Figure 41:
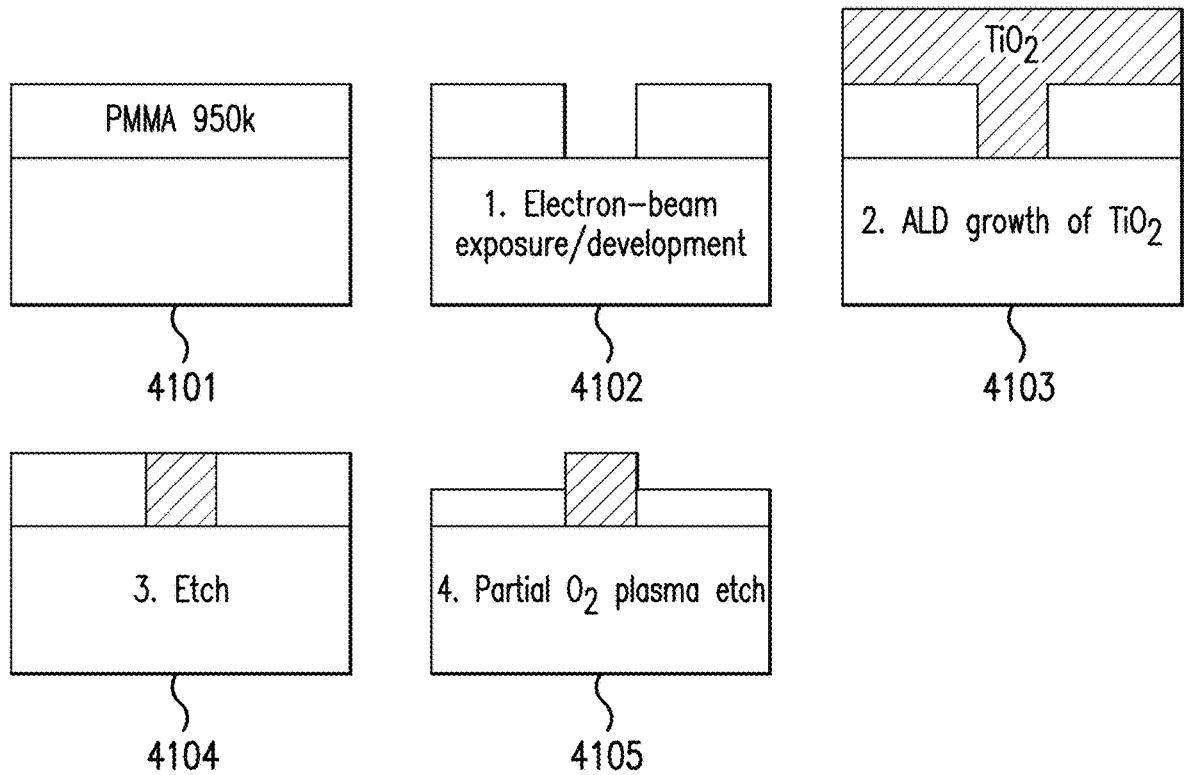
FIG. 41 shows an example fabrication flow of $TiO_2$ meta-units half-embedded in electron-beam resist PMMA.

In some embodiments, fabrication of meta-units is disclosed. FIG. 41 provides an example fabrication flow of $TiO_2$ meta-units (purple) for metasurface lenses. At 4101, a layer of electron-beam resist, e.g., PMMA 950 k, is spin coated. Next 4102, an electron beam exposure is applied to define metasurface lens patterns. At 4103, $TiO_2$ is deposited using atomic layer deposition (ALD). At 4104, an etch is used to planarize the surface of the device. At 4105, a partial oxygen plasma etch is used to remove a layer of PMMA. Higher aspect ratio $TiO_2$ meta-units can be allowed in this scheme due to being partially embedded in the PMMA resist layer for mechanical stability. The portion of the meta-units exposed to air can have large index contrast, yielding large coverage in the phase offset-dispersion space compared to meta-units purely embedded in the PMMA resist. Having partially embedded meta-units can allow overall taller structures, yielding larger coverage in the phase offset-dispersion space than removing the resist entirely.

Figure 42:
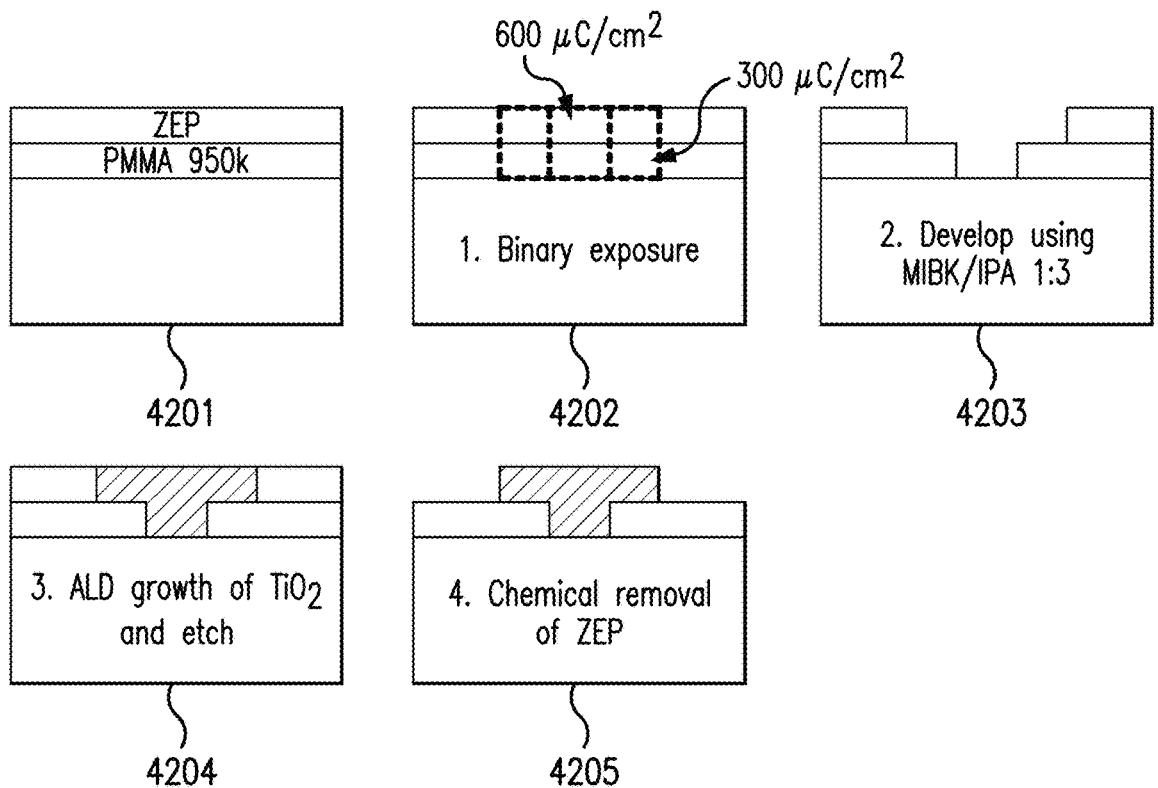
FIG. 42 is an example fabrication flow of mushroom shaped meta-units for metasurface lenses.

FIG. 42 provides an example fabrication flow of mushroom shaped $TiO_2$ meta-units (purple) 4200 for metasurface lenses. A single electron-beam writing procedure can be used with two electron-beam resist layers offering orthogonal developing chemistries. At 4201, a dual layer of electron-beam resists consisting of PMMA 950 k and ZEP are spin coated. At 4202, binary electron beam exposure is applied over two regions of different sizes with different doses. At 4203, part of the electron beam resists are removed using MIBK and IPA. At 4204, $TiO_2$ is deposited and the surface of the device is planarized. At 4205, ZEP is chemically removed. In some embodiments, a developer ratio of MIBK/IPA can be 1:3, where the top layer (ZEP) can be developed at a lower dosage than is required for the bottom layer (PMMA). This can allow a 3D shape to be fabricated in a single lithographic process, with variable cross sections in each layer (constrained such that the cross section of the top layer is larger than the cross section of the bottom layer).

Figure 43:
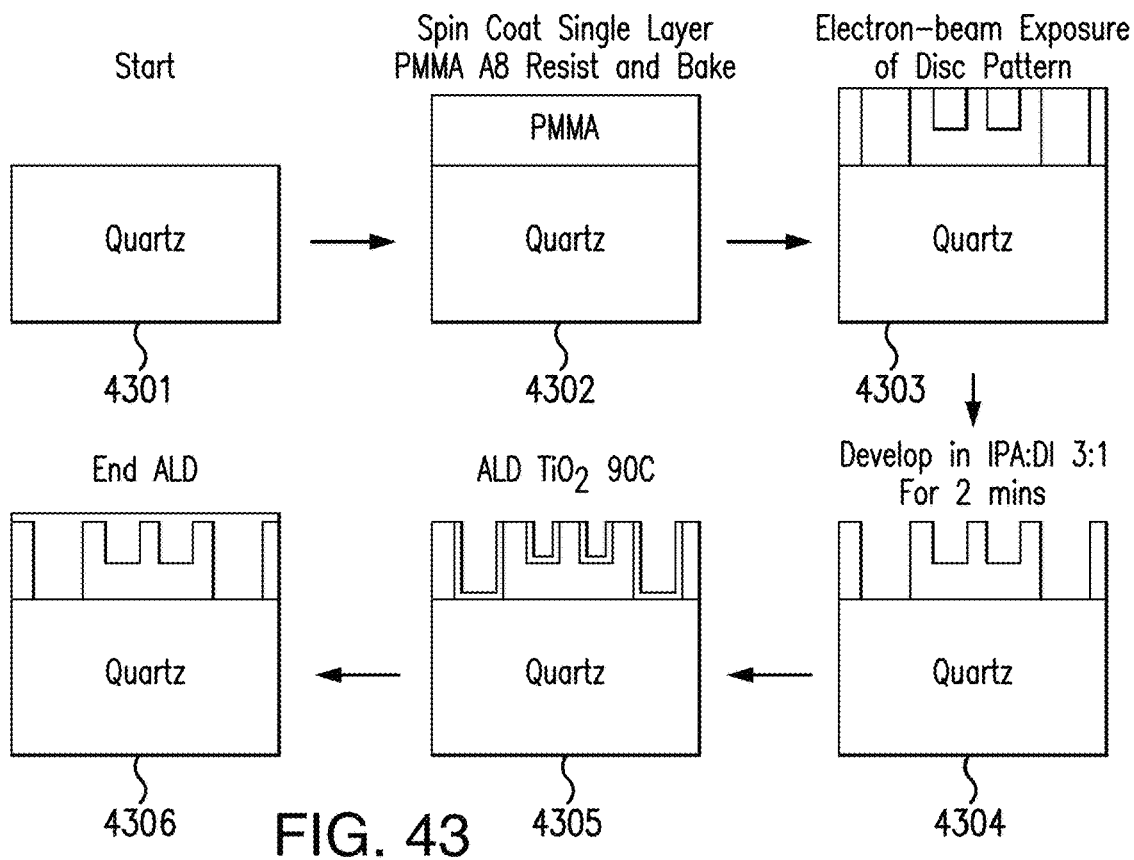
FIG. 43 is an example fabrication flow of $TiO_2$ meta-units with variable height in a single lithographic process.

FIG. 43 illustrates an example fabrication flow of $TiO_2$ meta-units with variable height in a single lithographic procedure. At 4301, a quartz substrate is provided. At 4302, a single layer of electron beam resist PMMA is spin coated and the layer is baked. At 4303, a procedure employing electron beam exposure of the metasurface lens pattern is used. At 4304, a developing process in IPA/de-ionized water is used to remove exposed electron resist. At 4305, a layer of $TiO_2$ is deposited using atomic layer deposition (ALD). Continued deposits of $TiO_2$ and planarization of the surface of the device results at 4306. The "gray-scale" lithographic method can be applied to achieve a mold of resist (PMMA in this case) with variable depth. This can allow the vertical degree of freedom in a way similar to the mushroom shaped meta-units shown in FIG. 42.

Figure 44:
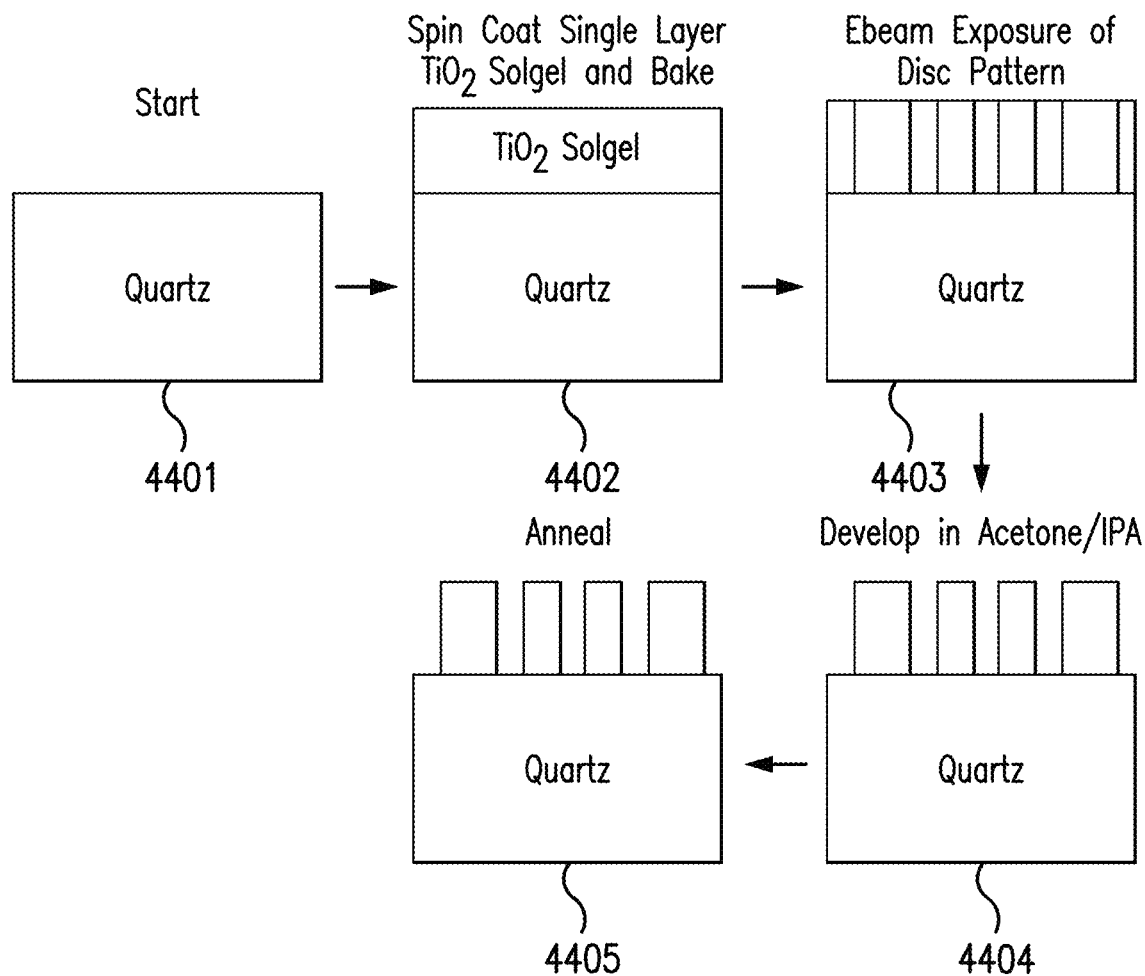
FIG. 44 is an example fabrication flow of $TiO_2$ meta-units using electron-beam sensitive $TiO_2$ sol-gel.

FIG. 44 provides an example fabrication flow of $TiO_2$ meta-units using electron-beam sensitive $TiO_2$ sol-gel. At 4401, a quartz substrate is provided. Next 4402, a single layer of $TiO_2$ solgel is spin coated and baked. At 4403, a procedure employing electron beam exposure of the metasurface lenses is used. At 4404, a developing process in acetone/IPA is used. At 4405, the device is annealed to remove organic components. The sol-gel can behave like a negative resist with the electron-beam exposed regions becoming insoluble in acetone. Post development annealing can result in the formation of $TiO_2$ nanostructures. The annealing process can result in shrinkage of the nanostructured due to evaporation of organic chemicals. For this fabrication process, deposition or etching can be avoided.

In some embodiments, an electron beam sensitive $TiO_2$ sol-gel can be synthesized by mixing equimolar ratio of metal alkoxide precursor Titanium(IV) n-butoxide $Ti(OBu^n)_4$ with β-diketone 1-Benzoylacetone (BzAc) in ethanol solvent at room temperature and low humidity environment. BzAc can stabilize $Ti(OBu^n)_4$ reducing its hydrolytic reactivity and forms chelate rings with it. When the chelate rings are broken due to exposure to electron beam, the sol-gel can be rendered insoluble to organic solvents like acetone. The resulting sol-gel nanostructures can be converted to pure $TiO_2$ by annealing in the temperature range 300°-500° C. Other synthesis methods can involve adding glacial acetic to the previous solution to prevent precipitation during aging process.

Figure 45:
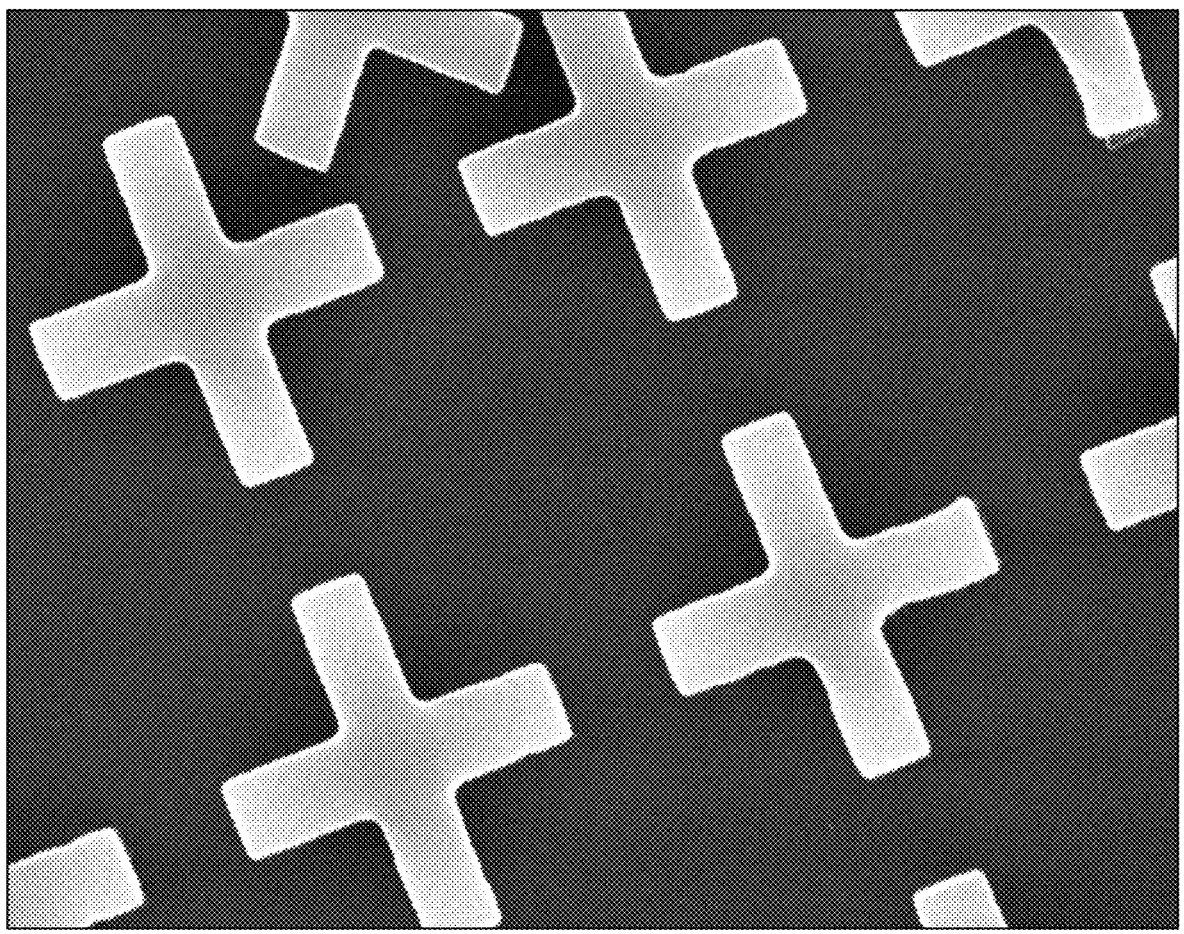
FIG. 45 is a SEM image of example fabricated $TiO_2$ meta-units based on direct electron-beam writing of $TiO_2$ sol-gel.

FIG. 45 provides a SEM image of an example fabricated $TiO_2$ meta-units based on direct electron-beam writing of $TiO_2$ sol-gel. Cross shaped structures with 2-μm arms and 2-μm period were fabricated on a silicon substrate. This image was taken on Apr. 30, 2017 at 2:59:17 PM with the following values: HV=10.00 kV; spot=2.0; det=TLD; mode=SE; mag=20,000×; 6.35 μm; WD=5.1 mm.

Figure 46:
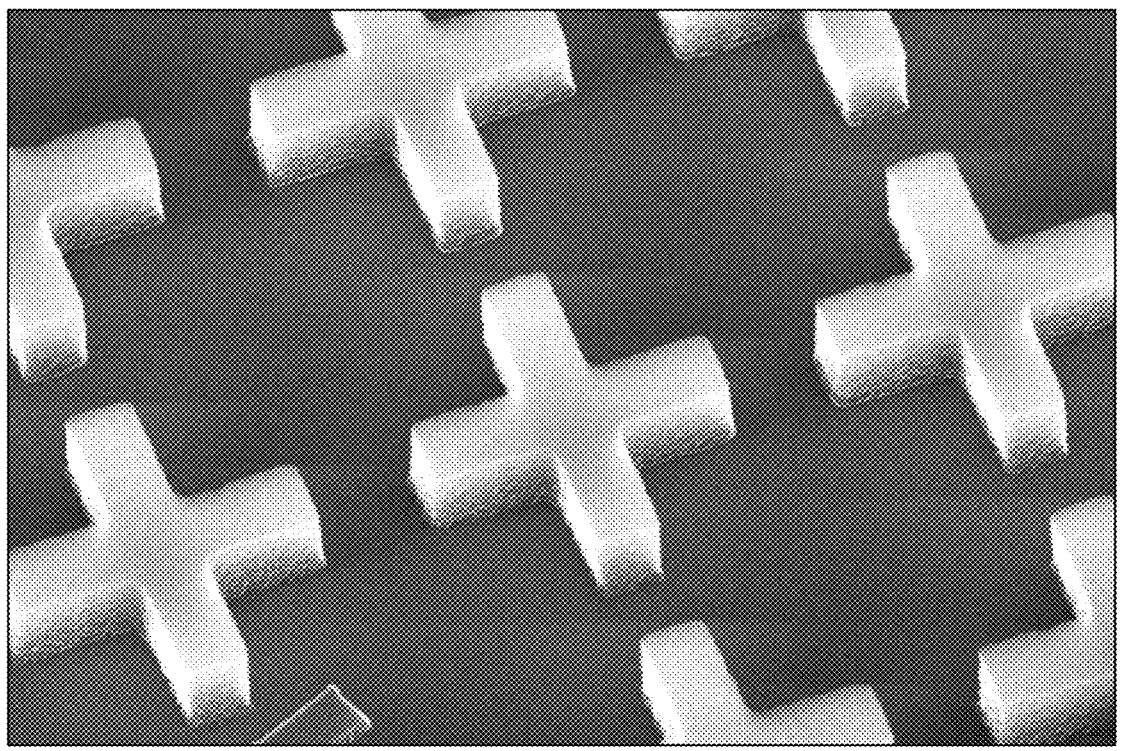
FIG. 46 is a SEM image of example fabricated $TiO_2$ meta-units based on direct electron-beam writing of $TiO_2$ sol-gel.

FIG. 46 provides a SEM image of fabricated $TiO_2$ meta-units based on direct electron-beam writing of $TiO_2$ sol-gel. Cross shaped structures with 2-μm arms and 2-μm period were fabricated on a silicon substrate viewed at 30°. This image was taken on Apr. 30, 2017 at 3:20:13 PM with the following values: HV=10.00 kV; spot=2.0; det=TLD; mode=SE; mag=20,000×; 6.35 μm; and WD=5.3 mm.

Figure 47:
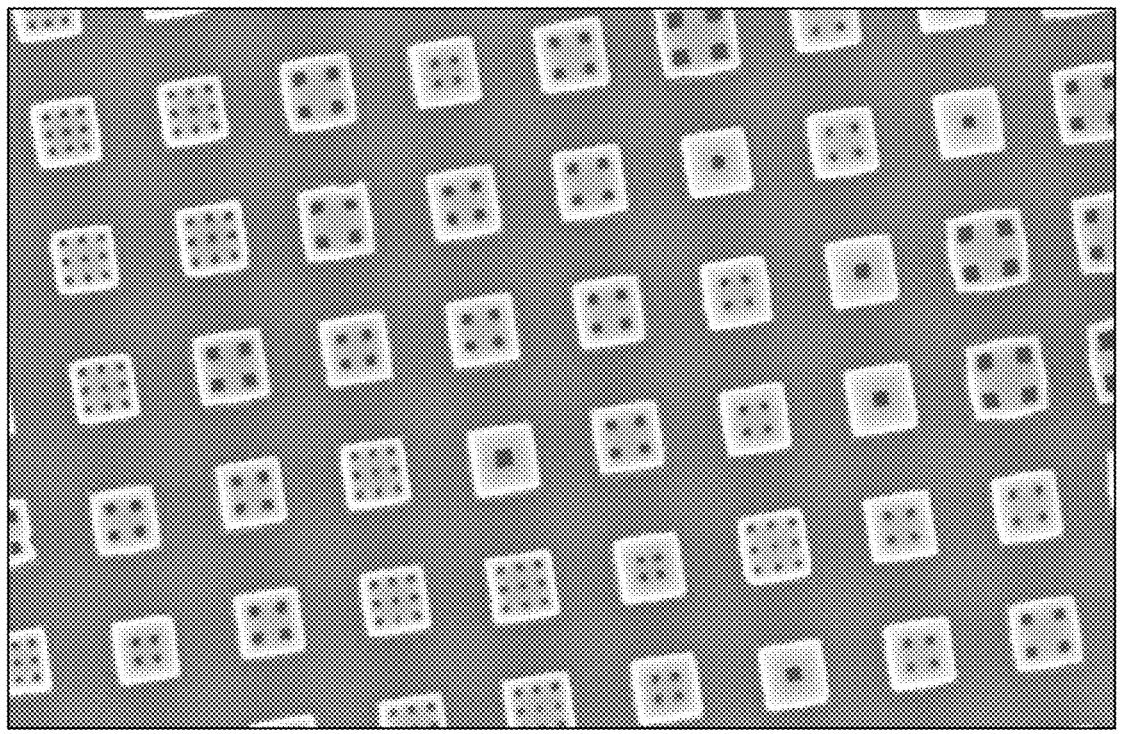
FIG. 47 is a SEM image of example fabricated $TiO_2$ meta-units based on direct electron-beam writing of $TiO_2$ sol-gel.

FIG. 47 provides a SEM image of fabricated $TiO_2$ meta-units based on direct electron-beam writing of $TiO_2$ sol-gel. Each meta-unit is a distinct element of our meta-unit library. This image was taken on May 11, 2017 at 19:02:36 PM with the following values: EHT=15.00 kV; Signal A=InLens; WD=3.1 mm; Mag=20.01 K X; Vac Status=Ready; Gun Vacuum=7.53e-010 mbar; and System Vacuum=3.14e-006 mbar.

Figure 48:
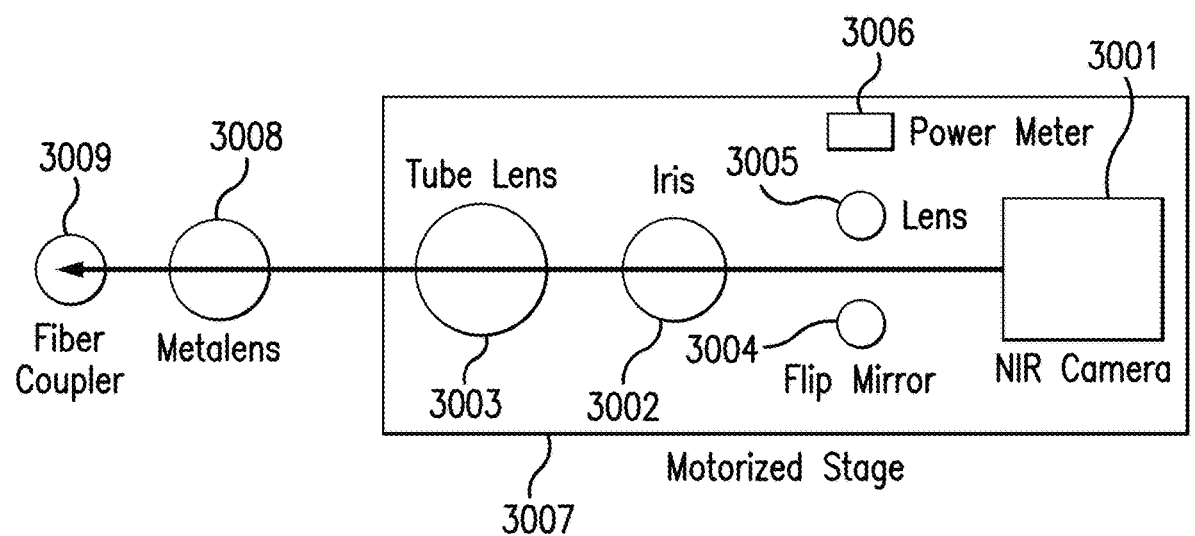
FIG. 48 is a schematic depicting an example optical setup.

In an exemplary embodiment of the disclosed subject matter, a schematic for depicting the optical setup is provided. Referring to FIG. 48, for the purpose of illustration and not limitation, the setup 4800 can include an NIR Camera 4801, an iris 4802, a tube lens 4803, a flip mirror 4804, a lens 4805, and a power meter 4806, all mounted onto a motorized stage 4807. A metalens 4808 and a fiber coupler 4809 can also be included. In some embodiments, the NIR camera 4801 takes in light that must pass first through the fiber coupler 4809, then through the metalens 4808, then through the tube lens 4803, and finally through the iris 4802. In some embodiments, a flip mirror 4804, allows passing the light from a lens 4805, to a power meter 4806, for efficiency measurements.

The description herein merely illustrates the principles of the disclosed subject matter. Various modifications and alterations to the described embodiments will be apparent to those skilled in the art in view of the teachings herein. Accordingly, the disclosure herein is intended to be illustrative, but not limiting, of the scope of the disclosed subject matter.

What is claimed is:

1. A substantially flat optical component for lensing incoming electromagnetic radiation having at least one wavelength and a first phase into outgoing electromagnetic radiation having a second phase, comprising:
   a transparent substrate; and
   at least one metasurface, coupled to the substrate, comprising a plurality of optical meta-units to change at least the first phase to the second phase, wherein the plurality of optical meta-units comprises a plurality of singular pillars, a plurality of annular pillars, and a plurality of concentric rings, wherein each of the plurality of meta-units comprises silicon or $TiO_2$;
   wherein each optical meta-unit of the plurality of optical meta-units is positioned at a distance that is less than the wavelength from at least a different optical meta-unit;
   wherein the flat optical component is adapted to correct both chromatic and monochromatic aberrations across the wavelength;
   wherein each of the plurality of meta-units comprises a meta-unit having a shape to diffractively scatter the electromagnetic radiation;
   wherein the shape comprises an archetype shape having one or more varying geometrical parameters; and
   wherein each of the plurality of meta-units is configured to provide a range of optical phase offset and phase dispersion for a broadband achromatic metasurface lens.

2. The system of claim 1, wherein the at least one metasurface comprises two or more metasurfaces.

3. The system of claim 2, wherein the two or more metasurfaces are adapted to correct for the monochromatic aberrations.

4. The system of claim 1, wherein the at least one metasurface comprises a first and a second layer.

5. The system of claim 4, wherein the first layer comprises a first geometry and a first material, and the second layer comprises a second geometry and/or a second material.

6. The system of claim 1, wherein each of the plurality of meta-units is configured to provide a range of scattering amplitude for a broadband achromatic metasurface lens.

7. The system of claim 1, wherein the at least one metasurface is characterized by a varying thickness.

8. The system of claim 1, wherein the phase profile of the optical meta-units is defined by:

$$\Phi 1 = \sum_{n=1}^{s} An\left(\frac{P}{R1}\right)^{2n},$$

wherein $p=\sqrt{x^2+y^2}$ is a radial coordinate, x and y are position coordinates of the optical meta-units with respect to an origin of the x-y plane of the metasurface, R1 is a radius of the metasurface, and coefficient $A_n$ is an optimization parameter.

9. A method of making a substantially flat optical component for lensing incoming electromagnetic radiation having at least one wavelength and a first phase into outgoing electromagnetic radiation having a second phase, comprising:
   positioning a transparent substrate; and
   forming at least one metasurface on the substrate comprising a plurality of optical meta-units to change at least the first phase to the second phase, wherein the plurality of optical meta-units comprises a plurality of singular pillars, a plurality of annular pillars, and a plurality of concentric rings, wherein each of the plurality of meta-units comprises silicon or $TiO_2$;
   wherein each optical meta-unit of the plurality of optical meta-units is positioned at a distance that is less than the wavelength from at least a different optical meta-unit;
   wherein the flat optical component is adapted to correct both chromatic and monochromatic aberrations across the wavelength;
   wherein each of the plurality of meta-units comprises a meta-unit having a shape to diffractively scatter the electromagnetic radiation;
   wherein the shape comprises an archetype shape having one or more varying geometrical parameters; and wherein each of the plurality of meta-units is configured to provide a range of optical phase offset and phase dispersion for a broadband achromatic metasurface lens.

10. The method of claim 9, wherein the forming comprises forming a substrate layer and a patterned film layer thereon having a thickness between 100 and 100,000 nm.

11. The method of claim 10, wherein the patterning is selected from the group consisting of using electron-beam lithography, photolithography, deep ultra-violet lithography, and imprint lithography.

12. The method of claim 9, wherein the forming comprises stacking two or more patterned film layers.

13. The method of claim 9, wherein the meta-units is selected from the group consisting of silicon, silicon nitride, gallium nitride, or titanium dioxide.

14. The method of claim 9, wherein the forming further comprises partially embedding the meta-units in the substrate.

15. The method of claim 9, wherein the meta-units comprise meta-units having varying shapes along at least a height direction.

16. The method of claim 9, wherein the meta-units vary in height.

* * * * *